US012368157B2

(12) United States Patent
Doherty et al.

(10) Patent No.: US 12,368,157 B2
(45) Date of Patent: Jul. 22, 2025

(54) ELECTROCHEMICAL SLURRY COMPOSITIONS AND METHODS FOR PREPARING THE SAME

(71) Applicant: 24M Technologies, Inc., Cambridge, MA (US)

(72) Inventors: Tristan Doherty, Somerville, MA (US); Pimpa Limthongkul, Boston, MA (US); Asli Butros, Cambridge, MA (US); Mihai Duduta, Somerville, MA (US); James C. Cross, III, Carlisle, MA (US)

(73) Assignee: 24M Technologies, Inc., Cambridge, MA (US)

( * ) Notice: Subject to any disclaimer, the term of this patent is extended or adjusted under 35 U.S.C. 154(b) by 612 days.

(21) Appl. No.: 17/825,826

(22) Filed: May 26, 2022

(65) Prior Publication Data

US 2022/0285669 A1    Sep. 8, 2022

Related U.S. Application Data

(63) Continuation of application No. 15/266,054, filed on Sep. 15, 2016, now abandoned, which is a continuation of application No. 13/832,861, filed on Mar. 15, 2013, now Pat. No. 9,484,569.

(60) Provisional application No. 61/665,225, filed on Jun. 27, 2012, provisional application No. 61/662,173, filed on Jun. 20, 2012, provisional application No. 61/659,736, filed on Jun. 14, 2012, provisional application No. 61/659,248, filed on Jun. 13, 2012.

(51) Int. Cl.
| | |
|---|---|
| *H01M 4/1391* | (2010.01) |
| *H01G 11/30* | (2013.01) |
| *H01G 11/38* | (2013.01) |
| *H01G 11/46* | (2013.01) |
| *H01G 11/86* | (2013.01) |
| *H01M 4/02* | (2006.01) |
| *H01M 4/04* | (2006.01) |
| *H01M 4/131* | (2010.01) |
| *H01M 4/136* | (2010.01) |
| *H01M 4/1397* | (2010.01) |
| *H01M 4/505* | (2010.01) |
| *H01M 4/525* | (2010.01) |
| *H01M 4/58* | (2010.01) |
| *H01M 10/0525* | (2010.01) |

(52) U.S. Cl.
CPC .......... *H01M 4/1391* (2013.01); *H01G 11/30* (2013.01); *H01G 11/38* (2013.01); *H01G 11/46* (2013.01); *H01G 11/86* (2013.01); *H01M 4/02* (2013.01); *H01M 4/0411* (2013.01); *H01M 4/131* (2013.01); *H01M 4/136* (2013.01); *H01M 4/1397* (2013.01); *H01M 4/505* (2013.01); *H01M 4/525* (2013.01); *H01M 4/5825* (2013.01); *H01M 10/0525* (2013.01); *H01M 2004/021* (2013.01); *H01M 2004/028* (2013.01); *Y02E 60/10* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 3,255,046 A | 6/1966 | Ghormley | |
| 3,360,401 A | 12/1967 | Robert et al. | |
| 3,540,933 A | 11/1970 | Boeke et al. | |
| 3,540,934 A | 11/1970 | Boeke et al. | |
| 3,551,207 A | 12/1970 | Herbst et al. | |
| 3,996,064 A | 12/1976 | Thaller | |
| 4,018,971 A | 4/1977 | Sheibley et al. | |
| 4,126,733 A | 11/1978 | Doniat | |
| 4,159,366 A | 6/1979 | Thaller | |
| 4,192,910 A | 3/1980 | Frosch et al. | |
| 4,318,969 A | 3/1982 | Peled et al. | |
| 4,320,180 A | 3/1982 | Nozaki | |
| 4,335,191 A | 6/1982 | Peled | |

(Continued)

FOREIGN PATENT DOCUMENTS

| | | |
|---|---|---|
| CN | 1209219 A | 2/1999 |
| CN | 101213700 A | 7/2008 |

(Continued)

OTHER PUBLICATIONS

Amatucci, G. G., "Battery Materials and Issues for Grid Applications," Rutgers, Department of Material Science and Engineering, Stanford University Global Climate & Energy Project, Nov. 2, 2007, http://gcep.stanford.edu/pdfs/iq9b0/11bOrRuH/veOA2jA/Amatucci-20071102, 33 paqes.

Amatucci, G. G. et al., "Fluoride based electrode materials for advanced energy storage devices," Journal of Fluorine Chemistry, 128(4):243-262 (2007).

Armand, M. et al., "Conjugated dicarboxylate anodes for Li-ion batteries," Nature Materials, 8:120-125 (2009).

Asgeirsson, H., "Zinc Bromine Flow Battery at Detroit Edison Utility Application," California Energy Commission Workshop, Feb. 24, 2005, DTE Energy, 35 pages.

(Continued)

*Primary Examiner* — Carlos Barcena
(74) *Attorney, Agent, or Firm* — Cooley LLP

(57) ABSTRACT

Embodiments described herein generally relate to semi-solid suspensions, and more particularly to systems and methods for preparing semi-solid suspensions for use as electrodes in electrochemical devices such as, for example batteries. In some embodiments, a method for preparing a semi-solid electrode includes combining a quantity of an active material with a quantity of an electrolyte to form an intermediate material. The intermediate material is then combined with a conductive additive to form an electrode material. The electrode material is mixed to form a suspension having a mixing index of at least about 0.80 and is then formed into a semi-solid electrode.

19 Claims, 42 Drawing Sheets

(56) References Cited

U.S. PATENT DOCUMENTS

| | | | |
|---|---|---|---|
| 4,352,864 A | 10/1982 | Struthers | |
| 4,370,392 A | 1/1983 | Savinell et al. | |
| 4,375,501 A | 3/1983 | Peled et al. | |
| 4,382,116 A | 5/1983 | Gahn et al. | |
| 4,410,609 A | 10/1983 | Peled et al. | |
| 4,431,718 A | 2/1984 | Bernard et al. | |
| 4,443,522 A | 4/1984 | Struthers | |
| 4,456,665 A | 6/1984 | Peled et al. | |
| 4,461,815 A | 7/1984 | Peled et al. | |
| 4,485,154 A | 11/1984 | Remick et al. | |
| 4,517,258 A | 5/1985 | Bronoel | |
| 4,576,878 A | 3/1986 | Gahn | |
| 4,614,693 A | 9/1986 | Hashimoto et al. | |
| 4,755,440 A | 7/1988 | Peled et al. | |
| 4,784,924 A | 11/1988 | Savinell et al. | |
| 4,956,244 A | 9/1990 | Shimizu et al. | |
| 5,079,104 A | 1/1992 | Roche et al. | |
| 5,308,718 A | 5/1994 | Eidler et al. | |
| 5,368,952 A | 11/1994 | Sonneveld | |
| 5,441,820 A | 8/1995 | Siu et al. | |
| 5,558,961 A | 9/1996 | Doeff et al. | |
| 5,591,538 A | 1/1997 | Eidler et al. | |
| 5,600,534 A | 2/1997 | Blazek et al. | |
| 5,601,943 A | 2/1997 | Eidler et al. | |
| 5,610,802 A | 3/1997 | Eidler et al. | |
| 5,650,239 A | 7/1997 | Lex et al. | |
| 5,656,390 A | 8/1997 | Kageyama et al. | |
| 5,674,802 A | 10/1997 | Sheppard | |
| 5,759,711 A | 6/1998 | Miyabayashi et al. | |
| 5,792,576 A | 8/1998 | Xing et al. | |
| 5,817,436 A | 10/1998 | Nishijima et al. | |
| 5,837,397 A | 11/1998 | Xing | |
| 5,849,427 A | 12/1998 | Siu et al. | |
| 5,869,200 A | 2/1999 | Nunnally | |
| 5,912,088 A | 6/1999 | Ernst | |
| 6,203,947 B1 | 3/2001 | Peled et al. | |
| 6,242,125 B1 | 6/2001 | Eidler et al. | |
| 6,261,714 B1 | 7/2001 | Eidler et al. | |
| 6,277,520 B1 | 8/2001 | Moutsios et al. | |
| 6,296,958 B1 | 10/2001 | Pinto et al. | |
| 6,447,943 B1 | 9/2002 | Peled et al. | |
| 6,455,187 B1 | 9/2002 | Tomazic | |
| 6,468,688 B2 | 10/2002 | Kazacos et al. | |
| 6,492,047 B1 | 12/2002 | Peled et al. | |
| 6,497,973 B1 | 12/2002 | Amendola | |
| 6,551,745 B2 | 4/2003 | Moutsios et al. | |
| 6,562,514 B1 | 5/2003 | Kazacos et al. | |
| 6,689,507 B1 | 2/2004 | Tsutsumi et al. | |
| 6,720,107 B1 | 4/2004 | Holtom et al. | |
| 6,764,789 B1 | 7/2004 | Sekiguchi et al. | |
| 6,811,911 B1 | 11/2004 | Peled et al. | |
| 6,979,512 B2 | 12/2005 | Phillips | |
| 6,986,966 B2 | 1/2006 | Clarke et al. | |
| 7,033,696 B2 | 4/2006 | Clarke et al. | |
| 7,078,123 B2 | 7/2006 | Kazacos et al. | |
| 7,214,443 B2 | 5/2007 | Clarke et al. | |
| 7,252,905 B2 | 8/2007 | Clarke et al. | |
| 7,270,911 B2 | 9/2007 | Clarke et al. | |
| 7,297,437 B2 | 11/2007 | Clarke et al. | |
| 7,320,844 B2 | 1/2008 | Skyllas-Kazacos | |
| 7,338,734 B2 | 3/2008 | Chiang et al. | |
| 7,413,824 B2 | 8/2008 | Peled et al. | |
| 7,521,149 B2 | 4/2009 | Medeiros et al. | |
| 7,560,189 B2 | 7/2009 | Clarke et al. | |
| 7,625,663 B2 | 12/2009 | Clarke et al. | |
| 8,097,364 B2 | 1/2012 | Reynolds | |
| 8,133,629 B2 | 3/2012 | McLean et al. | |
| 8,722,226 B2 | 5/2014 | Chiang et al. | |
| 8,722,227 B2 | 5/2014 | Chiang et al. | |
| 8,778,552 B2 | 7/2014 | Chiang et al. | |
| 8,993,159 B2 | 3/2015 | Chiang et al. | |
| 9,153,833 B2 | 10/2015 | Chiang et al. | |
| 9,178,200 B2 | 11/2015 | Bazzarella et al. | |
| 9,184,464 B2 | 11/2015 | Chiang et al. | |
| 9,203,092 B2 | 12/2015 | Slocum et al. | |
| 9,236,607 B2 | 1/2016 | Wang et al. | |
| 9,293,781 B2 | 3/2016 | Chiang et al. | |
| 9,362,583 B2 | 6/2016 | Chiang et al. | |
| 9,385,392 B2 | 7/2016 | Chiang et al. | |
| 9,401,501 B2 | 7/2016 | Bazzarella et al. | |
| 9,437,864 B2 | 9/2016 | Tan et al. | |
| 9,484,569 B2 | 11/2016 | Doherty et al. | |
| 9,583,780 B2 | 2/2017 | Chiang et al. | |
| 9,614,231 B2 | 4/2017 | Carter et al. | |
| 9,786,944 B2 | 10/2017 | Chiang et al. | |
| 9,812,674 B2 | 11/2017 | Bazzarella et al. | |
| 9,825,280 B2 | 11/2017 | Chiang et al. | |
| 9,831,518 B2 | 11/2017 | Chiang et al. | |
| 9,831,519 B2 | 11/2017 | Chiang et al. | |
| 9,831,522 B2 | 11/2017 | Tan et al. | |
| 10,115,970 B2 | 10/2018 | Ota et al. | |
| 10,122,044 B2 | 11/2018 | Tan et al. | |
| 10,153,651 B2 | 12/2018 | Taylor et al. | |
| 10,181,587 B2 | 1/2019 | Ota et al. | |
| 10,230,128 B2 | 3/2019 | Chiang et al. | |
| 10,236,518 B2 | 3/2019 | Chiang et al. | |
| 10,411,310 B2 | 9/2019 | Chiang et al. | |
| 10,483,582 B2 | 11/2019 | Chiang et al. | |
| 10,497,935 B2 | 12/2019 | Ota et al. | |
| 10,522,870 B2 | 12/2019 | Tan et al. | |
| 10,566,581 B2 | 2/2020 | Bazzarella et al. | |
| 10,566,603 B2 | 2/2020 | Slocum et al. | |
| 10,593,952 B2 | 3/2020 | Ota et al. | |
| 10,601,239 B2 | 3/2020 | Taylor et al. | |
| 10,637,038 B2 | 4/2020 | Zagars et al. | |
| 10,734,672 B2 | 8/2020 | Chen et al. | |
| 10,777,852 B2 | 9/2020 | Woodford et al. | |
| 10,854,869 B2 | 12/2020 | Bazzarella et al. | |
| 10,886,521 B2 | 1/2021 | Zagars et al. | |
| 10,910,858 B2 | 2/2021 | Taylor et al. | |
| 10,957,940 B2 | 3/2021 | Tan et al. | |
| 10,964,973 B2 | 3/2021 | Tan et al. | |
| 11,005,087 B2 | 5/2021 | Ota et al. | |
| 11,018,365 B2 | 5/2021 | Chiang et al. | |
| 11,024,903 B2 | 6/2021 | Ota et al. | |
| 11,094,487 B2 | 8/2021 | Lawrence et al. | |
| 11,094,976 B2 | 8/2021 | Chiang et al. | |
| 11,121,437 B2 | 9/2021 | Bazzarella et al. | |
| 11,139,467 B2 | 10/2021 | Zagars et al. | |
| 11,145,909 B2 | 10/2021 | Chiang et al. | |
| 11,309,531 B2 | 4/2022 | Slocum et al. | |
| 11,342,567 B2 | 5/2022 | Chiang et al. | |
| 11,394,049 B2 | 7/2022 | Tan et al. | |
| 11,462,722 B2 | 10/2022 | Aranami et al. | |
| 11,469,065 B2 | 10/2022 | Lawrence et al. | |
| 11,476,551 B2 | 10/2022 | Tyler et al. | |
| 11,552,368 B2 | 1/2023 | Holman et al. | |
| 11,575,146 B2 | 2/2023 | Taylor et al. | |
| 11,594,793 B2 | 2/2023 | Bazzarella et al. | |
| 11,611,061 B2 | 3/2023 | Zagars et al. | |
| 11,631,920 B2 | 4/2023 | Bazzarella et al. | |
| 11,646,437 B2 | 5/2023 | Bazzarella et al. | |
| 11,652,203 B2 | 5/2023 | Zagars et al. | |
| 11,742,525 B2 | 8/2023 | Aranami et al. | |
| 11,749,804 B2 | 9/2023 | Chen et al. | |
| 11,757,129 B2 | 9/2023 | Tan et al. | |
| 11,764,353 B2 | 9/2023 | Ota et al. | |
| 11,804,595 B2 | 10/2023 | Ota et al. | |
| 11,811,119 B2 | 11/2023 | Chiang et al. | |
| 11,831,026 B2 | 11/2023 | Ota et al. | |
| 2001/0028977 A1 | 10/2001 | Kazacos et al. | |
| 2001/0055713 A1 | 12/2001 | Eidler et al. | |
| 2002/0074972 A1 | 6/2002 | Narang et al. | |
| 2002/0177027 A1* | 11/2002 | Yeager | H01M 8/0221 |
| | | | 252/511 |
| 2003/0022059 A1 | 1/2003 | Ito et al. | |
| 2003/0039868 A1 | 2/2003 | Liberatore et al. | |
| 2003/0091883 A1 | 5/2003 | Peled et al. | |
| 2003/0113627 A1 | 6/2003 | Choi et al. | |
| 2003/0143456 A1 | 7/2003 | Kazacos et al. | |
| 2003/0211377 A1 | 11/2003 | Holmes et al. | |
| 2004/0130061 A1 | 7/2004 | Lavoie et al. | |
| 2004/0191623 A1 | 9/2004 | Kubata et al. | |
| 2004/0209153 A1 | 10/2004 | Peled et al. | |

(56) References Cited

U.S. PATENT DOCUMENTS

| | | |
|---|---|---|
| 2004/0234843 A1 | 11/2004 | Skyllas-Kazacos |
| 2004/0241552 A1 | 12/2004 | Skyllas-Kazacos |
| 2005/0175890 A1 | 8/2005 | Tsutsumi et al. |
| 2005/0244707 A1 | 11/2005 | Skyllas-Kazacos et al. |
| 2006/0032046 A1 | 2/2006 | Nathan et al. |
| 2006/0063065 A1 | 3/2006 | Clarke et al. |
| 2006/0183016 A1 | 8/2006 | Kazacos et al. |
| 2006/0204810 A1 | 9/2006 | Surampudi et al. |
| 2008/0094937 A1 | 4/2008 | Li et al. |
| 2008/0131357 A1 | 6/2008 | Kumar et al. |
| 2008/0192564 A1 | 8/2008 | Jouvin |
| 2008/0241629 A1 | 10/2008 | Peled et al. |
| 2008/0292964 A1 | 11/2008 | Kazacos et al. |
| 2009/0017379 A1 | 1/2009 | Inatomi et al. |
| 2009/0032754 A1 | 2/2009 | Pechtold |
| 2009/0253025 A1 | 10/2009 | Whitacre |
| 2010/0003545 A1 | 1/2010 | Horne et al. |
| 2010/0047671 A1 | 2/2010 | Chiang et al. |
| 2010/0248046 A1 | 9/2010 | Kimura et al. |
| 2010/0323264 A1 | 12/2010 | Chiang et al. |
| 2011/0159345 A1 | 6/2011 | Makidera et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0088155 A1 | 4/2012 | Yushin et al. |
| 2012/0121963 A1 | 5/2012 | Kwon et al. |
| 2012/0135278 A1 | 5/2012 | Yoshie et al. |
| 2012/0135282 A1 | 5/2012 | La Mantia et al. |
| 2012/0164499 A1 | 6/2012 | Chiang et al. |
| 2012/0202114 A1* | 8/2012 | Madray ............... H01M 4/0435 264/105 |
| 2012/0328917 A1 | 12/2012 | Sakashita et al. |
| 2013/0040229 A1 | 2/2013 | Grigorian et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2013/0344367 A1 | 12/2013 | Chiang et al. |
| 2014/0004437 A1 | 1/2014 | Slocum et al. |
| 2014/0030605 A1 | 1/2014 | Kim et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum |
| 2015/0171406 A1 | 6/2015 | Bazzarella et al. |
| 2015/0280267 A1 | 10/2015 | Chiang et al. |
| 2015/0287980 A1 | 10/2015 | Chen et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0308243 A1 | 10/2016 | Herle et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0088925 A1 | 3/2019 | Harutyunyan et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chiang et al. |
| 2020/0321601 A1 | 10/2020 | Slocum et al. |
| 2021/0249678 A1 | 8/2021 | Chiang et al. |
| 2022/0029207 A1 | 1/2022 | Chiang et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0352597 A1 | 11/2022 | Chen et al. |
| 2023/0018078 A1 | 1/2023 | Slocum et al. |
| 2023/0022329 A1 | 1/2023 | Chen et al. |
| 2023/0085181 A1 | 3/2023 | Tan et al. |
| 2023/0090853 A1 | 3/2023 | Tyler et al. |
| 2023/0118961 A1 | 4/2023 | Chen et al. |
| 2023/0133464 A1 | 5/2023 | Ota et al. |
| 2023/0170169 A1 | 6/2023 | Lawrence et al. |
| 2023/0178707 A1 | 6/2023 | Aranami et al. |
| 2023/0238562 A1 | 7/2023 | Kusachi et al. |
| 2023/0282906 A1 | 9/2023 | Chen et al. |
| 2023/0291063 A1 | 9/2023 | Holman et al. |
| 2023/0307803 A1 | 9/2023 | Bazzarella et al. |
| 2023/0327068 A1 | 10/2023 | Tyler et al. |
| 2023/0327077 A1 | 10/2023 | Zagars et al. |
| 2023/0327178 A1 | 10/2023 | Taylor et al. |
| 2023/0335748 A1 | 10/2023 | Chen et al. |
| 2023/0352755 A1 | 11/2023 | Aragon et al. |
| 2023/0369603 A1 | 11/2023 | Ota et al. |
| 2023/0369719 A1 | 11/2023 | Bazzarella et al. |
| 2023/0378512 A1 | 11/2023 | Bazzarella et al. |

FOREIGN PATENT DOCUMENTS

| | | |
|---|---|---|
| CN | 102119461 A | 7/2011 |
| DE | 102004033345 A1 | 2/2006 |
| EP | 0330290 B1 | 5/1996 |
| GB | 2346006 A | 7/2000 |
| GB | 2374722 A | 10/2002 |
| JP | H1145706 A | 2/1999 |
| JP | 2001236991 A | 8/2001 |
| JP | 2006156255 A | 6/2006 |
| JP | 2006294288 A | 10/2006 |
| JP | 2008270137 A | 11/2008 |
| JP | 2008544444 A | 12/2008 |
| JP | 2009224141 A | 10/2009 |
| JP | 2010157361 A | 7/2010 |
| JP | 2011076824 A | 4/2011 |
| JP | 2011524074 A | 8/2011 |
| KR | 20150122124 A | 10/2015 |
| WO | WO-9519052 A1 | 7/1995 |
| WO | WO-9724774 A1 | 7/1997 |
| WO | WO-9805706 A1 | 2/1998 |

(56) References Cited

FOREIGN PATENT DOCUMENTS

| WO | WO-9965100 | A1 | | 12/1999 | | |
|----|------------|----|---|---------|---|---|
| WO | WO-2006129635 | A1 | | 12/2006 | | |
| WO | WO-2006135958 | A1 | | 12/2006 | | |
| WO | WO-2008128341 | A1 | | 10/2008 | | |
| WO | WO-2008148148 | A1 | | 12/2008 | | |
| WO | WO-2009151639 | A1 | | 12/2009 | | |
| WO | WO-2010143634 | A1 | | 12/2010 | | |
| WO | WO-2011030058 | A1 | * | 3/2011 | ......... | H01M 4/0404 |
| WO | WO-2011084649 | A2 | | 7/2011 | | |
| WO | WO-2011127384 | A1 | | 10/2011 | | |
| WO | WO-2012024499 | A1 | | 2/2012 | | |
| WO | WO-2012088442 | A2 | | 6/2012 | | |

OTHER PUBLICATIONS

Badway, F. et al., "Carbon-Metal Fluoride Nanocomposites: High-Capacity Reversible Metal Fluoride Conversion Materials as Rechargeable Positive Electrodes for Li Batteries," Journal of The Electrochemical Society, 150(10):A1318-A1327 (2003).
Badway, F. et al., "Carbon-Metal Fluoride Nanocomposites," Journal of The Electrochemical Society, 150(9):A1209-A1218 (2003).
Badway, F. et al., "Structure and Electrochemistry of Copper Fluoride Nanocomposites Utilizing Mixed Conducting Matrices," Chem. Mater., 19:4129-4141 (2007).
Bae, C.-H. et al., "Chromium redox couples for application to redox flow batteries," Electrochimica Acta, 48:279-287 (2002).
Bartolozzi, M., "Development of Redox Flow Batteries. A Historical Bibliography," Journal of Power Sources, 27:219-234 (1989).
Bazylak, A. et al., "Improved fuel utilization in microfluidic fuel cells. A computational study," Journal of Power Sources, 143:57-66 (2005).
Bervas, M. et al., "Bismuth Fluoride Nanocomposite as a Positive Electrode Material for Rechargeable Lithium Batteries," Electrochemical and Solid-State Letters, 8(4):A179-A183 (2005).
Bervas, M. et al., "Investigation of the Lithiation and Delithiation Conversion Mechanisms in a Bismuth Fluoride Nanocomposites," Journal of The Electrochemical Society, 153(4):A799-A808 (2006).
Bervas, M. et al., "Reversible Conversion Reactions with Lithium in Bismuth Oxyfluoride Nanocomposites," Journal of The Electrochemical Society, 153(1):A159-A170 (2006).
Cellennium (Thailand) Company Limited, Technology, "Basic Principle of the Vandium Fuel Cell," http://www.vandiumbattery.com/technology.asp, Retrieved from the Internet: Apr. 12, 2009, 2 pages.
Chakrabarti, M. H., "Evaluation of electrolytes for redox flow battery applications," Electrochemica Acta, 52:2189-2195 (2007).
Chan, C. K. et al., "High-performance lithium battery anodes using silicon nanowires," Nature Nanotechnology, 3:31-35 (2008).
Chen, Y.-H. et al., "Porous cathode optimization for lithium cells: Ionic and electronic conductivity, capacity, and selection of materials," Journal of Power Sources, 195 (2010) pp. 2851-2862, Published online: Nov. 13, 2009.
Chen, Y-W D. et al., "Solution Redox Couples for Electrochemical Energy Storage," J. Electrochem. Soc., 128(7):1460-1467 (1981).
Cosandey, F. et al., "EELS Spectroscopy of Iron Fluorides and FeFx/C Nanocomposite Electrodes Used in Li-Ion Batteries," Microscopy and Microanalysis, 13(2):87-95 (2007).
Davidson, P., "New battery packs powerful punch," USA Today, Jul. 4, 2007, 3 pages.
De Boer, P. et al., "Briefing Paper: Flow Batteries," KEMA, Jun. 2007, Leonardo Energy, 9 pages.
De Leon, C. P. et al., "Redox Flow Cells for Energy Conversion," Journal of Power Sources, Sep. 2006, 160(1), pp. 716-732.
Department of Energy Tutorial, "II. Energy Storage Technology Overview," http://www.netl.doe.gov/technolgies/coalpower/fuelcells/seca/tutoriai/TutorialII/files/TutorialII, Courtesy: Energy Storage Association (ESA), 61 pages.
DTI, Regenesys Utility Scale Energy Storage, Project Summary, Contract No. K/EL/00246/00/00, URN No. 04/1048, (2004), 20 pages.

Duduta, M. et al., "Semi-Solid Lithium Rechargeable Flow Battery," Advanced Energy Materials. 1(4):511-516 (2011).
Endo, A. et al., "Electrochemistry of Tris(-diketonato)ruthenium(III) Complexes at Platinum Electrodes in Nonaqueous Solutions and Substituent Effects on their Rreversible Half-Wave Potentials," Bulletin of the Chemical Society of Japan, 62(3):709-716 (1989).
Erol, M. et al., "Assessment of the Degree of Mixedness of Filled Polymers," Intern. Polymer Processing XX, 3:228-237 (2005).
EscoVale Consultancy Services, "Flow/Redox Batteries: Technologies, Applications and Markets," The New Management Report #5061, No date given, 8 pages.
Examination Report for European Application No. 13803965.6 dated May 19, 2021, 5 pages.
Extended European Search Report for European Application No. 13803965.6, mailed Dec. 22, 2015, 8 pages.
"Flow Cell Battery Recharges Power Grid," Advanced Battery Technology, Apr. 2003, http://findarticles.com/p/articles/mi/qa3864/is/200304/ai/n9167647/.pdf, 4 pages.
Garrard, A. et al., "Numerical model of a single phase, regenerative fuel cell," Fuel Cell Science, Engineering and Technology, The Second International Conference on Fuel Cell Science, Jun. 14-16, 2004, Rochester, NY, The American Society of Mechanical Engineers, The Rochester Institute of Technology, p. 79-84.
Giridharan, M. G. et al., "Computational simulation of microfluidics, electrokinetics, and particle transport in biological mems devices," In Proceedings of SPIE, Part of the Symposium on Design, Test, and Microfabrication of MEMS and MOEMS, Paris, France, Mar.-Apr. 1999, pp. 150-160.
"High System-Power Density Flow Battery for Advanced Modular, Energy Storage Technology," Navy SBIR FY2009.1, Proposal No. N091-053-0414, http://www.navysbir.com/09_1/179.htm, Retrieved from the Internet: Apr. 12, 2009, 2 pages.
Hong, C-C et al., "A novel in-plane passive microfluidic mixer with modified Tesla structures," The Royal Society of Chemistry Lab Chip, 4:109-113 (2004).
International Preliminary Report on Patentability for International Application No. PCT/US2009/003551, mailed Dec. 23, 2010, 11 pages.
International Preliminary Report on Patentability for International Application No. PCT/US2010/060876, mailed Jun. 28, 2012, 7 pages.
International Preliminary Report on Patentability for International Application No. PCT/US2011/031748, mailed Oct. 18, 2012, 6 pages.
International Preliminary Report on Patentability for International Application No. PCT/US2011/048266, mailed Feb. 28, 2013, 9 pages.
International Search Report and Written Opinion for International Application No. PCT/US2009/003551, mailed Sep. 21, 2009, 16 pages.
International Search Report and Written Opinion for International Application No. PCT/US2010/030136, mailed Jul. 20, 2010, 8 pages.
International Search Report and Written Opinion for International Application No. PCT/US2010/060876, mailed May 23, 2011, 9 pages.
International Search Report and Written Opinion for International Application No. PCT/US2011/031748, mailed Aug. 24, 2011, 8 pages.
International Search Report and Written Opinion for International Application No. PCT/US2011/048266, mailed Nov. 23, 2011, 11 pages.
International Search Report and Written Opinion for International Application No. PCT/US2011/065615, mailed Apr. 23, 2012, 8 pages.
International Search Report and Written Opinion for International Application No. PCT/US2013/044915, mailed Oct. 31, 2013.
International Search Report and Written Opinion for International Application No. PCT/US2017/013774, mailed Mar. 24, 2017, 7 pages.
Johnson, T. J. et al., "Characterization and optimization of slanted well designs for microfluidic mixing under electroosmotic flow," The Royal Society of Chemistry Lab Chip, 2(3):135-140 (2002).

(56) References Cited

OTHER PUBLICATIONS

Jossen, A. et al., "Advances in redox-flow batteries," First International Renewable Energy Storage Conference, Gelsenkirchen, Germany, Oct. 30-31, 2006, 23 pages.
Katz, E. et al., "Chapter 21: Biochemical Fuel Cells," in Handbook of Fuel Cells—Fundamentals, Technology and Applications, vol. 1: Fundamentals and Survey of Systems, Vielstich et al. (eds.) John Wiley & Sons (2003), 27 pages.
Koo, J. et al., "Liquid flow in microchannels: experimental observations and computational analyses of microfluidics effects," Journal of Micromechanics and Microengineering, 13(5):568-579 (2003).
Kumar, A. et al., "Effect of channel dimensions and shape in the flow-field distributor on the performance of polymer electrolyte membrane fuel cells," Journal of Power Sources, 113:11-18 (2003).
Kuntz, M. T., "Flow battery storage application with wind power," California Energy Commission Staff, Workshop: Meeting California's electricity system challenges through electricity energy storage, Feb. 24, 2005, VRB Power Systems Inc., 15 pages.
Lee, Y. J. et al., "Fabricating Genetically Engineered High-Power Lithium-Ion Batteries Using Multiple Virus Genes," Science, 324:1051-1055 (2009).
Li, H. et al., "Li-Storage via Heterogeneous Reaction in Selected Binary Metal Fluorides and Oxides," Journal of Electrochemical Society, 151(11):A1878-A1885 (2004).
Lithium, U.S. Geological Survey, Mineral Commodity Summaries, Jan. 2010, p. 93.
Li, W. et al., "Rechargeable Lithium Batteries with Aqueous Electrolytes," Science, 264:1115-1118 (1994).
Medeiros, M. G. et al., "Magnesium-Solution Phase Catholyte Semi-Fuel Cell for Undersea Vehicles," Selected papers presented at the International Power Sources Symposium, Journal of Power Sources, 136(2):226-231 (2004) Abstract.
Miley, G. H. et al., "Optimization of the H2O2-NaBH4 Regenerative Fuel Cell for Space Power Applications Using FEMLAB Modeling," Excerpt from the Proceedings of the COMSOL Multiphysics User's Conference, Boston (2005), http://cds.comsol.com/access/dl/papers/1090/Miley.pdf, 6 pages.
Molenda, J. et al., "Modification in the electronic structure of cobalt bronze LixCoO2 and the resulting electrochemical properties," Solid State Ionics, 36:53-58 (1989).
Morikawa, H. et al., "Development and Advances of a V-Flow FC Stack for FCX Clarity," SAE Int. J. Engines, 2(1):955-959 (2009).
Nakahara, K. et al. "Rechargeable batteries with organic radical cathodes," Chemical Physics Letters, 359:351-354 (2002).
Nam, K. T. et al., "Virus-enabled synthesis and assembly of nanowires for lithium ion battery electrodes," Science, 312(5775):885-888 (2006).
Nishide, H. et al., "Organic radical battery: nitroxide polymers as a cathode-active material," Electrochimica Acta, 50:827-831 (2004).
Notice of Reasons for Rejection for Japanese Application No. 2015-517328, mailed Dec. 20, 2019, 9 pages.
Notice of Reasons for Rejection for Japanese Application No. 2015-517328, mailed Jun. 8, 2017, 5 pages.
Notice of Reasons for Rejection for Japanese Application No. 2015-517328, mailed May 7, 2019, 29 pages.
Notice of Reasons for Rejection for Japanese Application No. 2018-120482, mailed Jan. 17, 2020, 4 pages.
Notice of Reasons for Rejection for Japanese Application No. 2018-120482, mailed Jul. 18, 2019, 9 pages.
Notification of the First Office Action for Chinese Application No. 201380039146.0, mailed Jun. 2, 2016, 10 pages.
Notification of the Second Office Action for Chinese Application No. 201380039146.0, mailed Mar. 28, 2017, 7 pages.
Notification of the Third Office Action for Chinese Application No. 201380039146.0, mailed Nov. 16, 2017, 5 pages.
Office Action for U.S. Appl. No. 15/266,054, mailed Apr. 5, 2021, 11 pages.
Office Action for U.S. Appl. No. 15/407,669, mailed Dec. 16, 2020, 5 pages.
Office Action for Canadian Application No. 2,876,416, mailed Apr. 14, 2020, 6 pages.
Office Action for Canadian Application No. 2,876,416, mailed Dec. 15, 2020, 5 pages.
Office Action for Canadian Application No. 2,876,416, mailed Jul. 4, 2019, 4 pages.
Office Action for Canadian Application No. 2,876,416, mailed Mar. 10, 2022, 3 pages.
Office Action for Chinese Application No. 200980127051.8, mailed Aug. 14, 2013, 11 pages.
Office Action for Chinese Application No. 200980127051.8, mailed Dec. 26, 2012, 16 pages.
Office Action for European Application No. 09762935.6, mailed Sep. 27, 2011, 4 pages.
Office Action for European Application No. 13803965.6, mailed Mar. 17, 2020, 4 pages.
Office Action for Japanese Application No. 2011-513506, mailed Jul. 29, 2013, 3 pages.
Office Action for Japanese Application No. 2020-141311, mailed Mar. 31, 2022, 5 pages.
Office Action for Japanese Application No. 2020-141311, mailed Sep. 7, 2021, 5 pages.
Office Action for U.S. Appl. No. 12/970,773, mailed Jun. 13, 2013, 6 pages.
Office Action for U.S. Appl. No. 13/832,861, mailed Dec. 3, 2015, 8 pages.
Office Action for U.S. Appl. No. 13/832,861, mailed Mar. 2, 2015, 9 pages.
Office Action for U.S. Appl. No. 13/872,613, mailed Aug. 26, 2013, 13 pages.
Office Action for U.S. Appl. No. 15/266,054 dated Jan. 25, 2022, 13 pages.
Office Action for U.S. Appl. No. 15/266,054, mailed Jun. 1, 2018, 8 pages.
Office Action for U.S. Appl. No. 15/266,054, mailed Jun. 11, 2019, 9 pages.
Office Action for U.S. Appl. No. 15/266,054, mailed Mar. 16, 2020, 9 pages.
Office Action for U.S. Appl. No. 15/266,054, mailed Oct. 19, 2017, 9 pages.
Office Action for U.S. Appl. No. 15/266,054, mailed Oct. 5, 2020, 11 pages.
Office Action for U.S. Appl. No. 15/407,669, mailed Jan. 27, 2020, 14 pages.
Office Action for U.S. Appl. No. 15/407,669, mailed Jun. 28, 2019, 12 pages.
Office Action for U.S. Appl. No. 15/407,669, mailed Jun. 29, 2020, 12 pages.
Officer, C., "Better rechargable batteries," Anzode (NZ) Ltd., Anzode Clean Energy Solutions, 2009, 13 pages.
Peek, G., "Evaluation of utility scale system," TVA Regenesys Flow Battery Demonstration, Sandia National Laboratories, Oct. 30, 2003, 18 pages.
Pereira, N. et al., "Iron Oxyfluorides as High Capacity Cathode Materials for Lithium Batteries," Journal of The Electrochemical Society, 156(6):A407-A416 (2009).
Pillai, K. C. et al., "Studies on Promising Cell Performance with H2S04 as the Catholyte for Electrogeneration of AG2+ from AG+ in HN03 Anolyte in Mediated Electrochemical Oxidation Process," J. Appl. Electrochem, 39:23-30 (2009).
Plitz, I. et al., "Structure and Electrochemistry of Carbon-Metal Fluoride Nanocomposites Fabricated by a Solid State Redox Conversion Reaction", Journal of The Electrochemical Society, 152(2):A307-A315 (2005).
Plurion Technology Platform, Flow Batteries Vs. Conventional Batteries, Plurion Advantages Webpage, web.archive.org/web/20080514160556/http://plurionsystems.com/tech_flow_advantages.html, Retrieved from the Internet: May 14, 2008, 2 pages.
Plurion Technology Platform, Flow Batteries Vs. Conventional Batteries, Plurion Advantages Webpage, web.archive.org/web/20100623000411/http://plurionsystems.com/tech_flow_advantages.html, Retrieved from the Internet: Jun. 23, 2010, 2 pages.

(56) References Cited

OTHER PUBLICATIONS

Ponce De Leon, C. et al., "Redox flow batteries for energy conversion," Journal of Power Sources, 160(1):716-732 (2006).
Price, A. et al., "The Regenesys Utility-Scale Flow Battery Technology: Flow Battery Technologies for Electrical Energy Storage," VDI Berichte Nr., 1734:47-56 (2002).
Ruffo, R. et al., "Electrochemical behavior of LiCoO2 as aqueous lithium-ion battery electrodes," Electrochemistry Communications, 11:247-249 (2009).
Rydh, C. J. et al., "Energy analysis of batteries in photovoltaic systems," EESAT, San Francisco, CA, Oct. 27-29, 2003, 6 pages.
Rydh, C. J. et al., "Energy analysis of batteries in photovoltaic systems. Part 1: Performance and energy requirements," Energy Conversion and Management, 46:1957-1979 (2005).
Rydh, C. J. et al., "Energy analysis of batteries in photovoltaic systems. Part II: Energy return factors and overall battery efficiencies," Energy Conversion and Management, 46:1980-2000 (2005).
Santos, H. M. et al., Chapter 1: The Power of Ultrasound In: Ultrasound in Chemistry: Analytical Applications, Capelo-Martinez, J-L (Ed.), Wiley-VCH Verlag GmbH & Co. KGaA, Weinhelm, pp. 1-16 (2009).
Skyllas-Kazacos, M., "Efficient Vanadium Redox Flow Cell," Journal of the Electrochemical Society, 134(12):2950-2953 (1987).
Thaller, L. H., "Cleantech Energy Storage Blog: Redox Flow Batteries . . . Then And Now (Part 1 )," posted Sep. 4, 2008, http://www.deeyaenergy.com/blog/bid/5225/Redox-Flow-Batteries-Then-And-Now-Part-1, accessed Apr. 12, 2009, 4 paqes.
Thomas, M. H., "Persistence and progress: The zinc bromine battery," ZBB Energy Corporation, No date given, 27 pages.
Todd, "Mixing of Highly Viscous Fluids, Polymers, and Pastes" 2004, John C. Wiley & Sons, Handbook of Industrial Mixing: Science and Practice, pp. 987-1025. (Year: 2004).
Tour Best Europe Limited, Wetting Agents, [Online], Retrieved from the Internet: URL: http://www.tourbest.eu/wetting-agents/, 2015, 2 pages.
VRB Power Systems Inc., News Release, "USF and Progress Energy Florida Purchase Two 5kW x 4hr VRB Energy Storage Systems," Jul. 25, 2007, 2 pages.
Walsh, F. C., "Electrochemical technology for environmental treatment and clean energy conversion," Pure Appl. Chem., 73(12):1819-1837 (2001).
Wang, H. et al., "Optimizing layout of obstacles for enhanced mixing in microchannels," Smart Materials and Structures, 11(5):662-667 (2002).
Wen, Y. H. et al., "A study of the Fe(III)/Fe(II)-triethanolamine complex redox couple for redox flow battery application," Electrochimica Acta, 51:3769-3775 (2006).
Yamamura, T. et. al., "Enhancements in the electron transfer kinetics of uranium-based redox couples induced by tetraketone ligands with potential chelate effect," Journal of Physical Chemistry, 111:18812-18820 (2007).
Yu, D. Y. W. et al., "Effect of electrode parameters on LiFePO4 cathodes," Journal of The Electrochemical Society, 153(5):A835-A839 (2006).
ZBB Energy Corporation, "The ZBB is the best battery for renewable energy storage!," No date given, 42 pages.
ZBB Energy Corporation, "ZBB Energy aims for sales of up to US$38m in zinc bromine batteries form new Chinese joint venture," Media Release, Mar. 30, 2005, 2 pages.
Extended European Search Report for European Application No. EP20230185432 dated Dec. 22, 2023, 10 pages.
Non-Final Office Action for U.S. Appl. No. 17/227,577 dated Oct. 26, 2023, 13 pages.
Office Action for Japanese Application No. JP2022151417 dated Nov. 14, 2023, 7 pages.
Decision of Rejection for Japanese Application No. 2022-151417 dated Aug. 2, 2024, with English Translation, 7 total pages.
Decision to Grant for Japanese Application No. 2022-151417 mailed Feb. 20, 2025, with English Translation, 5 total pages.

\* cited by examiner

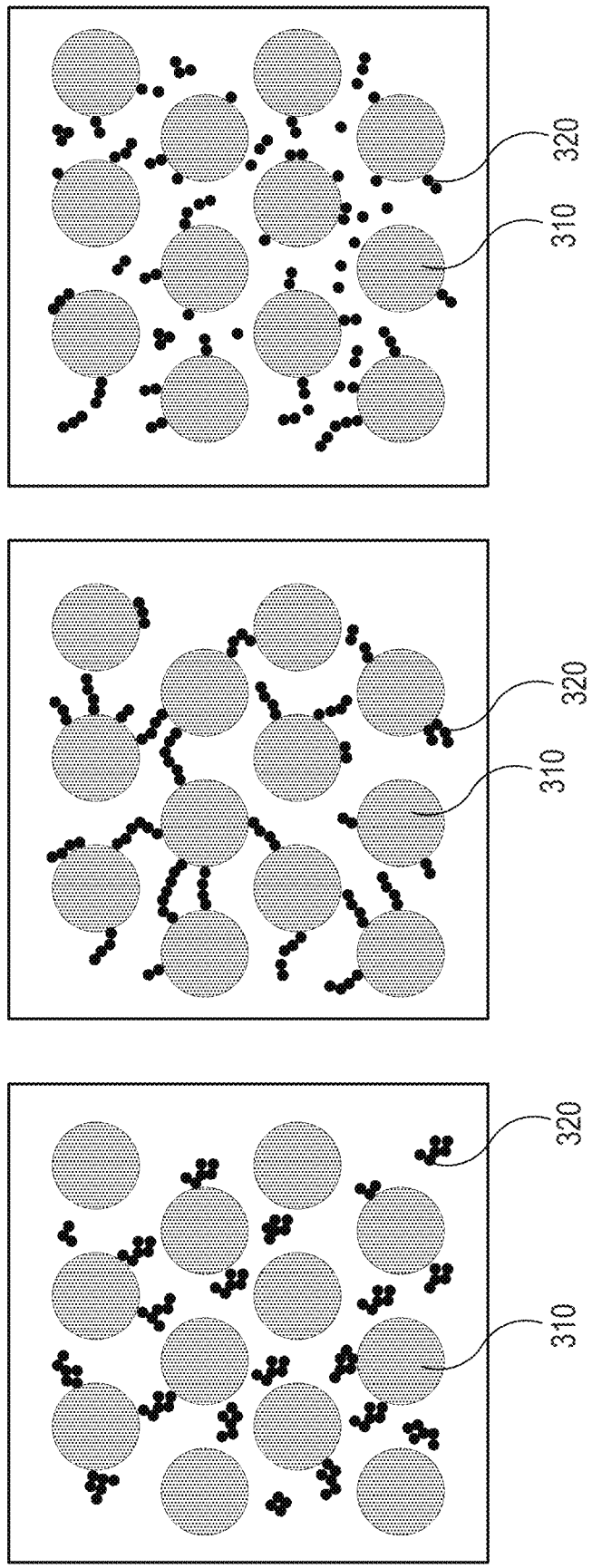

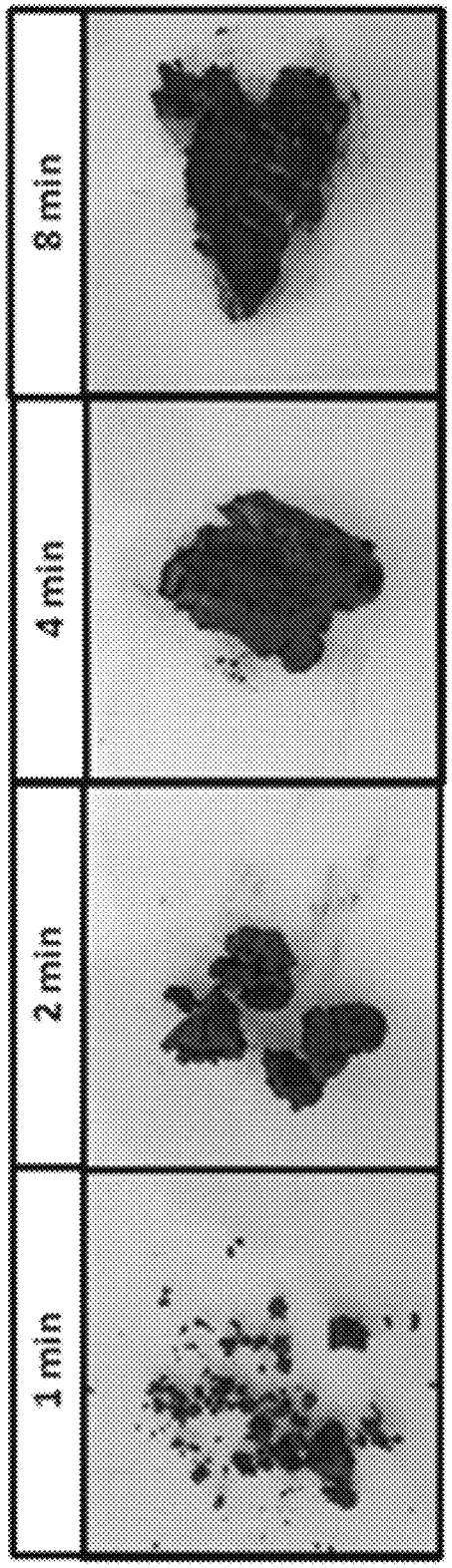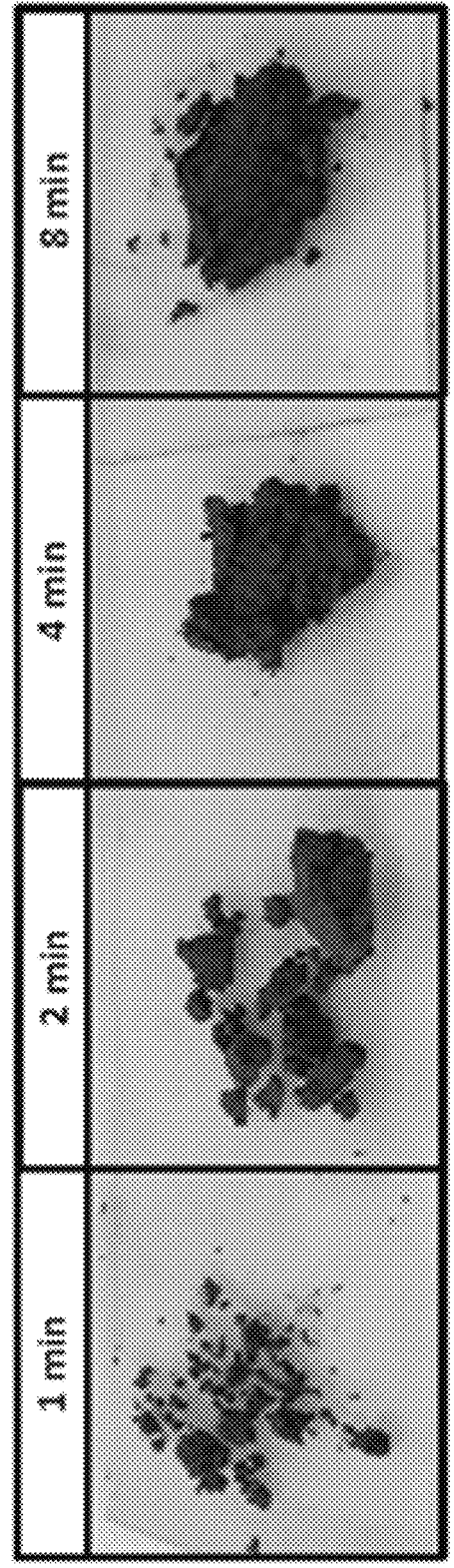
FIG. 31

FIG. 34
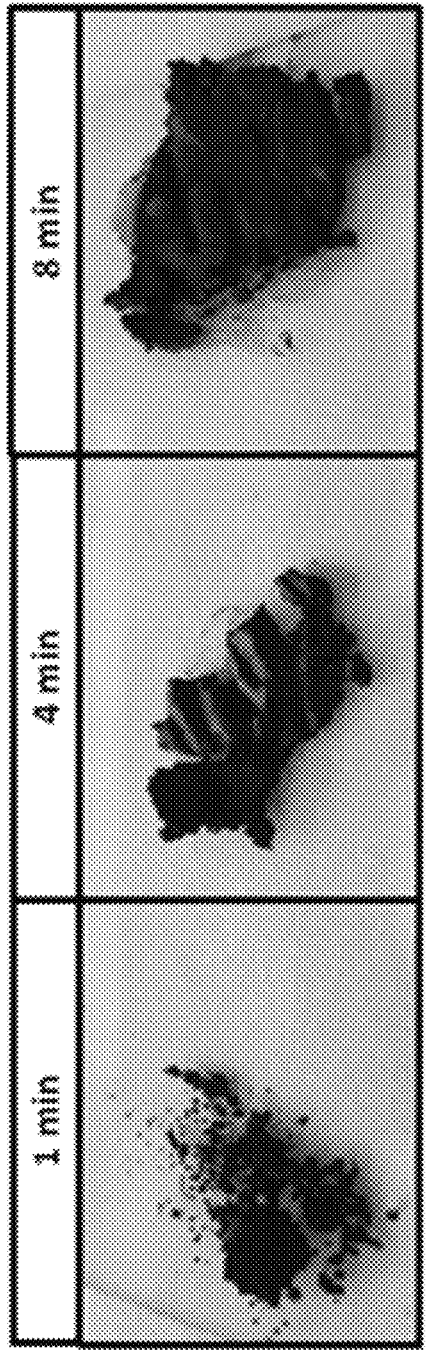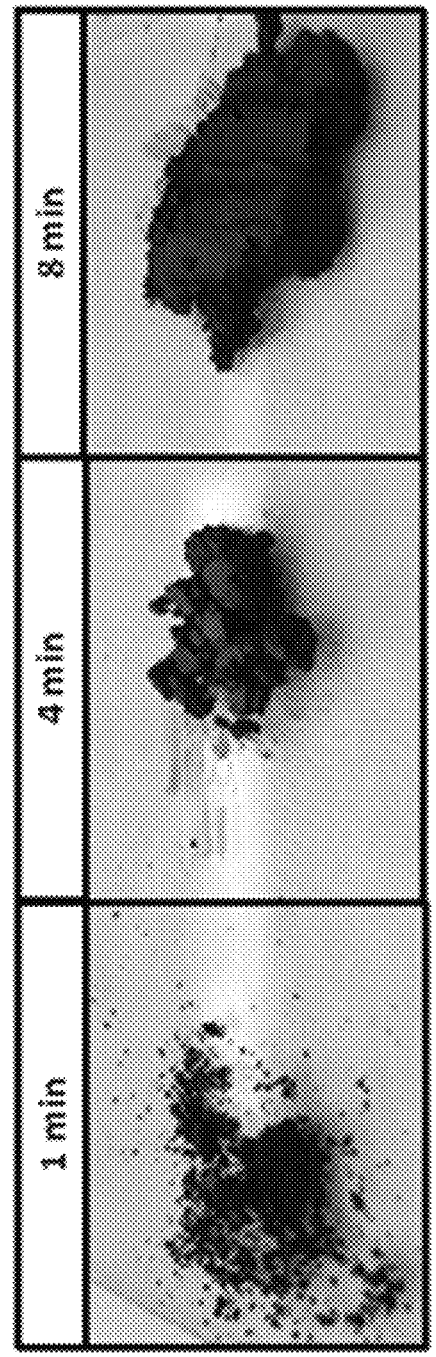

ELECTROCHEMICAL SLURRY COMPOSITIONS AND METHODS FOR PREPARING THE SAME

CROSS-REFERENCE TO RELATED APPLICATIONS

This application is a continuation of U.S. patent application Ser. No. 15/266,054, filed Sep. 15, 2016, which is a continuation of U.S. patent application Ser. No. 13/832,861, filed Mar. 15, 2013, now U.S. Pat. No. 9,484,569, which claims priority to and the benefit of U.S. Provisional Application No. 61/659,248, filed Jun. 13, 2012, U.S. Provisional Application No. 61/659,736, filed Jun. 14, 2012, U.S. Provisional Application No. 61/662,173, filed Jun. 20, 2012, and 61/665,225, filed Jun. 27, 2012, the disclosures of each of which are hereby incorporated by reference in their entirety.

STATEMENT REGARDING FEDERALLY SPONSORED RESEARCH OR DEVELOPMENT

This invention was made with government support under Grant Number DE-AR0000102 awarded by the Department of Energy. The government has certain rights in this invention.

BACKGROUND

Embodiments described herein generally relate to semi-solid suspensions, and more particularly to systems and methods for preparing semi-solid suspensions for use as electrodes in electrochemical devices such as, for example, batteries.

Batteries are typically constructed of solid electrodes, separators, electrolyte, and ancillary components such as, for example, packaging, thermal management, cell balancing, consolidation of electrical current carriers into terminals, and/or other such components. The electrodes typically include active material, conductive material, binders and other additives.

Some known methods for preparing batteries include coating a metallic substrate (e.g., a current collector) with slurry composed of an active material, a conductive additive, and a binding agent dissolved in a solvent, evaporating the solvent, and calendering the dried solid matrix to a specific thickness. The electrodes are then cut, packaged with other components, infiltrated with electrolyte and the entire package is then sealed.

Such known methods generally involve complicated and expensive manufacturing steps such as casting the electrode and are only suitable for electrodes of limited thickness, e.g., less than 100 μm. These known methods for producing electrodes of limited thickness result in batteries with lower capacity, lower energy density, and a high ratio of inactive components to active material. Furthermore, the binders used in known electrode formulations can increase tortuosity and decrease the ionic conductivity of the electrode. Thus, it is an enduring goal of energy storage systems development to simplify and reduce manufacturing cost, reduce inactive components in the electrodes and finished battery and increase performance.

SUMMARY

Embodiments described herein generally relate to semi-solid suspensions, and more particularly to systems and methods for preparing semi-solid suspensions for use as electrodes in electrochemical devices such as, for example, batteries. In some embodiments, a method for preparing a semi-solid electrode includes combining a quantity of an active material with a quantity of an electrolyte to form an intermediate material. The intermediate material is then combined with a conductive additive to form an electrode material. The electrode material is mixed to form a suspension having a mixing index of at least about 0.80 and is then formed into a semi-solid electrode.

BRIEF DESCRIPTION OF THE DRAWINGS

FIGS. 3A-3C and FIGS. 4A-4C are schematic illustrations of semi-solid suspensions, according to various embodiments.

FIG. 31 depicts two anode compositions and four different mixing durations.

FIG. 34 depicts two cathode compositions and three different mixing durations.

DETAILED DESCRIPTION

Figure 1:
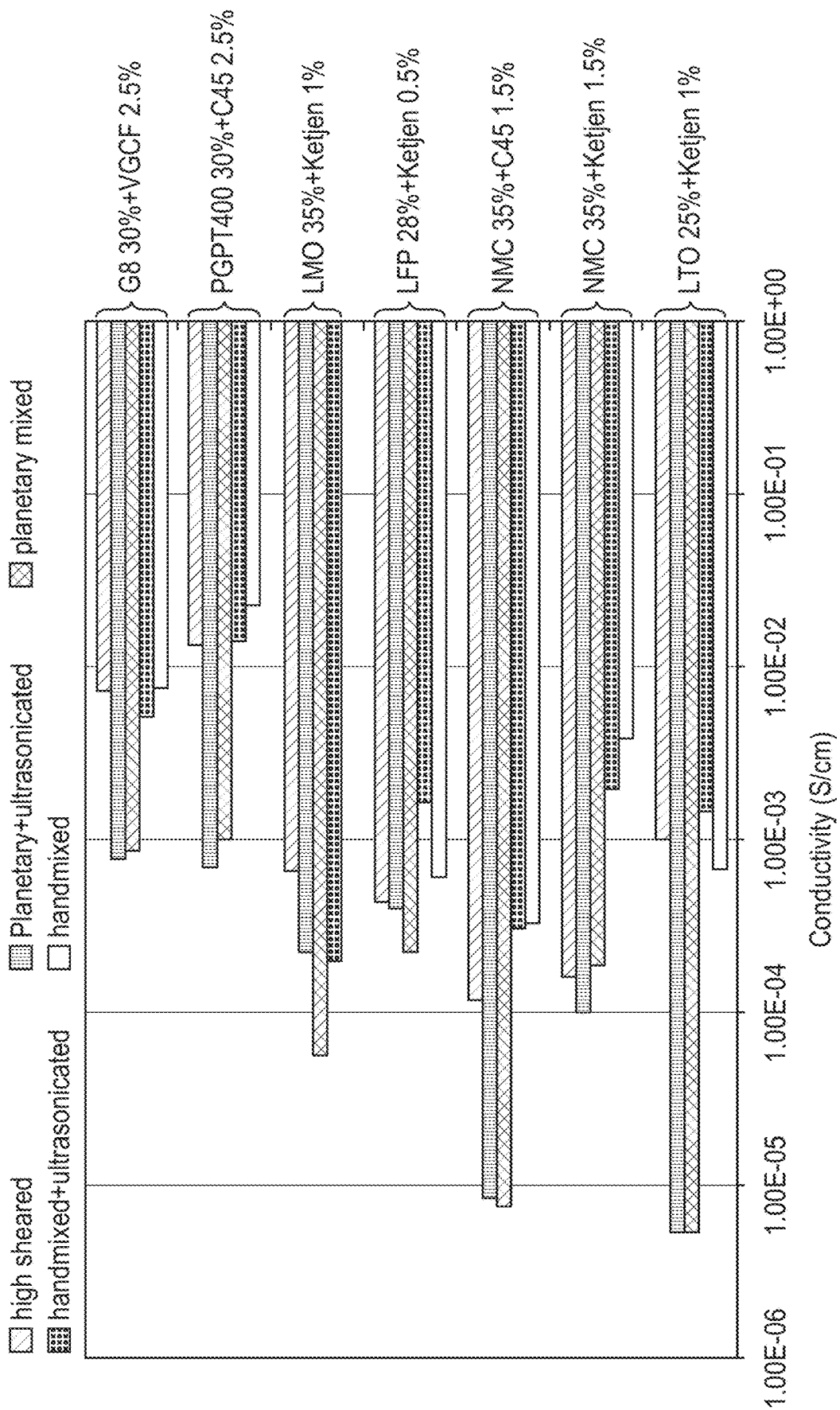
FIG. 1 is a plot showing the effect of mixing methods on conductivity of semi-solid electrodes for a range of compositions, according to various embodiments.

Embodiments described herein generally relate to semi-solid suspensions, and more particularly to systems and methods for preparing semi-solid suspensions for use as electrodes in electrochemical devices such as, for example, batteries. In some embodiments, a method for preparing a semi-solid electrode includes combining a quantity of an active material with a quantity of an electrolyte to form an intermediate material. The intermediate material is then combined with a conductive additive to form an electrode material. The electrode material is mixed to form a suspension having a mixing index of at least about 0.80 and is then formed into a semi-solid electrode.

Consumer electronic batteries have gradually increased in energy density with the progress of the lithium-ion battery. The stored energy or charge capacity of a manufactured battery is a function of: (1) the inherent charge capacity of the active material (mAh/g), (2) the volume of the electrodes ($cm^3$) (i.e., the product of the electrode thickness, electrode area, and number of layers (stacks)), and (3) the loading of active material in the electrode media (e.g., grams of active material per $cm^3$ of electrode media). Therefore, to enhance commercial appeal (e.g., increased energy density and decreased cost), it is generally desirable to increase the areal charge capacity ($mAh/cm^2$) of electrodes. One way to accomplish increasing the areal charge capacity, and therefore reducing the relative percentage of inactive components, is by increasing the thickness of the electrodes. Conventional electrode compositions that use binders however, cannot be made thicker than about 200 μm, because conventional electrode manufactured using the casting and high speed roll-to-roll calendering process tend to crack and/or delaminate upon drying from the flat current collectors if they are made thicker than 200 μm. Additionally, thicker electrodes have higher cell impedance, which reduces energy efficiency (e.g., as described in Yu et al "Effect of electrode parameters on $LiFePO_4$ cathodes", *J. Electrochem. Soc.* Vol. 153, A835-A839 (2006)).

Embodiments of semi-solid electrode compositions and methods of preparation described herein can be manufactured directly with the semi-solid suspension, thereby avoiding the use of conventional binding agents and the electrode casting, drying, and calendering steps altogether. Some benefits of this approach include, for example: (i) simplified manufacturing with less equipment (i.e., less capital intensive), (ii) the ability to manufacture electrodes of different thicknesses (e.g., by simply changing a forming die dimension), (iii) processing of thicker (>200 μm) and higher capacity ($mAh/cm^2$) electrodes, thereby decreasing the volume, mass, and cost contributions of inactive components with respect to active material, and (iv) the elimination of binding agents (e.g., PVdF), thereby reducing tortuosity and increasing ionic conductivity of the electrode, as well as increasing safety by excluding binders that can contribute to exothermic reactions. Examples of battery architectures utilizing semi-solid suspensions are described in International Patent Publication No. WO 2012/024499, entitled "Stationary, Fluid Redox Electrode," International Patent Publication No. WO 2012/088442, entitled "Semi-Solid Filled Battery and Method of Manufacture," U.S. patent application Ser. No. 13/607,021, entitled "Stationary Semi-Solid Battery Module and Method of Manufacture," and U.S. patent application Ser. No. 13/606,986, entitled "Semi-Solid Electrode Cell Having a Porous Current Collector and Methods of Manufacture," the entire disclosure of each of which is hereby incorporated by reference.

As described herein, the term "about" generally means plus or minus 10% of the value stated, e.g. about 5 would include 4.5 to 5.5, about 10 would include 9 to 11, about 100 would include 90 to 110.

Embodiments described herein relate generally to electrochemical devices such as, for example, lithium ion batteries, however, the systems, methods and principles described herein are applicable to all devices containing electrochemically active media. Said another way, any electrodes and/or devices including at least an active material (source or sink of charge carriers), an electronically conducting additive, and an ionically conducting media (electrolyte) such as, for example, batteries, capacitors, electric double-layer capacitors (e.g., Ultracapacitors), pseudo-capacitors, etc., are within the scope of this disclosure.

In some embodiments, a method of preparing a semi-solid electrode (also referred to herein as "semi-solid suspension" and/or "slurry" electrode) can include combining a quantity of an active material with a quantity of an electrolyte to form an intermediate material. The intermediate material is combined with an electrolyte and mixed to form an electrode material. The electrode material is mixed until a substantially stable suspension forms that has a mixing index of at least about 0.8, at least about 0.9, at least about 0.95, or at least about 0.975, inclusive of all ranges therebetween. In some embodiments, the electrode material is mixed until the electrode material has an electronic conductivity of at least about $10^{-6}$ S/cm, at least about $10^{-5}$ S/cm, at least about $10^{-4}$ S/cm, at least about $10^{-3}$ S/cm, or at least about $10^{-2}$ S/cm, inclusive of all ranges therebetween. In some embodiments, the electrode material is mixed until the electrode material has an apparent viscosity of less than about 100,000 Pa-s, less than about 10,000 Pa-s, or less than about 1,000 Pa-s, at an apparent shear rate of about 1,000 $s^{-1}$, inclusive of all ranges therebetween. In some embodiments, the quantity of active material included in the electrode material can be about 20% to about 75% by volume, about 40% to about 75% by volume, or about 60% to about 75% by volume, inclusive of all ranges therebetween. In some embodiments, the quantity of electrolyte included in the electrode material can be about 25% to about 70% by volume, about 30% to about 50% by volume, or about 20% to about 40% by volume, inclusive of all ranges therebetween. In some embodiments, the quantity of conductive material included in the electrode material can be about 0.5% to about 25% by volume, or about 1% to about 6% by volume, inclusive of all ranges therebetween.

In some embodiments, the mixing of the electrode material can be performed with, for example, any one of a high shear mixer, a planetary mixer, a centrifugal planetary mixture, a sigma mixture, a CAM mixture and/or a roller mixture. In some embodiments, the mixing of the electrode material can supply a specific mixing energy of at least about 90 J/g, at least about 100 J/g, about 90 J/g to about 150 J/g, or about 100 J/g to about 120 J/g, inclusive of all ranges therebetween.

In some embodiments, electroactive materials for the positive electrode in a lithium system include the general family of ordered rocksalt compounds $LiMO_2$ including those having the $\alpha$-$NaFeO_2$ (so-called "layered compounds") or orthorhombic-$LiMnO_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, $Li(Ni, Co, Al)O_2$ (known as "NCA") and $Li(Ni, Mn, Co)O_2$ (known as "NMC"). Other families of exemplary electroactive materials includes those of spinel structure, such as $LiMn_2O_4$ and its derivatives, so-called "layered spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds such as $LiVPO_4F$, other "polyanion" compounds as described below, and vanadium oxides $V_xO_y$ including $V_2O_5$ and $V_6O_{11}$.

In some embodiments, the active material comprises a transition metal polyanion compound, for example as described in U.S. Pat. No. 7,338,734. In one or more embodiments the active material comprises an alkali metal transition metal oxide or phosphate, and for example, the compound has a composition $A_x(M'_{1-a}M''_a)y(XD_4)_z$, $A_x(M'_{1-a}M''_a)y(DXD_4)_z$, or $A_x(M'_{1-a}M''_a)y(X_2D_7)_z$, and have values such that x, plus y(1-a) times a formal valence or valences of M', plus ya times a formal valence or valence of M'', is equal to z times a formal valence of the $XD_4$, $X_2D_7$, or $DXD_4$ group; or a compound comprising a composition $(A_{1-a}M''_a)_xM'y(XD_4)_z$, $(A_{1-a}M''_a)_xM'_y(DXD_4)_z(A_{1-a}M''_a)_x$ $M'y(X_2D_7)_z$ and have values such that (1-a)x plus the quantity ax times the formal valence or valences of M'' plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material comprises a thermally stable, transition-metal-doped lithium transition metal phosphate having the olivine structure and having the formula $(Li_{1-x}I_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In some embodiments, the lithium transition metal phosphate material has an overall composition of $Li_{1-x-z}M_{1+z}PO4$, where M comprises at least one first row transition metal selected from the group consisting of Ti, V, Cr, Mn, Fe, Co and Ni, where x is from 0 to 1 and z can be positive or negative. M includes Fe, z is between about 0.15 and −0.15. The material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where x≥0.8, or x≥0.9, or x≥0.95.

In some embodiments, the redox-active electrode material comprises a metal salt that stores an alkali ion by undergoing a displacement or conversion reaction. Examples of such compounds include metal oxides such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments the redox-active electrode material comprises carbon monofluoride or its derivatives. In some embodiments the material undergoing displacement or conversion reaction is in the form of particulates having on average dimensions of 100 nanometers or less. In some embodiments the material undergoing displacement or conversion reaction comprises a nanocomposite of the active material mixed with an inactive host.

In some embodiments, slurry components can be mixed in a batch process e.g., with a batch mixer that can include, e.g., a high shear mixture, a planetary mixture, a centrifugal planetary mixture, a sigma mixture, a CAM mixture, and/or a roller mixture, with a specific spatial and/or temporal ordering of component addition, as described in more detail herein. In some embodiments, slurry components can be mixed in a continuous process (e.g. in an extruder), with a specific spatial and/or temporal ordering of component addition.

In some embodiments, process conditions (temperature; shear rate or rate schedule; component addition sequencing, location, and rate; mixing or residence time) can be selected and/or modified to control the electrical, rheological, and/or compositional (e.g., uniformity) properties of the prepared slurry. In some embodiments, the mixing element (e.g., roller blade edge) velocity can be between about 0.5 cm/s and about 50 cm/s. In some embodiments, the minimum gap between which fluid is being flowed in the mixing event (e.g. distance from roller blade edge to mixer containment wall) can be between about 0.05 mm and about 5 mm. Therefore, the shear rate (velocity scale divided by length scale) is accordingly between about 1 and about 10,000 inverse seconds. In some embodiments the shear rate can be less than 1 inverse second, and in others it is greater than 10,000 inverse seconds.

In some embodiments, the process conditions can be selected to produce a prepared slurry having a mixing index of at least about 0.80, at least about 0.90, at least about 0.95, or at least about 0.975. In some embodiments, the process conditions can be selected to produce a prepared slurry having an electronic conductivity of at least about $10^{-6}$ S/cm, at least about $10^{-5}$ S/cm, at least about $10^{-4}$ S/cm, at least about $10^{-3}$ S/cm, or at least about $10^{-2}$ S/cm. In some embodiments, the process conditions can be selected to produce a prepared slurry having an apparent viscosity at room temperature of less than about 100,000 Pa-s, less than about 10,000 Pa-s, or less than about 1,000 Pa-s, all at an apparent shear rate of 1,000 $s^{-1}$. In some embodiments, the process conditions can be selected to produce a prepared slurry having two or more properties as described herein.

The mixing and forming of a semi-solid electrode generally includes: (i) raw material conveyance and/or feeding, (ii) mixing, (iii) mixed slurry conveyance, (iv) dispensing and/or extruding, and (v) forming. In some embodiments, multiple steps in the process can be performed at the same time and/or with the same piece of equipment. For example, the mixing and conveyance of the slurry can be performed at the same time with an extruder. Each step in the process can include one or more possible embodiments. For example, each step in the process can be performed manually or by any of a variety of process equipment. Each step can also include one or more sub-processes and, optionally, an inspection step to monitor process quality.

Raw material conveyance and/or feeding can include: batch based manual weighing of material with natural feeding (e.g., allowing the mixer to accept material into the mixture without external force), batch based manual weighing of material with forced feeding either by a piston mechanism or a screw-based "side stuffer," gravimetric screw solids feeders with natural feeding (e.g., feed at the rate which the mixer can naturally accept material), gravimetric screw solids feeders with forced feeding (e.g., units sold by Brabender Industries Inc combined with a piston mechanism or a screw-based 'side stuffer'), and/or any other suitable conveyance and/or feeding methods and/or any suitable combination thereof.

In some embodiments, for example after mixing, the slurry can be conveyed and/or pressurized, for example using a piston pump, peristaltic pump, gear/lobe pump, progressing cavity pump, single screw extruder, conveying section of a twin screw extruder, and/or any other suitable conveying device. In some embodiments, the torque and/or power of the conveying device, the pressure at the conveying device exit, the flow rate, and/or the temperature can be measured, monitored and/or controlled during the conveying and/or pressurizing.

In some embodiments, for example after conveying and/or pressurizing, the slurry can be dispensed and/or extruded. The slurry can be dispensed and/or extruded using, for example, a "hanger die" sheet extrusion die, a "winter manifold" sheet extrusion die, a profile-style sheet extrusion die, an arbitrary nozzle operable to apply a continuous stream of material to a substrate, injection into a mold of the correct size and shape (e.g., filling a pocket with material), and/or any other suitable dispensing device.

In some embodiments, after dispensing the slurry can be formed into a final electrode. For example, the slurry can be calendar roll formed, stamped and/or pressed, subjected to vibrational settling, and/or cut in discrete sections. Additionally, in some embodiments, unwanted portions of material can be removed (e.g., masking and cleaning) and optionally recycled back into the slurry manufacturing process.

The systems, mixing equipment, processes and methods described herein can be used to produce a semi-solid suspension (e.g., slurry) suitable for use in electrochemical devices (e.g., batteries). The semi-solid suspension produced by such systems and methods are suitable for the formulation of a slurry-based electrodes with particular properties, for example, rheology, conductivity, and electrochemical performance. For example, some suitable mixing devices include batch mixers, such as, e.g., higher shear mixer, planetary mixer, centrifugal planetary mixture, sigma mixture, CAM mixture or roller mixture, C. W. Brabender or Banburry® style mixture, continuous compounding devices such as ported single or twin screw extruders (e.g., Leistritz, Haake), high shear mixers such as blade-style blenders, high speed kneading machines, and/or rotary impellers. In some embodiments, the mixing device can be operable to control the flowability of the slurry regulating the temperature, and/or to control the slurry homogeneity by modulating the chemical composition.

In embodiments in which a batch mixer is used to mix the semi-solid suspension, the semi-solid suspension can be transferred from the batch mixer to another piece of processing equipment, e.g., an extruder. In such embodiments, the transfer method can be chosen so as to minimize electrolyte losses, to not appreciably disrupt the slurry state, and/or to not introduce other processing difficulties, such as entrainment of ambient gases. In embodiments in which an extruder (e.g., twin screw) is used to mix the semi-solid suspension, mixing and material conveyance occur together, thus eliminating a process step.

In some embodiments, some electrolyte loss can be tolerated and used as a control specification, and the amount that can be tolerated generally decreases as electrolyte volume fraction increases and/or mixing index increases. For example, at a mixing index of 0.8, the maximum electrolyte loss can be controlled to less than about 39%, to less than about 33%, or to less than about 27%. At a mixing index of 0.9, the maximum electrolyte loss can be controlled to less than about 5%, to less than about 4%, or to less than about 3%. At mixing indices higher than 0.9, the maximum electrolyte loss can be controlled to less than about 5%, to less than about 4%, or to less than about 3%. Component concentrations can be calculated to determine and/or predict tolerable losses, and vary according to the specific components. In other embodiments, loss tolerances will be higher while in others they will be more restrictive.

In some embodiments, the composition of the slurry and the mixing process can be selected to homogeneously disperse the components of the slurry, achieve a percolating conductive network throughout the slurry and sufficiently high bulk electrical conductivity, which correlates to desirable electrochemical performance as described in further detail herein, to obtain a rheological state conducive to processing, which may include transfer, conveyance (e.g., extrusion), dispensing, segmenting or cutting, and post-dispense forming (e.g., press forming, rolling, calendering, etc.), or any combination thereof.

Figure 2:
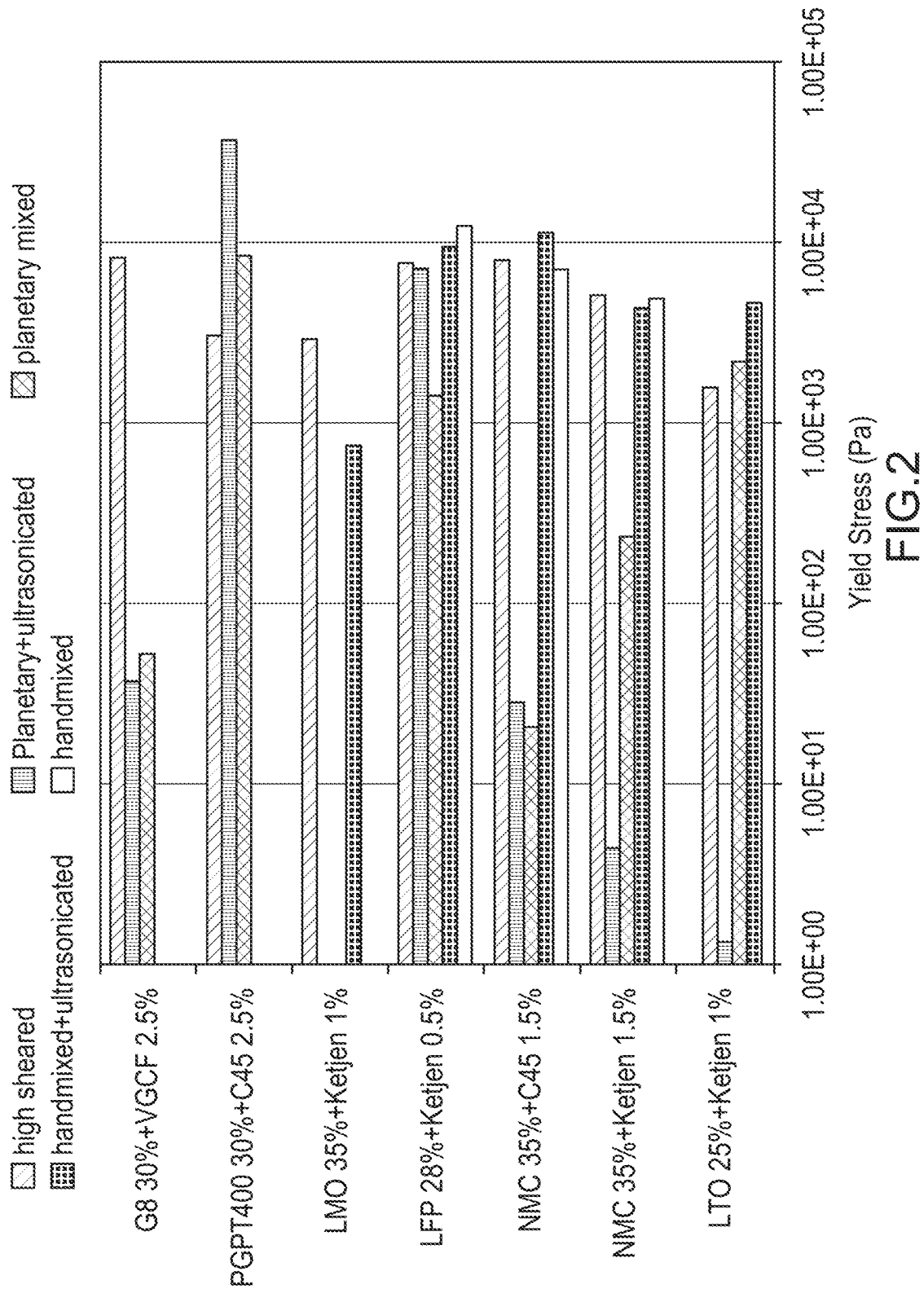
FIG. 2 is a plot showing the effect of mixing methods on yield stress of semi-solid electrodes for a range of compositions, according to various embodiments.

For example, FIG. 1 illustrates the electronic conductivity of different slurry formulations and FIG. 2 illustrates the yield stress, a rheological parameter, of the same slurry formulations, prepared using a variety of mixing methods including high sheared mixing, planetary mixing, planetary mixing with ultrasonication, handmixing, and handmixing with ultrasonication. As illustrated in FIG. 1 and FIG. 2, there can be significant variation in the conductivity and yield stress of the slurry formulations when they are prepared using the different mixing methods which demonstrates that mixing methods can have an effect on at least some of the characteristics and/or performance measures of different slurry formulations. In some embodiments, the mixing method can be selected to achieve one or more desired characteristic of the final prepared slurry. In some embodiments, maximizing a performance measure is not always the most desirable characteristic of the final prepared slurry. Said another way, although producing a slurry having a high electronic conductivity is generally desirable, if the final slurry is not readily formable and/or stable, the high electronic conductivity for that particular slurry would not be beneficial. Similarly, producing a slurry that is easily formable and/or very stable, but with a low electronic conductivity is also not desirable.

During mixing, the compositional homogeneity of the slurry will generally increase with mixing time, although the microstructure of the slurry may be changing as well. The compositional homogeneity of the slurry suspension can be evaluated quantitatively by an experimental method based on measuring statistical variance in the concentration distributions of the components of the slurry suspension. For example, mixing index is a statistical measure, essentially a normalized variance or standard deviation, describing the degree of homogeneity of a composition. (See, e.g., Erol, M, & Kalyon, D. M., *Assessment of the Degree of Mixedness of Filled Polymers*, Intern. Polymer Processing XX (2005) 3, pps. 228-237). Complete segregation would have a mixing index of zero and a perfectly homogeneous mix a mixing index of one. Alternatively, the homogeneity of the slurry can be described by its compositional uniformity (+x %/−y %), defined herein as the range: (100%−y)*C to (100%+x)*C. All of the values x and y are thus defined by the samples exhibiting maximum positive and negative deviations from the mean value C, thus the compositions of all mixed material samples taken fall within this range.

The basic process of determining mixing index includes taking a number of equally and appropriately sized material samples from the aggregated mix and conducting compositional analysis on each of the samples. The sampling and analysis can be repeated at different times in the mixing process. The sample size and volume is based on considerations of length scales over which homogeneity is important, for example, greater than a multiple of both the largest solid particle size and the ultimate mixed state average intra-particle distance at the low end, and 1/Nth of the total volume where N is the number of samples at the high end. Optionally, the samples can be on the order of the electrode thickness, which is generally much smaller than the length and width of the electrode. Capabilities of certain experimental equipment, such as a thermo-gravimetric analyzer (TGA), will narrow the practical sample volume range further. Sample "dimension" means the cube root of sample volume. For, example, a common approach to validating the sampling (number of samples) is that the mean composition of the samples corresponding to a given mixing duration matches the overall portions of material components introduced to the mixer to a specified tolerance. The mixing index at a given mixing time is defined, according to the present embodiments, to be equal to $1-\sigma/\sigma_{ref}$, where $\sigma$ is the standard deviation in the measured composition (which may be the measured amount of any one or more constituents of the slurry) and $\sigma_{ref}$ is equal to $[C(1-C)]^{1/2}$, where C is the mean composition of the N samples, so as the variation in sample compositions is reduced, the mixing index approaches unity. It should be understood in the above description that "time" and "duration" are general terms speaking to the progression of the mixing event. Other indicators of mixing such as, for example, cumulative energy input to the mix, number of armature, roller, mixing blade, or screw rotations, distance traveled by a theoretical point or actual tracer particle in the mix, temperature of the mix (which is affected by viscous heating), certain dimensionless numbers commonly used in engineering analysis, and others can be used to predict or estimate how well the slurry is mixed.

In one embodiment, a total sample volume of 43 cubic centimeters containing 50% by volume active material powder with a particle size distribution with D50=10 um and D90=15 um, and 6% by volume conductive additive agglomerates powder with D50=8 um and D90=12 um in organic solvent is prepared. This mixture can be used to build electrodes with an area of 80 $cm^2$, and a thickness of 500 μm. The sample dimension should be larger than the larger solid particle size, i.e., 15 μm, and also the larger mixed state intra-particle length scale, i.e., about 16 μm, by a predetermined factor. With a target of N=14 samples, the sample dimension should be less than 2,500 μm. The specific dimension of interest is in the middle of this range, i.e., 500 μm. Accordingly, to quantify mixing index, the samples are taken with a special tool having a cylindrical sampling cavity with a diameter of 0.5 mm and a depth of 0.61 mm. In this example, the sample volume would be 0.12 $mm^3$.

In some embodiments, the sample volume selection for mixing index measurement is guided by length scales over which uniformity is important. In some embodiments, this length scale is the thickness (e.g., 250 μm to 2,000 μm) of an electrode in which the slurry will be used. For example, if the electrode is 0.5 mm thick, the sample volume should preferably be on the order of $(0.5\ mm)^3=0.125\ mm^3$, i.e. between about 0.04 $mm^3$ and about 0.4 $mm^3$. If the electrode is 0.2 mm thick, the sample volume should preferably be between 0.0025 and 0.025 $mm^3$. If the electrode is 2.0 mm thick, the sample volume should preferably be between 2.5 $mm^3$ and 25 $mm^3$. In some embodiments, the sample volume by which mixing index is evaluated is the cube of the electrode thickness ±10%. In some embodiments, the sample volume by which mixing index is evaluated is 0.12 $mm^3$±10%. In one embodiment, the mixing index is measured by taking N samples where N is at least 9, each sample having the sample volume, from a batch of the electrode slurry or from a formed slurry electrode that has a volume greater than the total volume of the N samples. Each of the sample volumes is heated in a thermo gravimetric analyzer (TGA) under flowing oxygen gas according to a time-temperature profile wherein there is 3 minute hold at room temperature, followed by heating at 20° C./min to 850° C., with the cumulative weight loss between 150° C. and 600° C. being used to calculate the mixing index. Measured in this manner, the electrolyte solvents are evaporated and the measured weight loss is primarily that due to pyrolysis of carbon in the sample volume.

In some embodiments, a Brabender Batch Mixer can be used to mix the slurry at 30 to 100 rpm. In some embodiments, the slurry can be mixed at 10-200 rpm or any other suitable speed. In some embodiments, the speed of the mixer can be varied throughout the mix cycle, for example, a lower mix speed can be used to incorporate the ingredients, and a higher mix speed can be used to homogenize the slurry. In some embodiments, the mixing speed can be varied during the addition of the ingredients. In some embodiments, the total mix time can be between 1 and 100 minutes. In other embodiments, any appropriate mix time can be selected. In some embodiments, the mixer can supply a specific mixing energy of between 3 and 2,000 J/g. In other embodiments, the mixer can supply any suitable amount of mixing energy.

As described herein, conductive additives can have technical characteristics and morphologies (i.e., hierarchical clustering of fundamental particles) that influence their dispersive and electrochemical behavior in dynamic and/or static suspensions. Characteristics that can influence dispersive and electrochemical behavior of conductive additives include surface area and bulk conductivity. For example, in the case of certain conductive carbon additives, morphological factors can impact the dispersion of the carbon particles. The primary carbon particles have dimensions on the order of nanometers, the particles typically exist as members of larger aggregates, consisting of particles either electrically bound (e.g., by van der Waals forces) or sintered together. Such agglomerates may have dimensions on the order of nanometers to microns. Additionally, depending on the surface energies of the particles, environment, and/or temperature, aggregates can form larger scale clusters commonly referred to as agglomerates, which can have dimensions on the order of microns to tens of microns.

When such conductive additives are included in a slurry, fluid shearing forces, e.g., imparted during mixing, can disrupt the carbon network, for example, by overcoming agglomerate and aggregate binding forces. By disrupting the conductive network, the additives can be present in a finer scale (more granular and more homogeneous) dispersion of the conductive solid. Mixing can also densify clusters of the conductive solid. In some embodiments, mixing can both disrupt the conductive network and densify clusters, which can sever electrical conduction pathways and adversely impact electrochemical performance.

FIG. 3A-3C are schematic diagrams of an electrochemically active slurry containing active material 310 and conductive additive 320 in which the quantity of the conductive additive 320 is not enough to form a conductive network. FIG. 3A depicts a slurry before any mixing energy has been applied or after only minimal mixing energy has been applied. FIG. 3B depicts the slurry with an optimal amount of mixing energy applied and FIG. 3C depicts the slurry with an excessive amount of mixing energy applied. As illustrated in FIG. 3B even with the optimal amount of mixing, the amount of conductive additive 320 is not adequate to create an appreciable conductive network throughout the electrode volume.

Figure 4C:
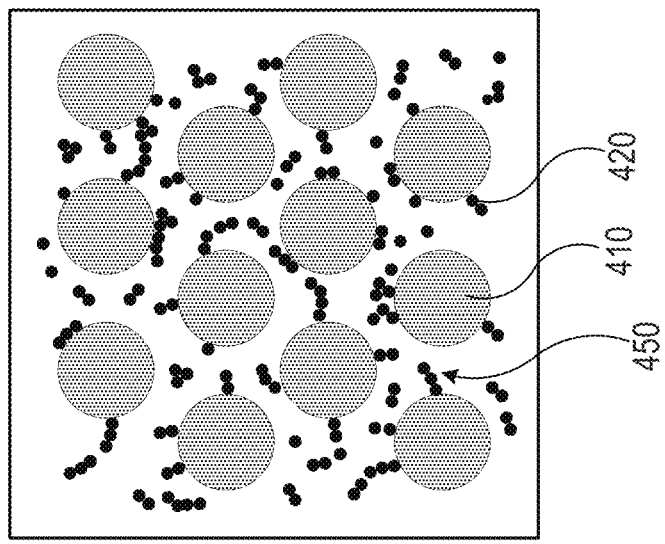
Figure 4B:
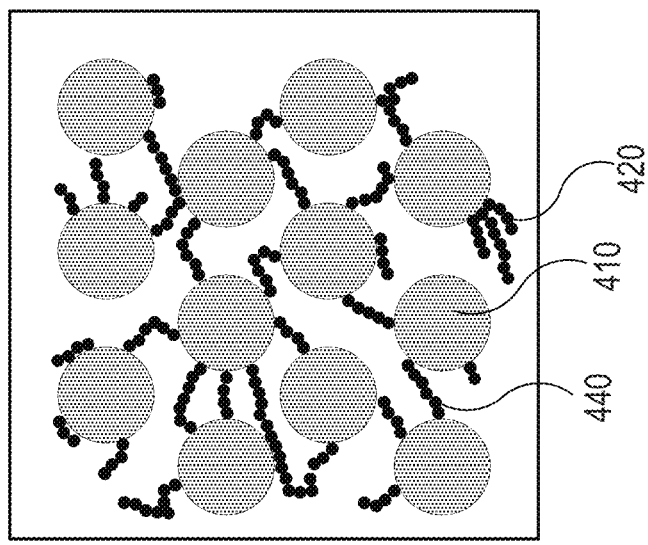
Figure 4A:
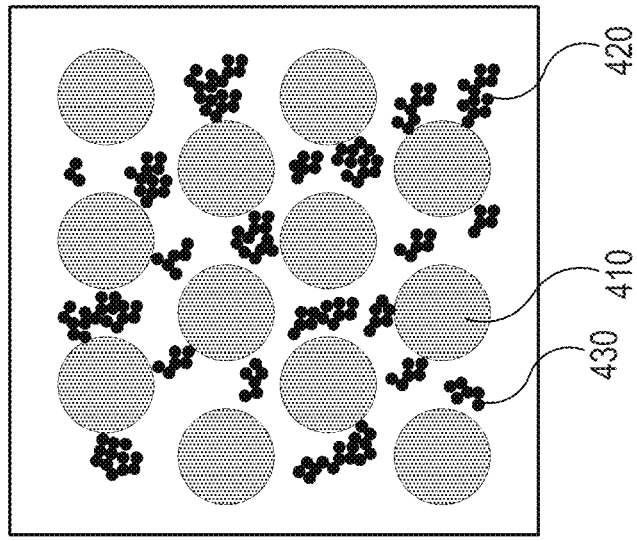

FIG. 4A-4C are schematic diagrams of an electrochemical active slurries containing an active material 410 and conductive additive 420. Contrary to FIG. 3A-C, in this example the quantity of the conductive additive 420 is enough to form a conductive network. As shown in FIG. 4A, the conductive additive 420 is largely in the form of unbranched agglomerates 430. The homogeneity of the conductive additive 420 could be characterized as non-uniform at this stage. As shown in FIG. 4B, the agglomerates 430 have been "broken up" by fluid shearing and/or mixing forces and have created the desired "wiring" of the conductive additive agglomerate 440 interparticle network (also referred to herein as "conductive pathway"). As shown in FIG. 4C, the conductive network has been disrupted by over mixing and the conductive additive 420 is now in the from of broken and/or incomplete (or non-conductive) pathways 450. Thus, FIGS. 3A-3C and FIGS. 4A-4C illustrate that an electrochemically active slurry can include a minimum threshold of conductive additive 320/420 loading, and an optimal processing regime between two extremes (i.e., the slurry depicted in FIG. 4B). By selecting an appropriate loading of conductive additive 320/420 and processing regime, a semi-solid suspension can be formed having an appreciable conductive interparticle network (e.g., conductive additive agglomerate 440 network). In some embodiments, the specific mixing energy applied can be about 90 J/g to about 150 J/g, e.g., at least about 90 J/g, at least about 100 J/g, at least about 120 J/g or at least about 150 J/g inclusive off all ranges therebetween.

Figure 5:
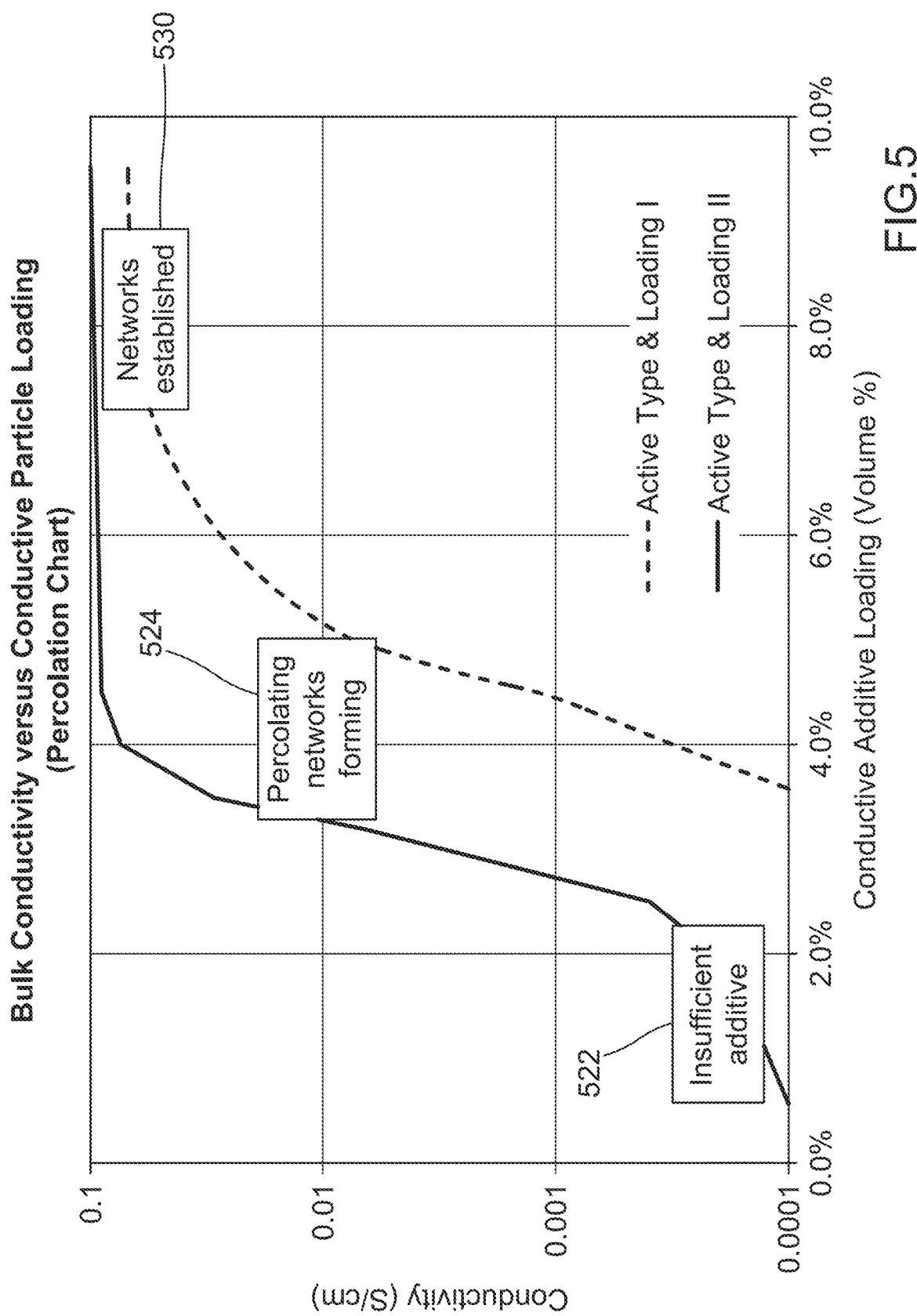
FIG. 5 is a plot of the conductivity of a semi-solid electrode versus conductive additive loading, according to various embodiments.

The quantity of a conductive additive, i.e., the mass or volume fraction of the conductive additive (also referred to herein as the conductive additive "loading") that is used in a given mixture relative to other components, such as an active material, that is suitable for the mixture to achieve a specified level of bulk electrical conductivity depends on the cluster state. Percolation theory can be used to select a loading of conductive additive. Referring now to FIG. 5, a plot of conductivity of an electrochemical slurry versus conductive additive loading is shown. As the loading of the conductive additive increases, so does the conductivity of the slurry. Three regions of conductivity are depicted on FIG. 5. At low loadings of conductive additive 522, the slurry has relatively low conductivity. For example, this slurry with low conductive additive loading 522 can correspond to the slurry depicted in FIG. 3A-3C, in which there is insufficient conductive material to form an appreciable interparticle network. As the conductive additive loading increases, a percolating network 524 begins to form as chains of conductive additive are able to at least intermittently provide connectivity between active particles. As the loading increases further (e.g., as shown in the slurry depicted in FIGS. 4A-4C), a relatively stable interparticle networks 530 is formed. The shape and height of the percolation curve can be modulated by the method of mixing an properties of the conductive additive, as described herein.

The amount of conductive additive used in a slurry, however, can be constrained by other considerations. For example, maximizing battery attributes such as energy density and specific energy is generally desirable and the loading of active materials directly influences those attributes. Similarly stated, the quantity of other solids, such as active material, must be considered in addition to the loading of conductive material. The composition of the slurry and the mixing process described herein can be selected to obtain a slurry of relatively uniform composition, while enabling clustering of the conductive additive to improve electrical conductivity. In other words, the slurry can be formulated and mixed such that a minimum threshold of conductive additive is included to form the interparticle network after an appropriate amount of mixing, thereby maximizing the active material loading. In some embodiments, the amount of conductive additive in the slurry can be about 0.5% to about 25% by volume, e.g., about 0.5%, 1%, 6%, or 25% by volume, inclusive of all ranges therebetween. In some embodiments, the electronic conductivities of the prepared slurries can be at least about $10^{-6}$ S/cm, at least about $10^{-5}$ S/cm, at least about $10^{-4}$ S/cm, at least about $10^{-3}$ S/cm, or at least about $10^{-2}$ S/cm, inclusive of all ranges therebetween.

In some embodiments, the maximum conductive additive loading at zero active material loading and the maximum active material loading at zero conductive additive loading depend on the type of conductive additive and active material being used. For example, a linear-type trend of active material to conductive additive, having a constant rheological parameter value (e.g., effective viscosity at a given shear rate) is generally observed, but other shapes (bowed out, bowed in, or with an inflection point) are possible. Said another way, a constant rheological parameter value can define a region in which "workable" formulations can be selected. The region can depend on, for example, materials being used, and can also be determined experimentally. In some embodiments, a workable formulation can have up to about 20% by volume of a conductive additive with a surface area less than 40 $m^2/g$, up to about 5% by volume of a conductive additive with a surface area less than 1,000 $m^2/g$, and up to about 52% by volume of lithium titanate with a tap density of 1.3 g/cc.

In some embodiments, it is desirable for the electrochemically active slurry to be "workable," in order to facilitate material handling associated with battery manufacturing. For example, if a slurry is too fluid it can be compositionally unstable. In other words, the homogeneity can be lost under exposure to certain forces, such as gravity (e.g., solids settling) or centrifugal forces. If the slurry is unstable, solid phase density differences, or other attributes, can give rise to separation and/or compositional gradients. Said another way, if the slurry is overly fluidic, which may be the result of low solids loadings or a significantly disrupted conductive network, the solids may not be sufficiently bound in place to inhibit particle migration. Alternatively, if an electrochemically active slurry is too solid, the slurry may break up, crumble, and/or otherwise segregate into pieces, which can complicate processing and dimensional control. Formulating the slurry within a band of adequate workability can facilitate easier slurry-based battery manufacturing. Workability of a slurry can typically be quantified using rheological parameters which can be measured using rheometers. Some examples of different types of rheometers that can be used to quantify slurry workability include: strain or stress-controlled rotational, capillary, slit, and extensional.

As described herein, the mixing speed (which may be fixed, staged, continuously varied, oscillated, and/or controlled according to a feedback signal) and duration of mixing (or of certain stages) can affect the establishment and stability of electrical conductivity in the carbon matrix and corresponding voltage efficiency in the cell, and the compositional homogeneity amongst all material components. The formation and stability of electrical conductivity can be diminished by high shear or extended mixing. High shear and/or extended mixing, however, can facilitate homogeneity, which can support local electrode balancing and long cycle life. Additionally, material "workability," which can enable more efficient processing and handling during manufacture and/or long term local compositional stability (e.g., no "settling" of solids within the finished electrode), can also be affected by mixing speed and duration.

Feeding of components to the mixer, extruder, or other combining equipment can be facilitated by ram feeding chutes or similar fixed displacement devices. The rate at which components are fed into the combining equipment can be set or controlled, which can limit shear history accumulation for material that is added first.

Active materials and conductive additives of different types, structure, morphology, and/or made by different processes can have different interactions with different components in the mixtures. This can result in slurries having the same solid to electrolyte ratio with different rheological properties.

Figure 6A:
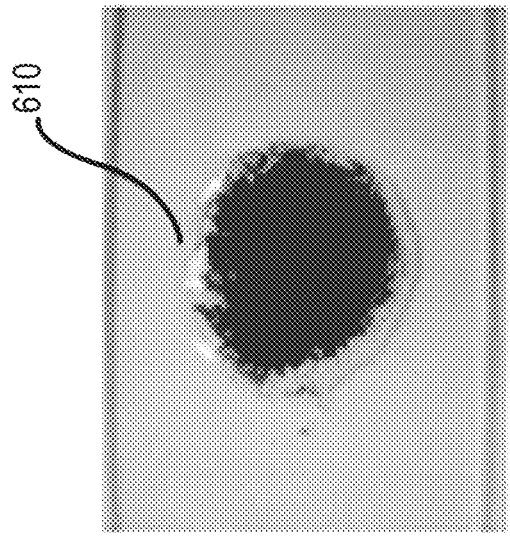
FIGS. 6A-6C depict electrode slurry mixtures with different conductive additive loadings, according to various embodiments.
Figure 6B:
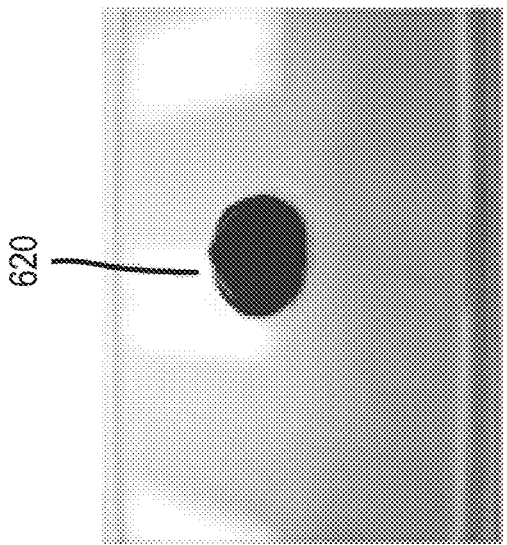
Figure 6C:
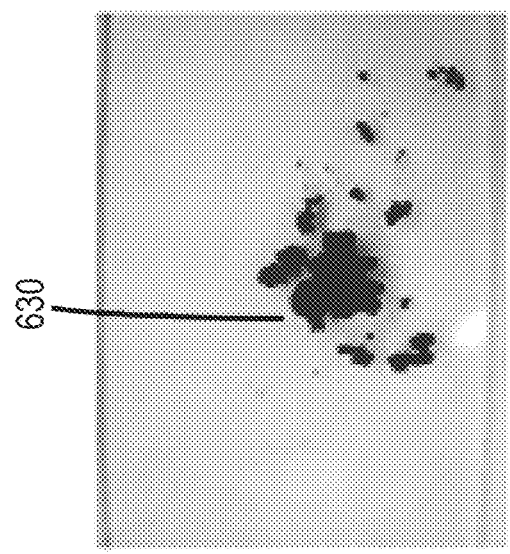

In some embodiments, the ratios between active material, conductive additive, and electrolyte can affect the stability, workability, and/or rheological properties of the slurry. FIG. 6A-6C depict electrode slurry mixtures with different loadings of active material and conductive additive relative to the electrolyte. At a low loading 610 (FIG. 6A), i.e., a slurry in which there is relatively little active material and conductive additive relative to the electrolyte, can result in an unstable or "runny" mixture. As shown, phase separation, i.e., separation of the of the active material and conductive additive (solid phase) from the electrolyte (liquid phase), can be observed in the low loading 610 mixture. On the contrary, at a high loading mixture 630 (FIG. 6C) where the maximum packing of solid materials in the electrolyte has been exceeded, the mixture is too dry and is not fluidic enough to be conveyed or processed to a desired shape or thickness. Therefore, as shown in FIG. 6B, there is an optimal loading mixture 620 where the slurry is stable (i.e., the solid particles are maintained in suspension) and is sufficiently fluidic to be workable into electrodes.

The "workable" slurries with different solids loadings can be evaluated for flowability and processability. The rheological behavior of the slurries can indicate processability under pressure driven flows, such as in a single or twin screw extrusion and/or flow through a die. The slurries can be categorized as "suspensions" with different loading levels and a low viscosity liquid medium/matrix. The flow behavior of such suspensions can be dependent on size distribution, shape and volume fraction of solid particles, particle-particle and particle-matrix interactions, and matrix rheology. In some embodiments, slurries can be selected based on rheology, which can be used to predict favorable processability of the slurries and/or desired electrochemical performance. The rheology of the "workable" slurries can be governed by the compositional formulation, e.g., different active materials and conductive additives loaded at various concentrations and/or homogeneity of the slurries.

In some embodiments, a type and loading level of conductive additive can be selected, which can form a gel like network that holds the suspension together and can prevent separation. At this level of loading, different types of conductive additives can, depending on their structure, form slurries with different rheological characteristics at the same loading levels. Alternatively, at a given volume loading level of active material, it is possible to pack different amounts and/or different types of conductive additives into slurries that can have the same rheology. Similarly, the type of active material incorporated into the formulation at given volume loading level and type of conductive additive can effect the rheological properties of the slurries. Additionally, the particle size, aspect ratio and particle size distribution of the solids (e.g., the active material and/or the conductive additive) can impact the rheology of the slurry.

Figure 7:
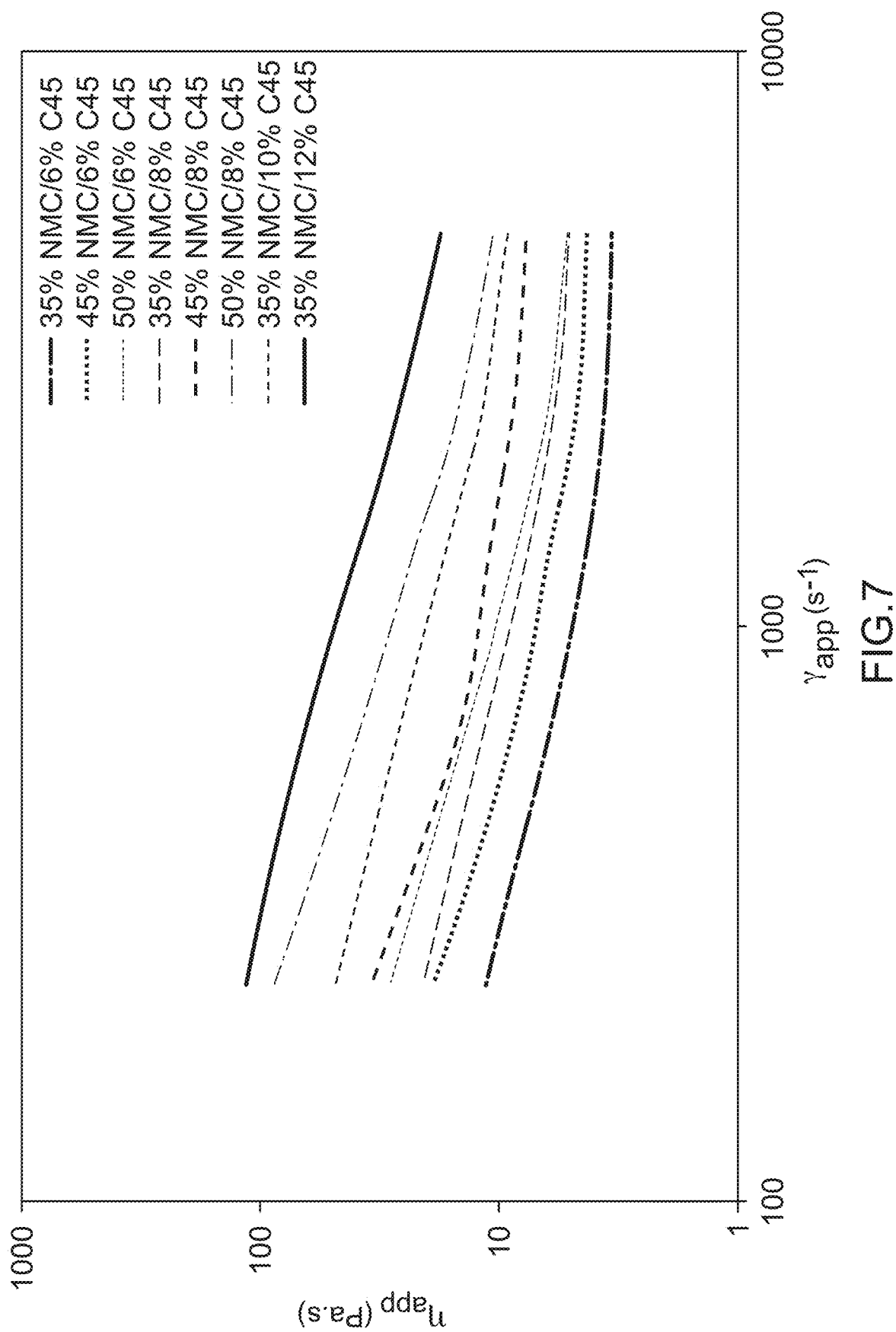
FIGS. 7-10 are plots illustrating rheological characteristics of slurry formulations, according to various embodiments.
Figure 8:
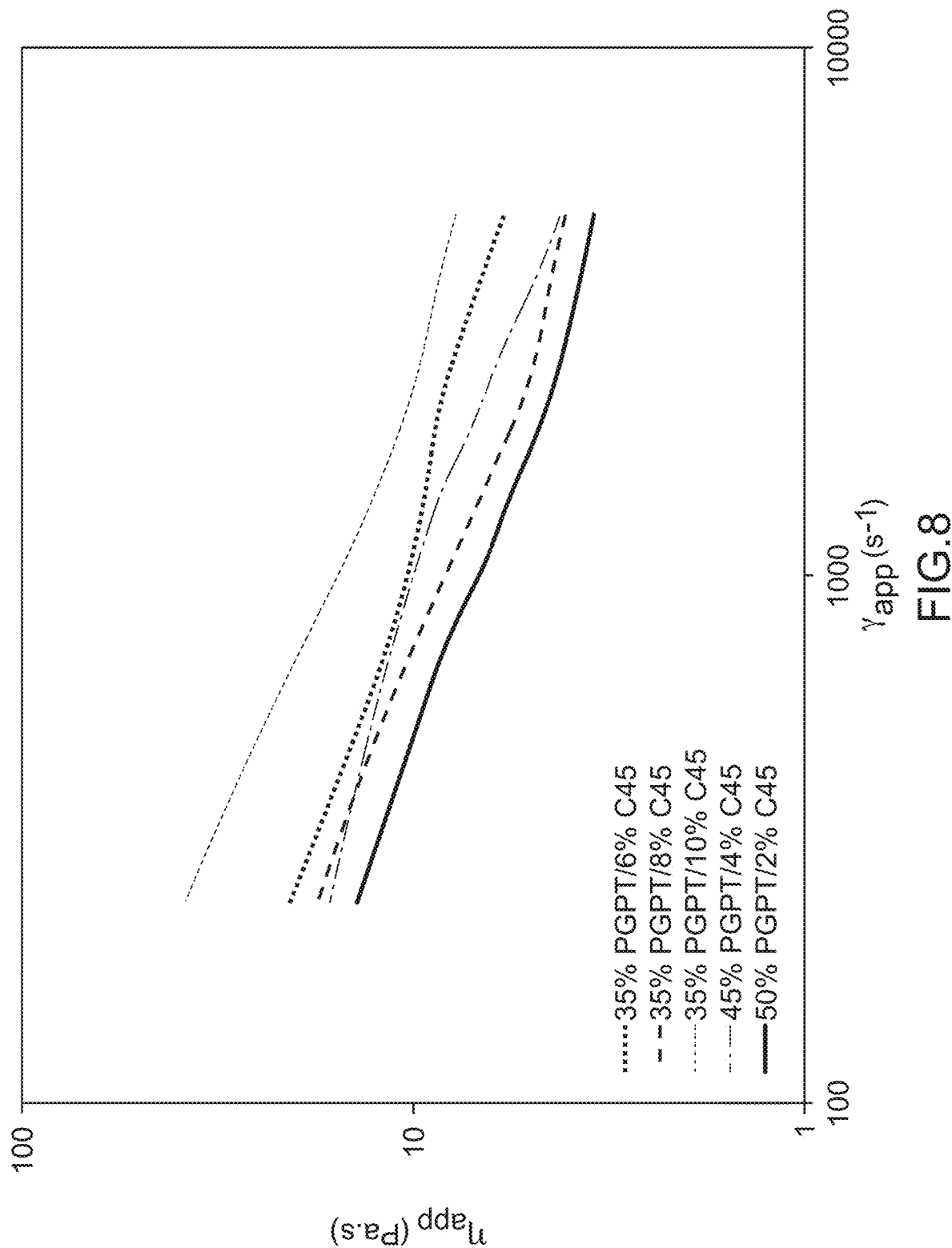

In some embodiments, the conductive additive can affect the rheology of the suspension. Thus, in such embodiments, at the same loading levels of conductive additive, increasing concentrations of active materials can contribute to the rheology of the slurry by increasing the shear viscosity of the suspension. FIG. 7 illustrates rheological characteristics including the apparent viscosity ($\eta_{appr}$ Pa-s) and apparent shear rate ($\gamma_{appr}$ $s^{-1}$) for various formulations of slurries that are formulated from about 35% to about 50% by volume NMC and about 6% to about 12% by volume of conductive additive C45. FIG. 8 illustrates the rheological characteristics described herein for various formulations of slurries formulated from about 35% to about 50% by volume graphite (PGPT) and about 2% to about 10% by volume of the conductive additive C45. The apparent viscosity of the slurries described herein decreases as the apparent shear rate increases.

A capillary rheometer can be utilized to characterize rheological behavior of slurries with different compositions. Capillary rheometers use a pressure driven flow to determine, for example, processability of a suspension by subjecting the material to shear rates higher than $10^{-1}$ s$^{-1}$. In a capillary rheometer, the suspension in a reservoir/barrel can flow through a capillary tube/die under pressure generated by a piston. The flow and deformation behavior of the suspension can be characterized through generating flow rate versus pressure drop data by using various capillary dies with different diameters, lengths and entrance angels.

The flow of a suspension can be described by different mechanisms depending on the suspension properties, i.e., yield stress, matrix viscosity, loading levels, particle interaction, and wall slip behavior controlled by such properties. In some embodiments, the suspension can flow with or without slip. In some embodiments, the suspension can flow like a plug without deformation at stresses below the yield stress. The highly loaded slurry suspension can be characterized by a strong slip mechanism and with a high yield stress of around 35,000 Pa.

Figure 9:
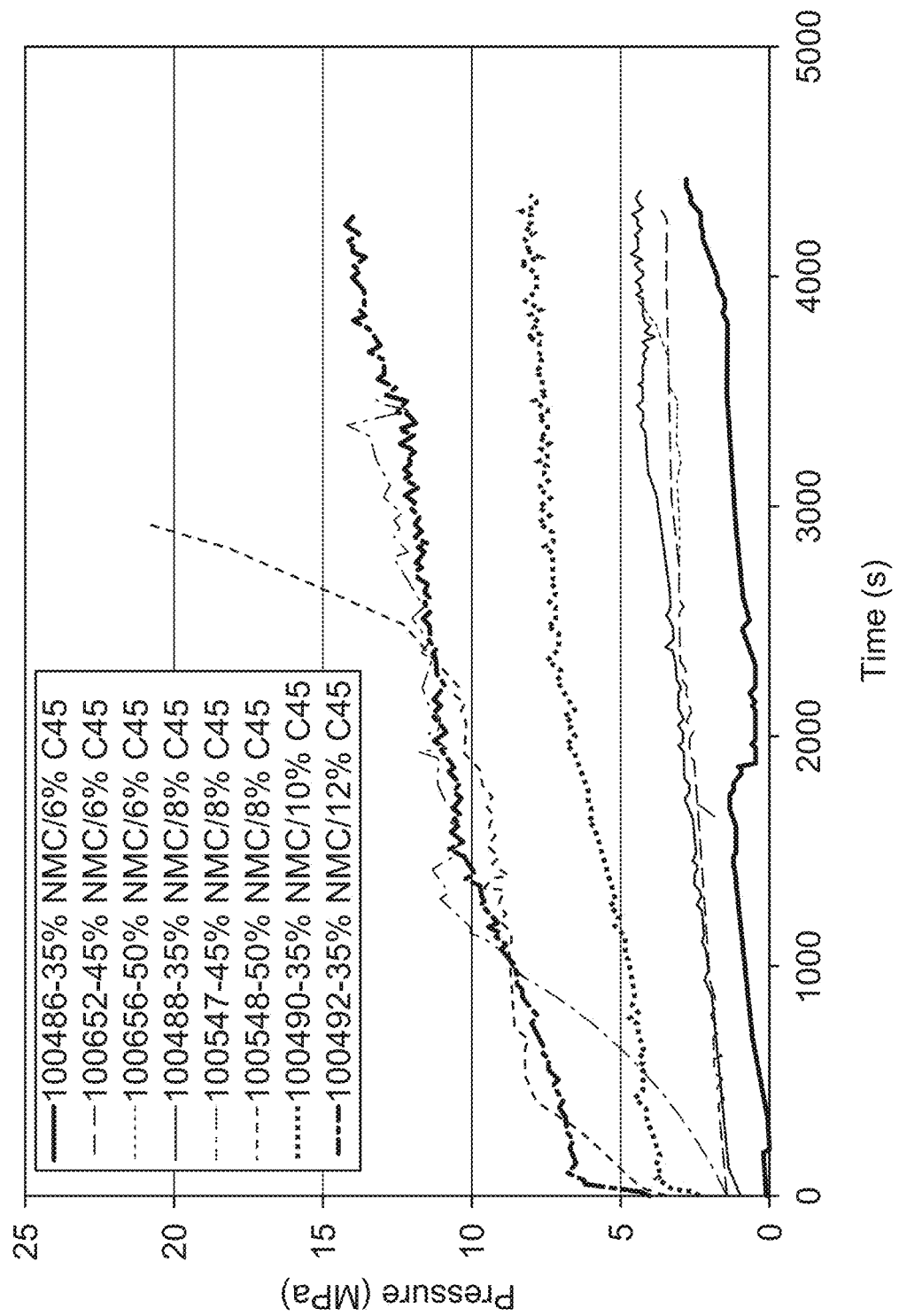
Figure 10:
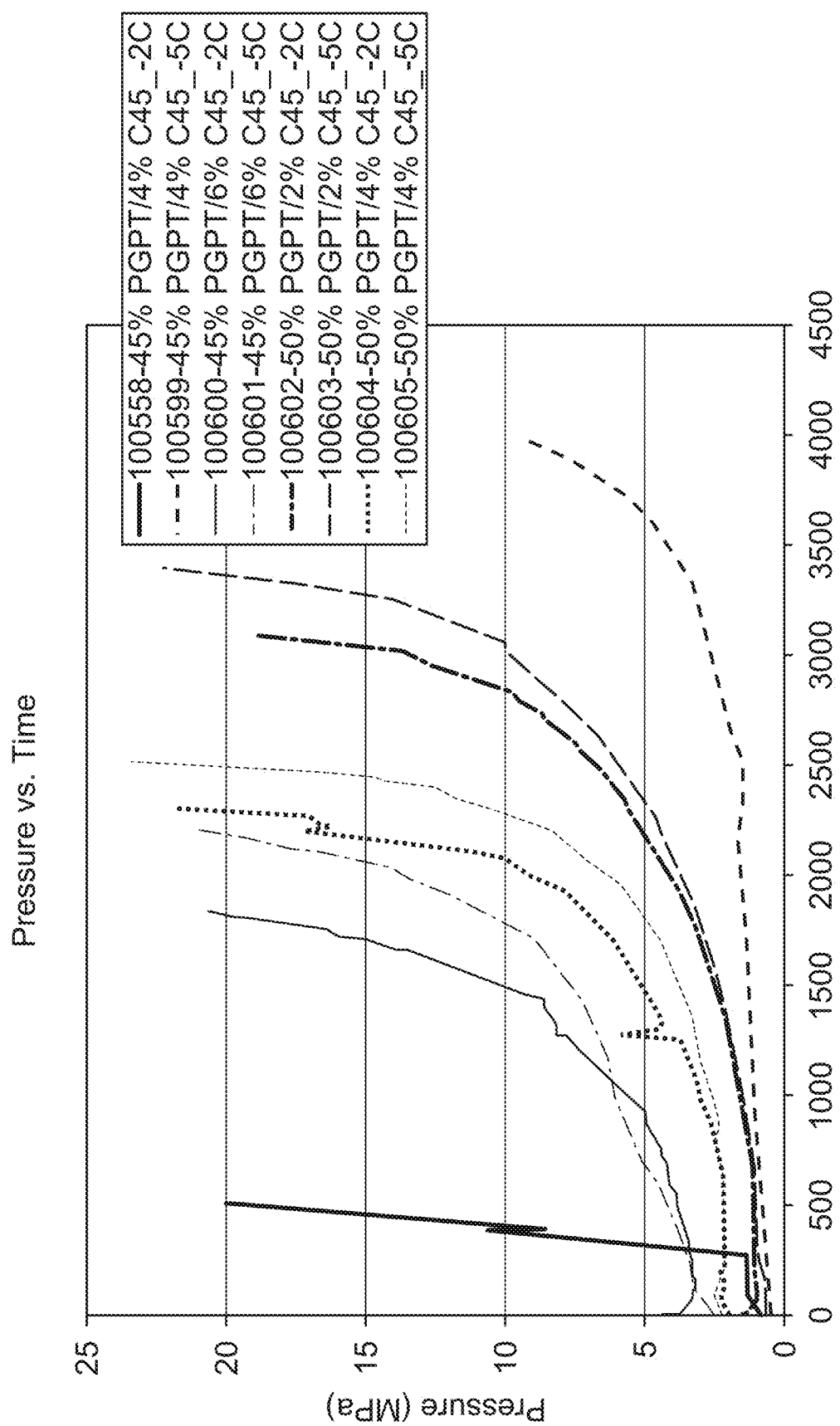

The slurry suspensions can be prone to separation and flow instabilities, structure development, mat formation and/or binder filtration when flowing under a critical shear stress values due to a low viscosity liquid matrix in the formulation. Such behavior can be characterized using a capillary rheometer using a small diameter and a long L/D. The compositional formulation, especially conductive carbon loading levels, and the extrusion temperature can impact such structural changes during a pressure driven flow. FIG. 9 and FIG. 10 illustrate time-pressure graphs for various formulations of a first slurry that includes about 35%-50% NMC and about 6%-12% C45 (FIG. 9) and various formulations of a second slurry that includes about 45%-50% PGPT and about 2%-6% C45 (FIG. 10). As shown herein, varying amounts of pressure are required to dispense or flow a predefined quantity of slurry within a predetermined time period depending on the rheological characteristics of the slurry, for example the apparent viscosity and the apparent shear rate. In some embodiments, the apparent viscosity of the prepared slurry at an apparent shear rate of about 1,000 s$^{-1}$ can be less than about 100,000 Pa-s, less than about 10,000 Pa-s, or less than about 1,000 Pa-s. In some embodiments, the reciprocal of mean slurry viscosity can be greater than about 0.001 1/(Pa-s). Some slurry formulations include three main components such as, for example, active material (e.g., NMC, lithium iron phosphate (LFP), Graphite, etc.), conductive additive (e.g., carbon black), and electrolyte (e.g., a mix of carbonate based solvents with dissolved lithium based salt) that are mixed to form the slurry. In some embodiments, the three main components are mixed in a batch mixer. In some embodiments, active materials are first added to the mixing bowl followed by solvents. In some embodiments, the electrolyte can be incorporated homogeneously with a dense active material without experiencing any 'backing out' of material from the mixing section of the mixing bowl to form an intermediate material. Once the solvent and active materials are fully mixed, they can form a loose, wet paste. The conductive additive can be added to this intermediate material (i.e., loose paste), such that it can be evenly incorporated into the mix. In some embodiments, the active material can tend not to aggregate into clumps. In other embodiments, the components can be combined using another order of addition, for example, the solvent can be added first to the mixing bowl, then the active material added, and finally the additive can be added. In other embodiments, the slurry can be mixed using any other order of addition.

The mixer (e.g., the batch mixer) can add dispersive shear energy to the bulk material being mixed. The mixing energy can be normalized to the mass of material being mixed, which can provide a quantifiable metric for how much work was done to mix a given sample. As mixing progresses with time, mixing energy increases. At the beginning of a mixing operation, when a relatively low amount of mixing energy has been added to the slurry, the mixture can exhibit low homogeneity, e.g., material may not be evenly distributed throughout the bulk of the mixture. Additionally, a slurry having had a relatively small amount of mixing energy added can have low flowability and/or formability. For example, if the liquid phase of the mixture has not been uniformly distributed among the solid particles, aggregates of solid material (e.g., the conductive additive) can remain. In some embodiments, such aggregates can be smaller than is visible to the naked eye, yet, these aggregates can cause the slurry to be "dry" or "crumbly." Furthermore, a slurry having a small amount of mixing energy can exhibit a lack of ductility, which can include the tendency of the material to fracture instead of spread as it is formed.

As mixing energy increases, homogeneity of the mixture can increase. If mixing is allowed to continue, eventually excessive mixing energy can be imparted to the slurry. For example, as described herein, excessive mixing energy can produce a slurry characterized by low electronic conductivity. As mixing energy is added to the slurry, the aggregates of conductive additive can be broken up and dispersed, which can tend to form a network like conductive matrix, as described above with reference to FIGS. 3 and 4. As mixing continues, this network can degrade as carbon particles are separated from each other, forming an even more homogenous dispersion of carbon at the microscopic scale. Such an over-dispersion and loss of network can exhibit itself as a loss of electronic conductivity, which is not desirable for an electrochemically active slurry. Furthermore, a slurry having excessive mixing energy imparted to it can display unstable rheology. As the carbon network affects mechanical, as well as electronic characteristics of the slurry, formulations which have been over mixed tend to appear "wetter" than slurries subjected to a lesser amount of mixing energy. Slurries having experienced an excessive amount of mixing energy also tend to show poor long term compositional homogeneity as the solids phases tend to settle due to gravitational forces. Thus, a particular composition can have favorable electrical and/or rheological properties when subject to an appropriate amount of mixing. For any given formulation, there is a range of optimal mixing energies to give acceptable dispersion, conductivity and rheological stability.

Figure 11:
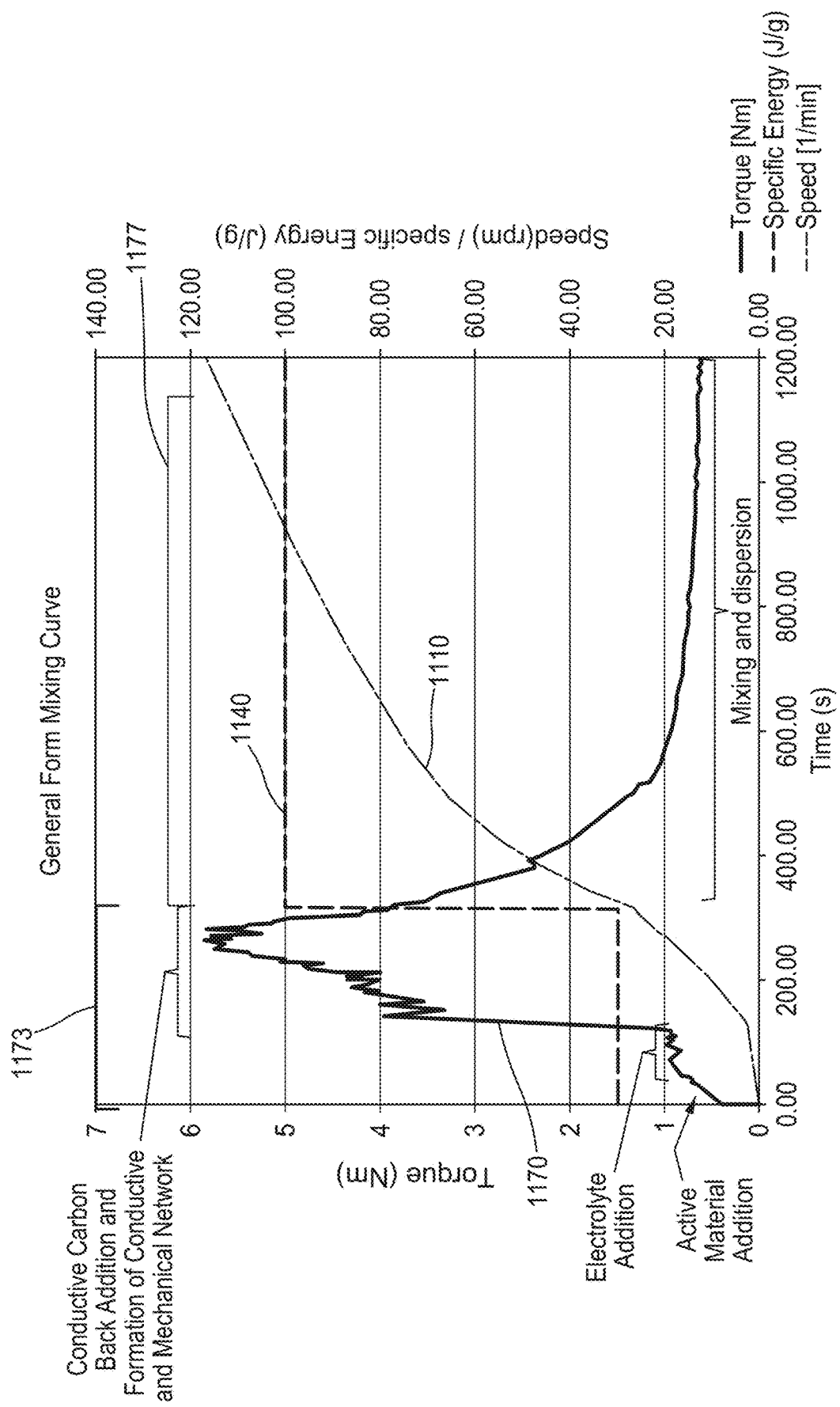
FIGS. 11-13 are plots illustrating mixing curves, according to various embodiments.
Figure 12:
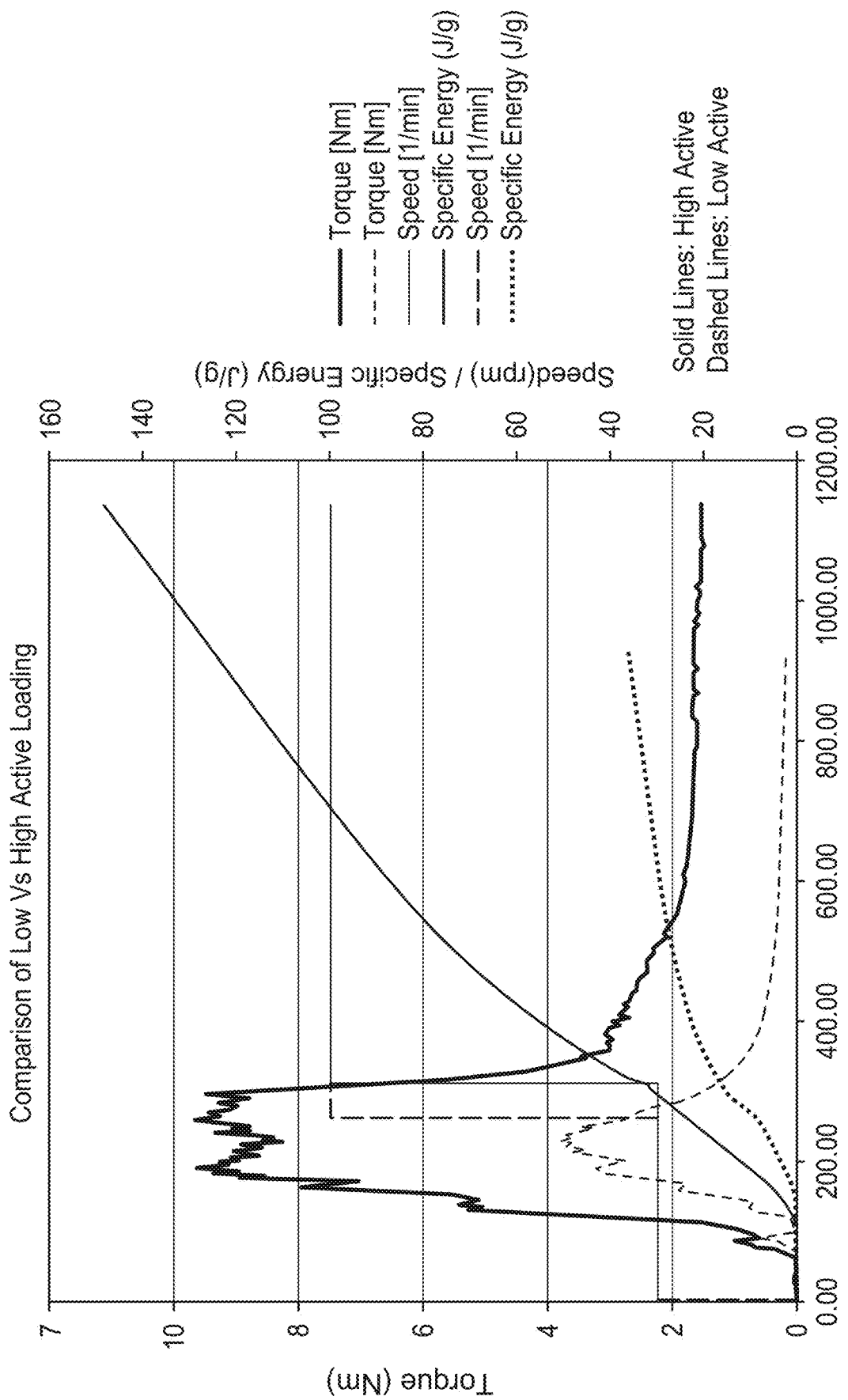
Figure 13:
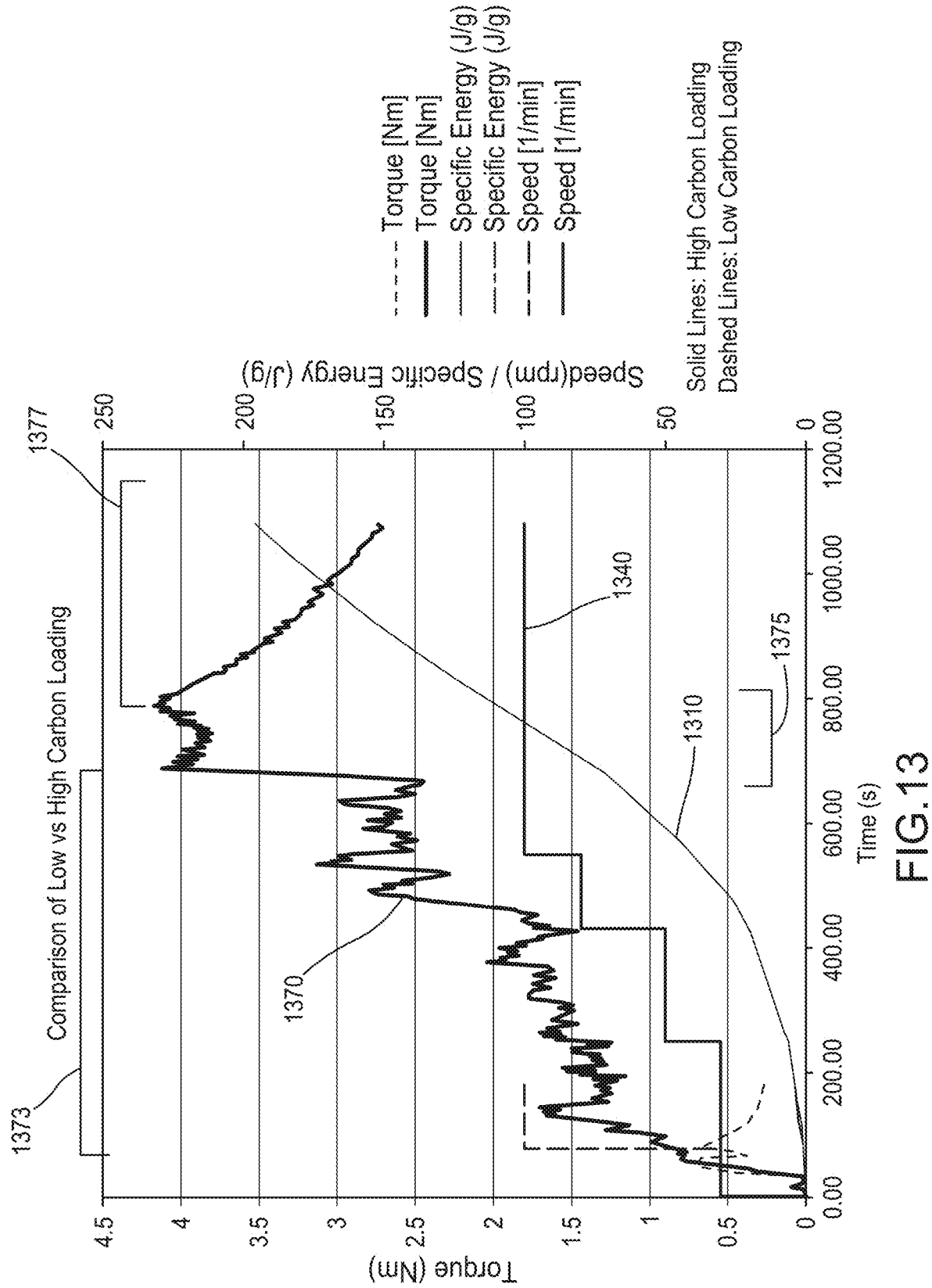

FIGS. 11-13 are plots illustrating an example mixing curve, comparative mixing curves of low and high active material loading for the same carbon additive loading, and comparative mixing curves of low and high carbon additive loading for the same active material loading, respectively.

FIG. 11 depicts a mixing curve including the specific mixing energy 1110, the speed 1140, and the torque 1170, of slurry, according to an embodiment. The first zone 1173 shows the addition of the raw materials. In some embodiments, the active material is added to the mixer, then the electrolyte, and finally the conductive additive (carbon black). The carbon additive takes the longest time to add to the mixing bowl due to the difficulty of incorporating a light and fluffy powder into a relatively dry mixture. The torque curve 1170 provides an indication of the viscosity, particularly, the change in viscosity. As the viscosity of the mixture increases with the addition of the carbon black, the torque required to mix the slurry increases. The increasing viscosity is indicative of the mechanical carbon network being formed. As the mixing continues in the second zone 1177, the mixing curve shows the dispersion of the raw materials and relatively lower viscosity as evidenced by the decreased torque required to mix the slurry.

FIG. 12 illustrates the difference between a low and high loading of active materials. It can be seen from this curve that the length of time needed to add the conductive carbon additive is approximately equal for low and high active loadings, but the overall torque (and consequently the mixing energy) is much higher for the higher active loading. This is indicative of a much higher viscosity.

FIG. 13 illustrates the difference between a low and high conductive carbon additive loading for the same active material loading. The mixing curve for the high carbon loading includes the specific mixing energy 1310, the speed 1340 and the torque 1373. The first zone 1373 shows the addition of raw materials. As the viscosity of the mixture increases with the addition of the carbon black, the torque required to mix the slurry increases as seen in the first mixing zone 1375. The increasing viscosity is indicative of the carbon network being formed. As the mixing continues in the second zone 1377, the mixing curve shows the dispersion of the raw materials and relatively lower viscosity as evidenced by the decreased torque required to mix the slurry. It should be noted that the time needed to add the carbon conductive additive is much longer for the high carbon loading and the overall torque (and mixing energy) is also much higher. This mixing curve illustrates that carbon loading has a much higher impact on material viscosity than active material loading.

Figure 14:
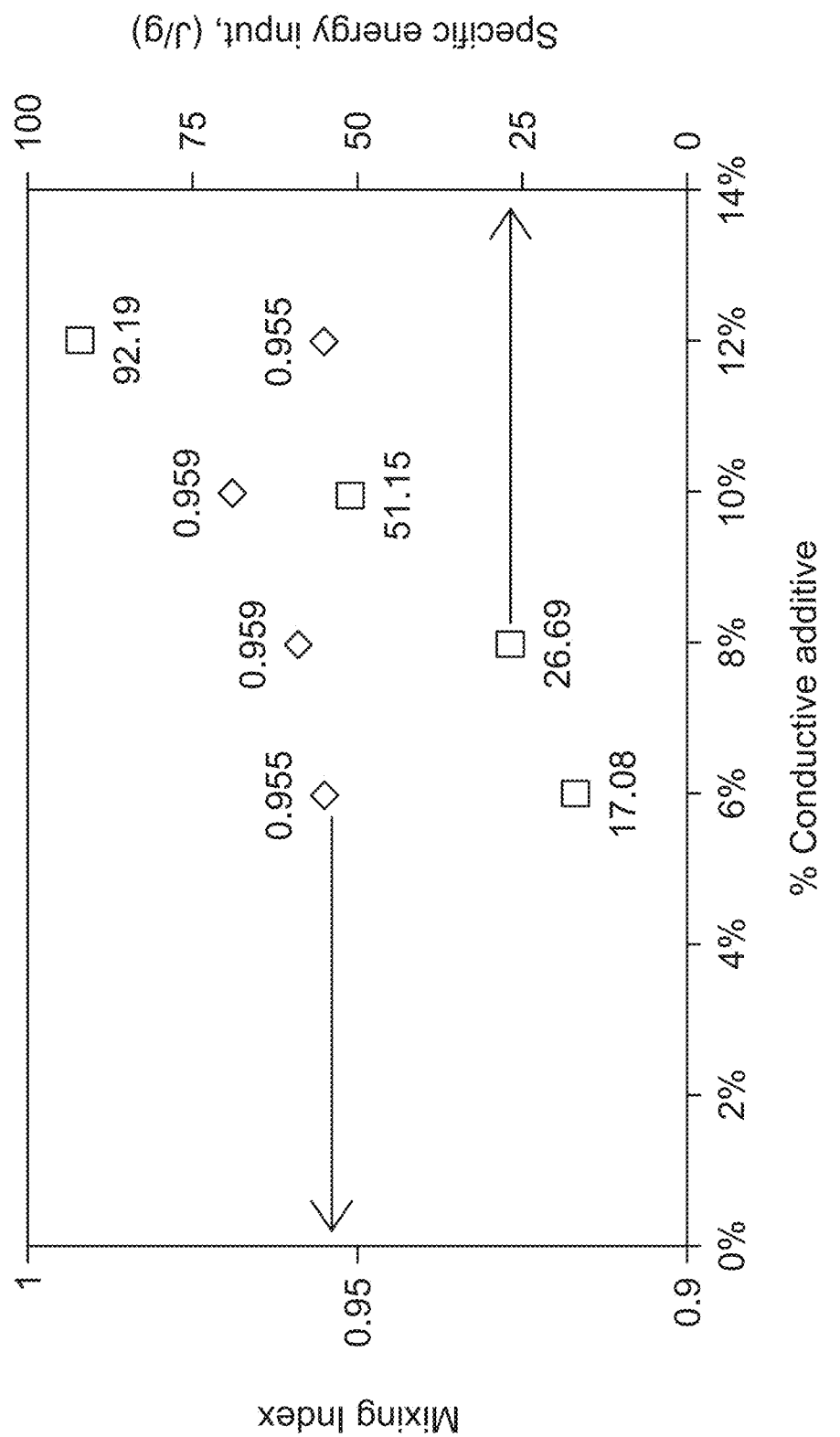
FIG. 14 is a plot illustrating the relationship of mixing index with specific energy input and conductive additive loading, according to various embodiments.

As described herein, compositional homogeneity of the slurry will generally increase with mixing time and the compositional homogeneity can be characterized by the mixing index. FIG. 14 illustrates the specific energy input required to achieve different mixing indexes for slurries of different conductive additive loadings. As shown, a higher amount of specific energy input is required to achieve the desired specific index, e.g., about 0.95 as the vol % of conductive additive is increased in the slurry formulation. In some embodiments, the slurry is mixed until the slurry has a mixing index of about 0.8, of about 0.9, of about 0.95 or about 0.975, inclusive of all mixing indices therebetween.

Figure 15:
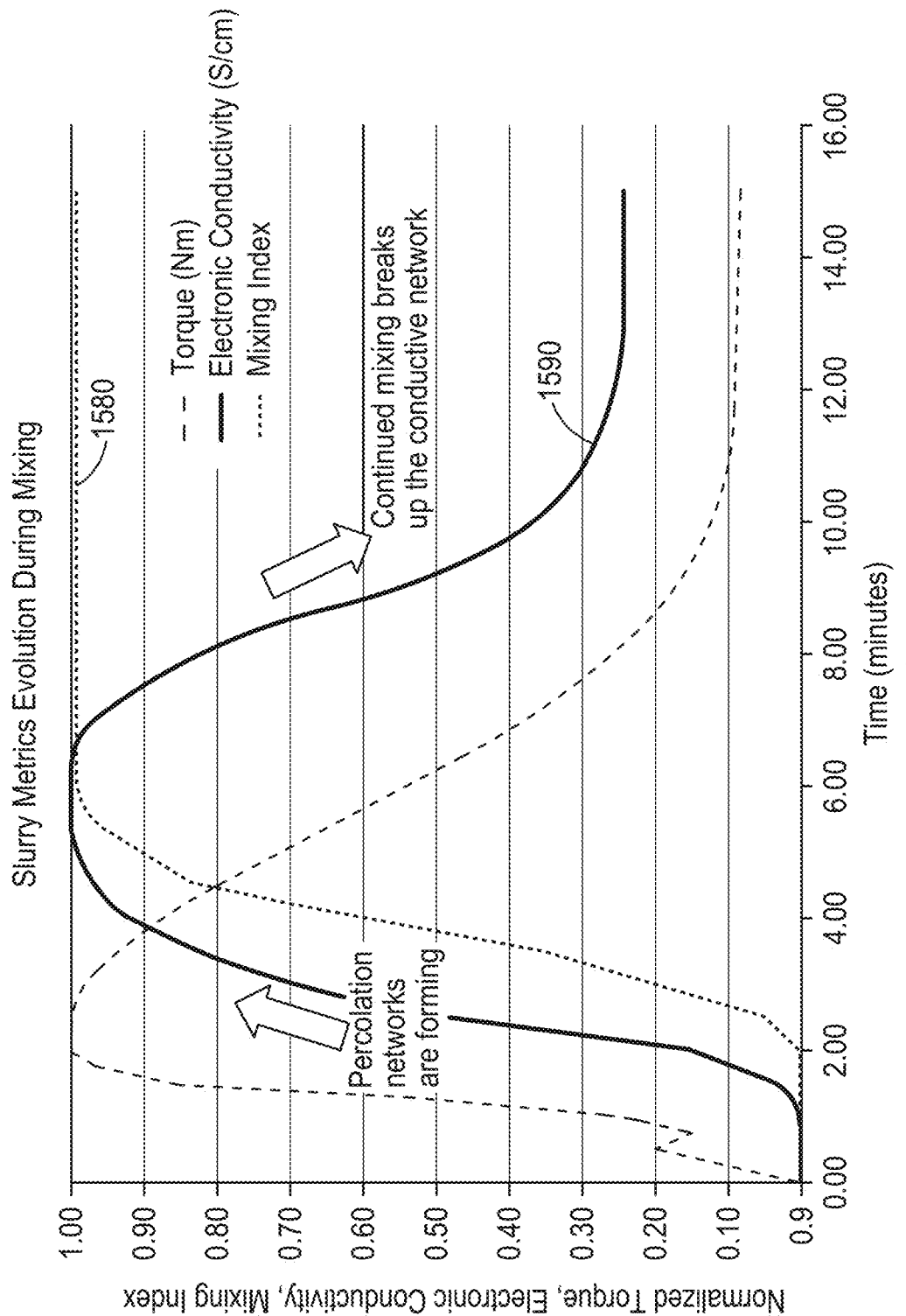
FIG. 15 is a plot illustrating the effect of mixing on certain slurry parameters, according to various embodiments.

FIG. 15 illustrates the effect of mixing on certain slurry parameters that include the mixing index and the electronic conductivity of the slurry, according to an embodiment. The mixing index 1580 rises monotonically while electronic conductivity 1590 initially increases (as conductive network is dispersed within the media), achieves a maximum value, and then decreases (network disruption due to "over mixing").

Figure 16:
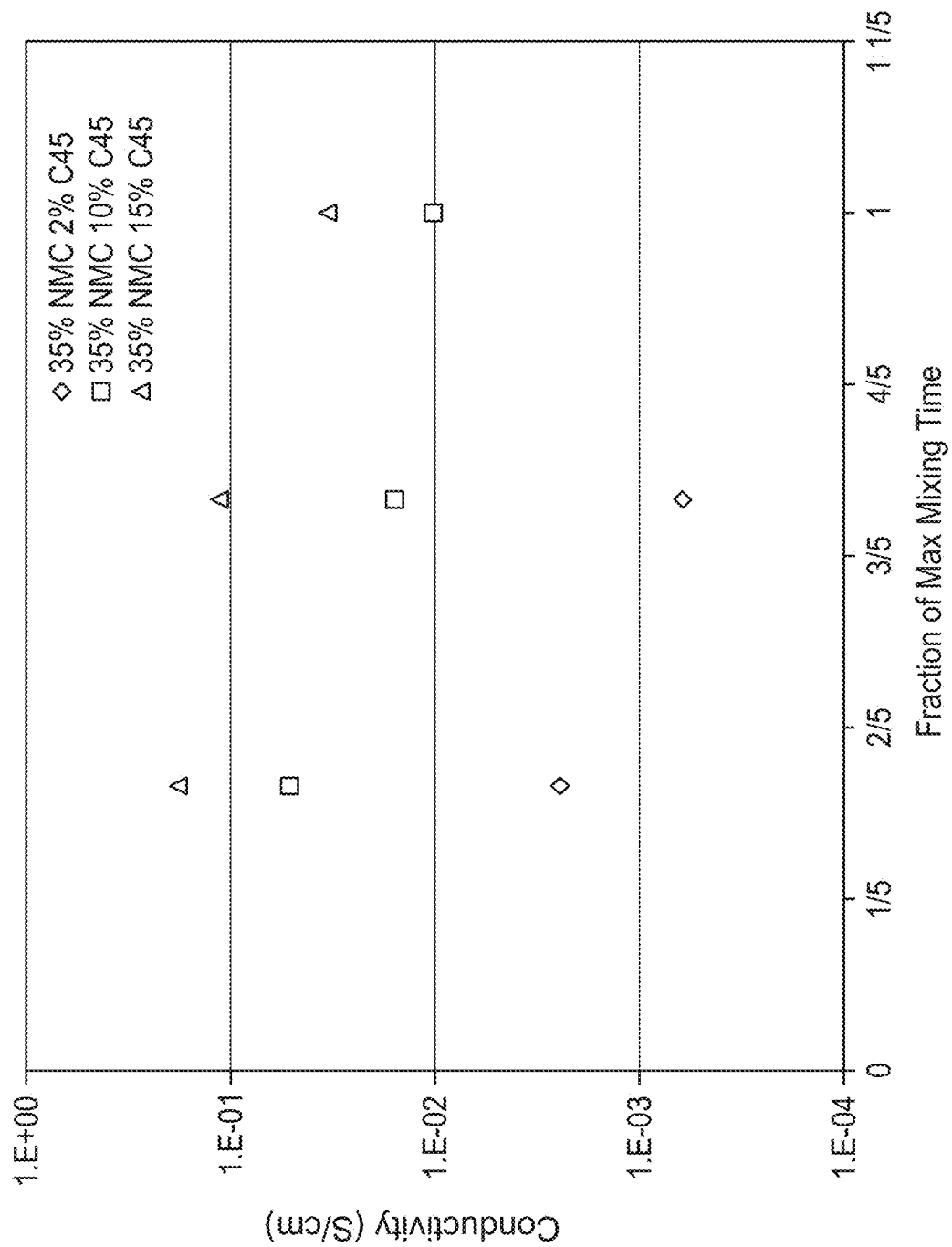
FIG. 16 is a plot illustrating the conductivity of certain slurries as a function of mixing time.

In some embodiments, processing parameters can influence electronic conductivity, which is an important parameter for electrochemically active slurries. For example, FIG. 16 demonstrates that processing time can be selected to alter electronic conductivity and morphology of the semi-solid electrodes. Examples of such results are shown in FIG. 16, which depicts the conductivity of certain slurries that include about 35% NMC and about 2%-15% conductive additive C45, as a function of mixing time. As seen in FIG. 16, longer mixing time can yield samples with lower conductivities.

Figure 17C:
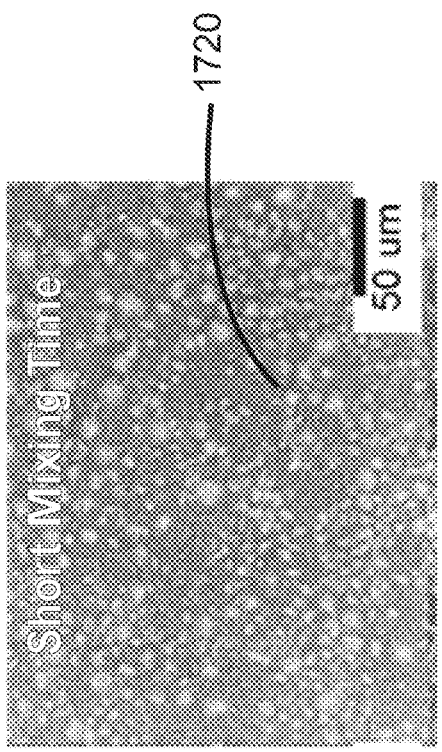
FIGS. 17A-17D are micrographs of a slurry subjected to two different mixing times, according to an embodiment.
Figure 17D:
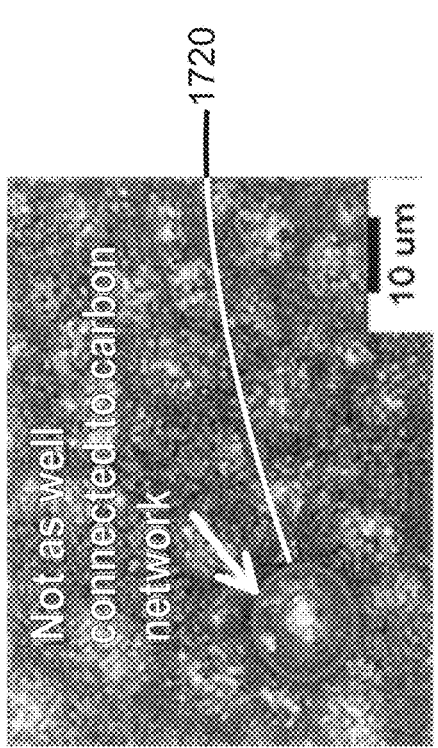
Figure 17A:
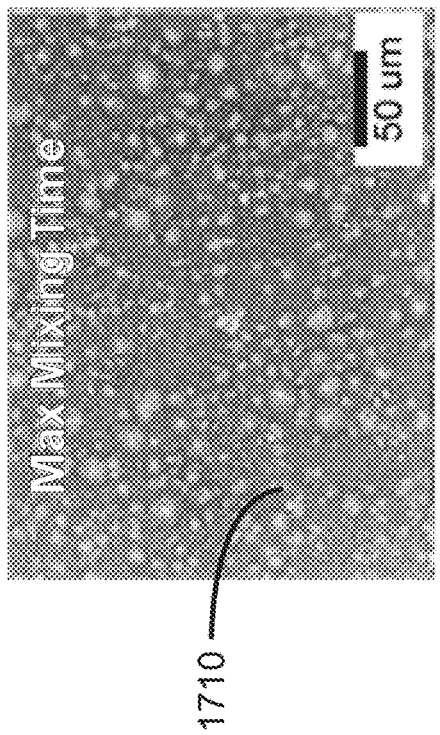
Figure 17B:
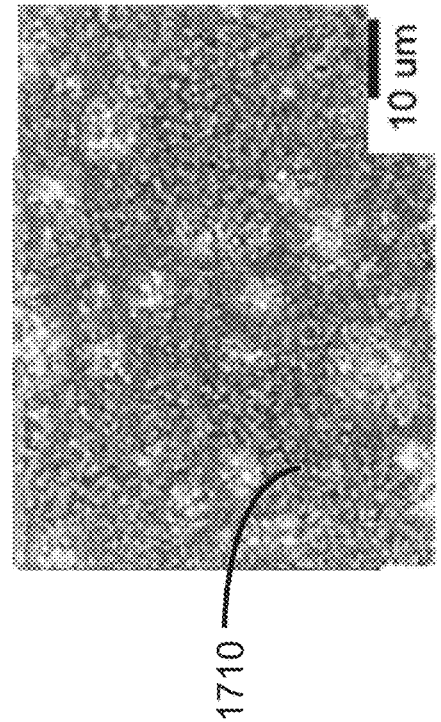

Similarly, FIGS. 17A-17D are micrographs of a slurry subjected to two different mixing times showing that carbon conductive additive agglomeration tends to increase in a sample mixed for a longer time 1710 (FIG. 17A-17B), as compared to a sample that was mixed for a shorter time 1720 (FIG. 17C-17D).

Figure 18:
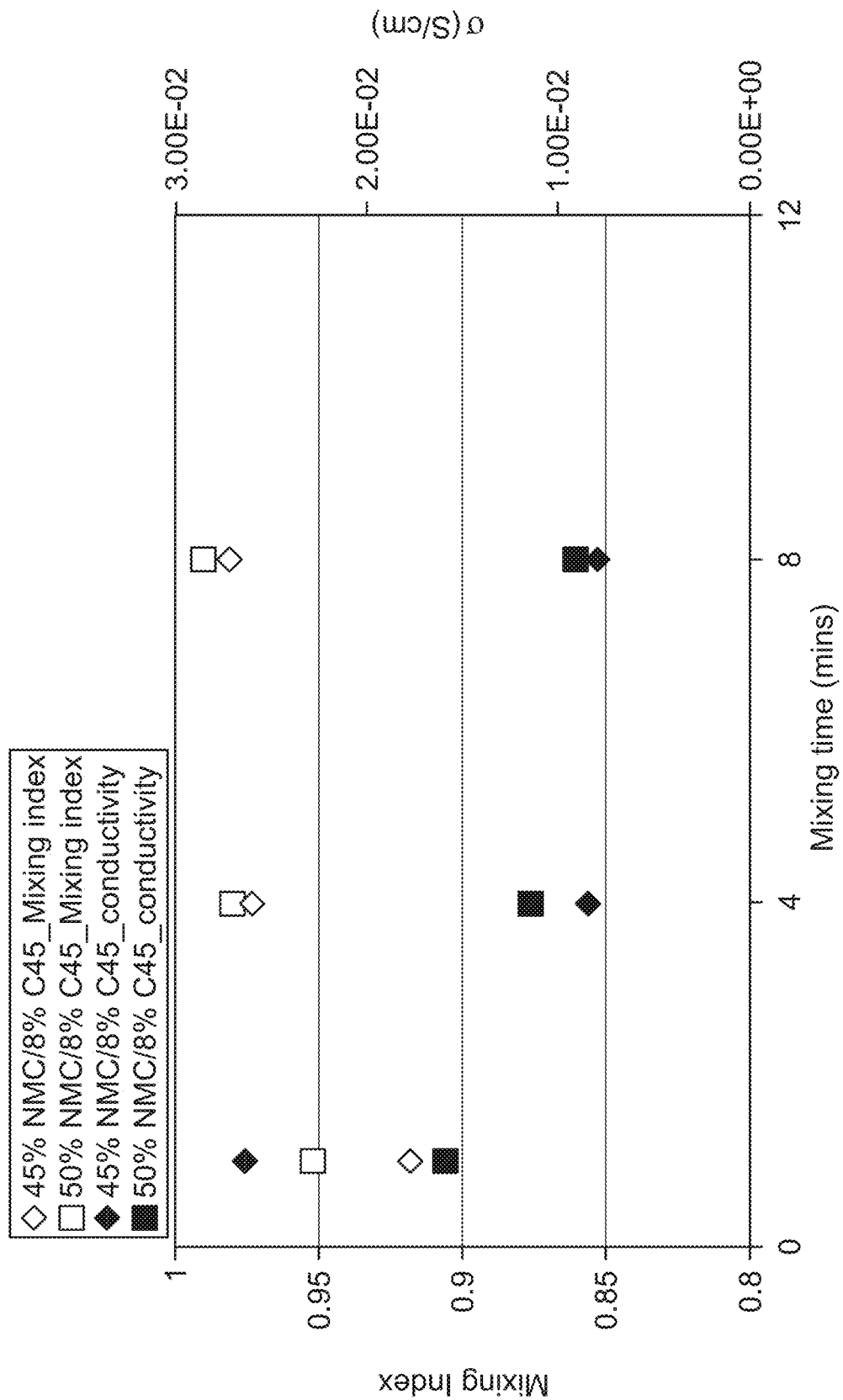
FIG. 18 illustrates the evolution of mixing index and conductivity with mixing duration at 100 rpm, for two different cathode compositions.

In some embodiments, the mixing time can have a simultaneously impact mixing index and conductivity of an electrode slurry. FIG. 18 illustrates the effect of mixing time on the mixing index and conductivity of various slurry formulations that include about 45%-50% NMC and about 8% C45. Here, and in subsequently presented measurements of mixing index, the mixing index is measured by taking sample volumes of 0.12 $mm^3$ from a batch of the electrode slurry that has a total volume greater than the sum of the individual sample volumes. Each sample volume of slurry is heated in a thermo gravimetric analyzer (TGA) under flowing oxygen gas according to a time-temperature profile beginning with a 3 minute hold at room temperature, followed by heating at 20° C./min to 850° C., with the cumulative weight loss between 150° C. and 600° C. being used to calculate the mixing index. As shown in FIG. 18, the mixing index is observed to increase but the conductivity is observed to decrease with increased mixing times. In these embodiments, a mixing time of about 2 minutes provided a good compromise between the conductivity and the mixing index, e.g., the slurry composition composed of 50% NMC and 8% C45 was observed to have a mixing index of about 0.95 and a conductivity of about 0.02 S/cm. Any further mixing has a negative impact on the conductivity.

Figure 19:
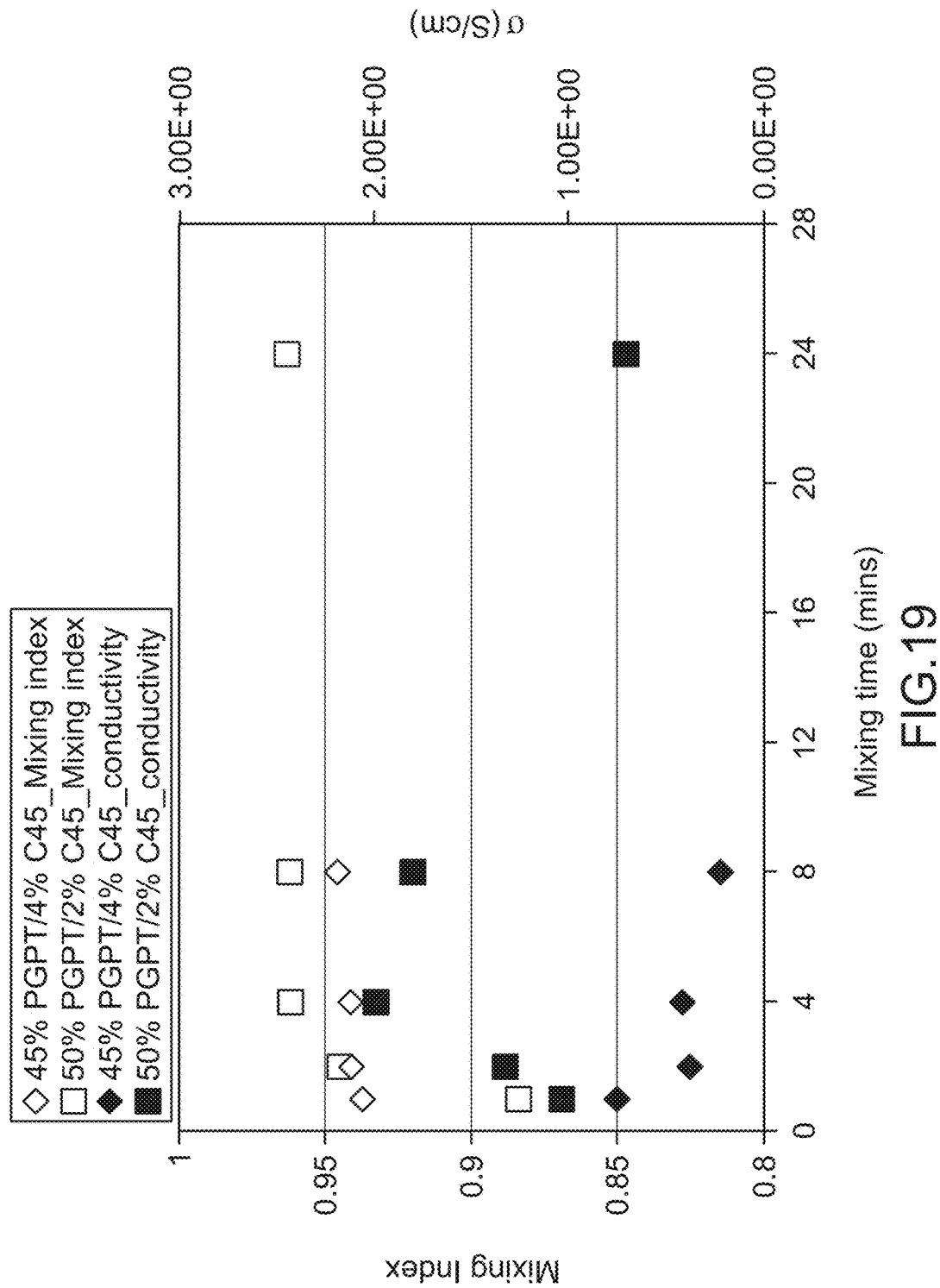
FIG. 19 illustrates the evolution of mixing index and conductivity with mixing duration at 100 rpm, for two different anode compositions.

FIG. 19 illustrates the effect of mixing time on the mixing index and conductivity of various slurry formulations that include about 45%-50% PGPT and about 2%-4% C45. For the 50% PGPT and 2% C45 mixture, the conductivity is observed to initially rise, peaking at a 4 minute mixing time, and then decrease by more than a factor of two at 24 minutes—consistent with the trend described in FIG. 15. Therefore the mixing times required to get an optimal mixing index and conductivity of a slurry depend on the slurry formulation.

Figure 20:
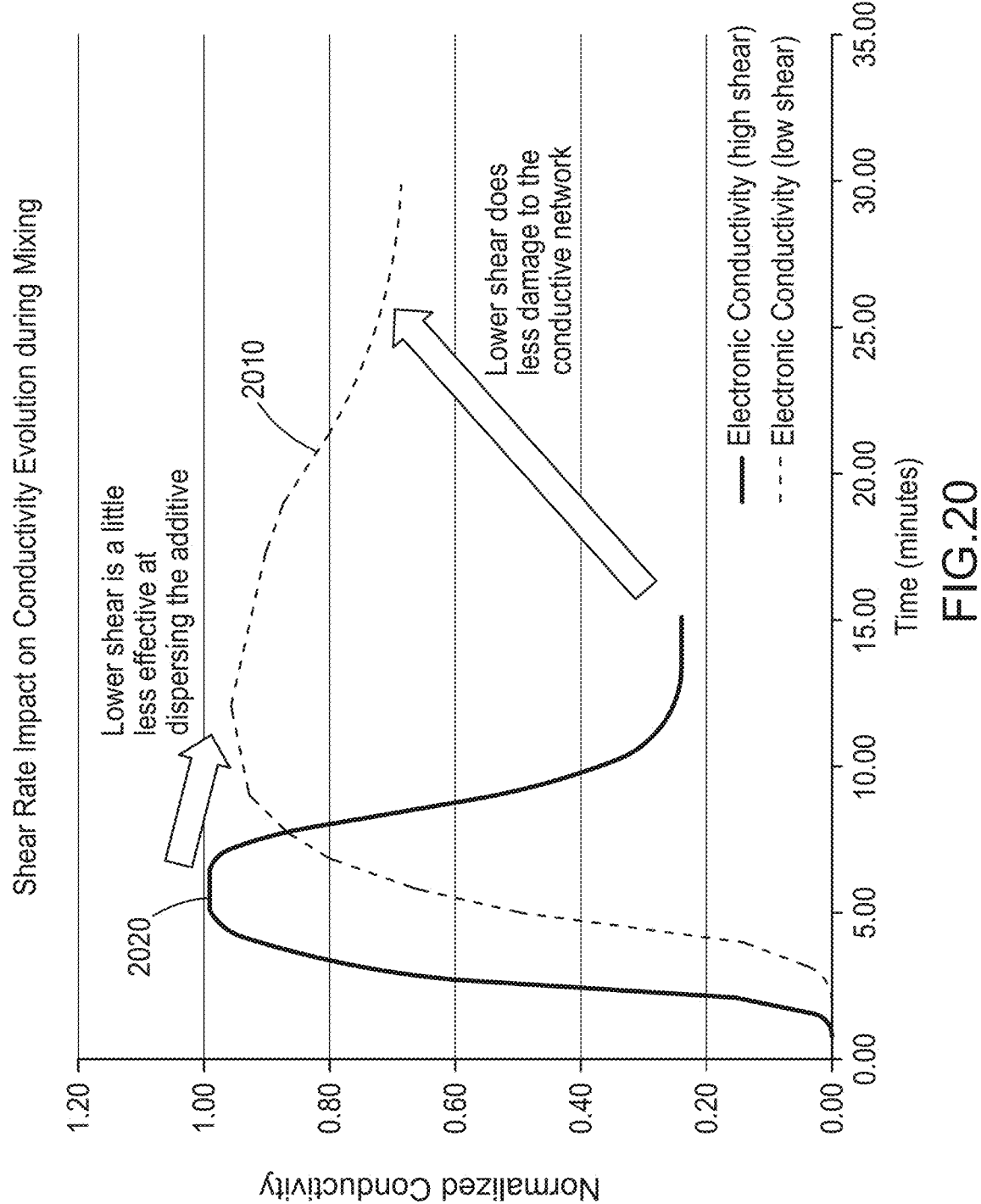
FIG. 20 is a plot illustrating conductivity as a function of mixing time for two shear conditions, according to various embodiments.

In some embodiments, shear rate can influence mixing dynamics and conductivity. As a result, in some embodiments, the selection of mixing element rotation speed, container and/or roller size, clearance dimensions/geometry, and so forth can have an effect on conductivity. FIG. 20 is a plot depicting conductivity as a function of mixing time for two different shear conditions. As shown, the slurry subjected to the lower shear mixing 2010 is less sensitive to over mixing. The slurry subject to higher shear mixing 2020 has a slightly higher peak conductivity, reaches the maximum conductivity with less mixing, and is more sensitive to over mixing. In some embodiments, the optimal mixing time can be 20 seconds, 2 minutes, 4 minutes or 8 minutes, inclusive of mixing times therebetween.

In some embodiments, particle size, shape, aspect ratio, and distribution of the solid particles in the slurry suspension can be selected to determine loading levels.

In some embodiments, temperature control during processing can be employed, which can reduce electrolyte evaporation. By controlling the temperature of the slurry, rheology, conductivity, and/or other characteristics of the slurry can be improved.

Figure 21:
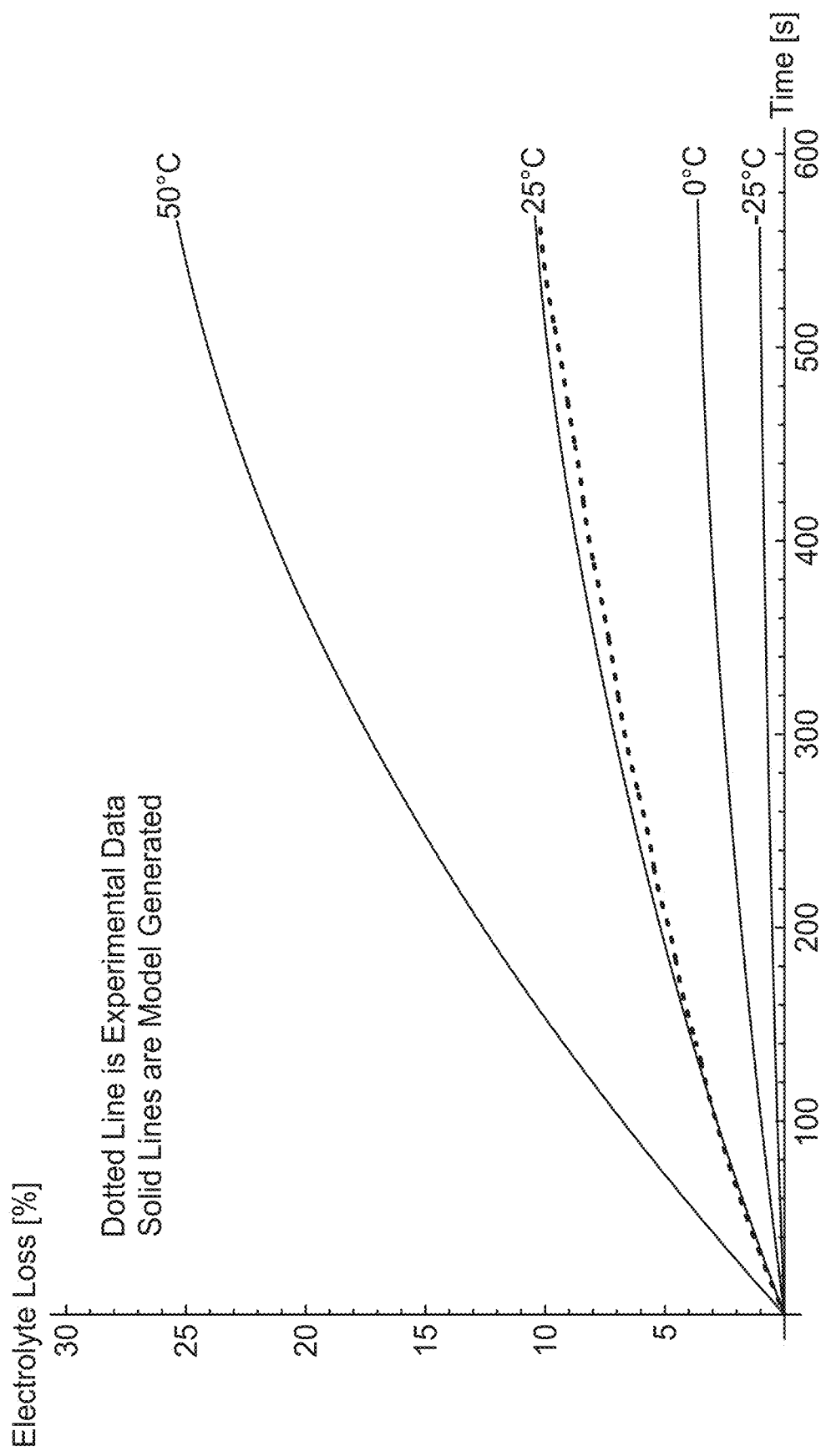
FIG. 21 is a plot illustrating the loss of electrolyte with time, mixing duration and temperature, according to various embodiments.

In some embodiments, the electrolyte can include a mixture of solvents with differing levels of volatility and vapor pressures. Temperature can have an effect on the evaporation rate of this mixture as well as which components will preferentially evaporate before others, which can change the composition and/or the performance of the electrolyte. FIG. 21 depicts the percentage loss of electrolyte with temperature and mixing duration. Reduced total electrolyte and loss of the more volatile components of the electrolyte in the slurry mixture can reduce the ionic conductivity of the slurry, subsequently increasing the voltage polarization and decreasing the efficiency and capacity of the battery. By reducing and/or controlling processing temperatures, evaporation and subsequent changes to the composition of the slurry can be decreased, and can lead to a more easily controllable process.

In some embodiments, for example, where electrolyte loss occurs, a "compensation" step can be added to the process. This step can include adding a surplus of the electrolyte and/or components of the electrolyte (e.g., the more volatile electrolyte components) during some stage of the processing. The stage at which this addition is made could be during initial mixing of the electrolyte, during final cell assembly or at any other step.

Figure 22:
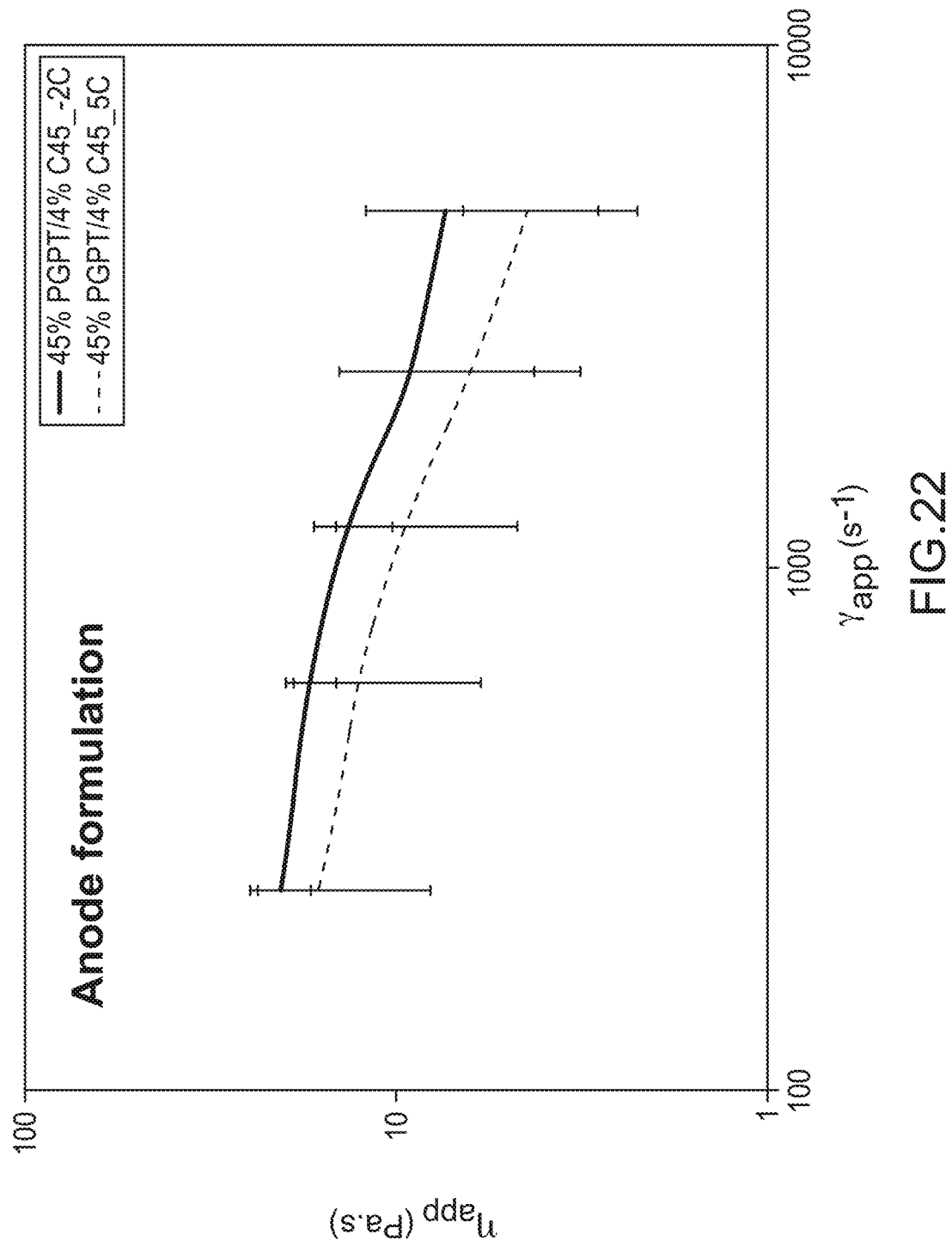
FIG. 22 and FIG. 23 are plots illustrating the effect of temperature on viscosity, according to various embodiments.
Figure 23:
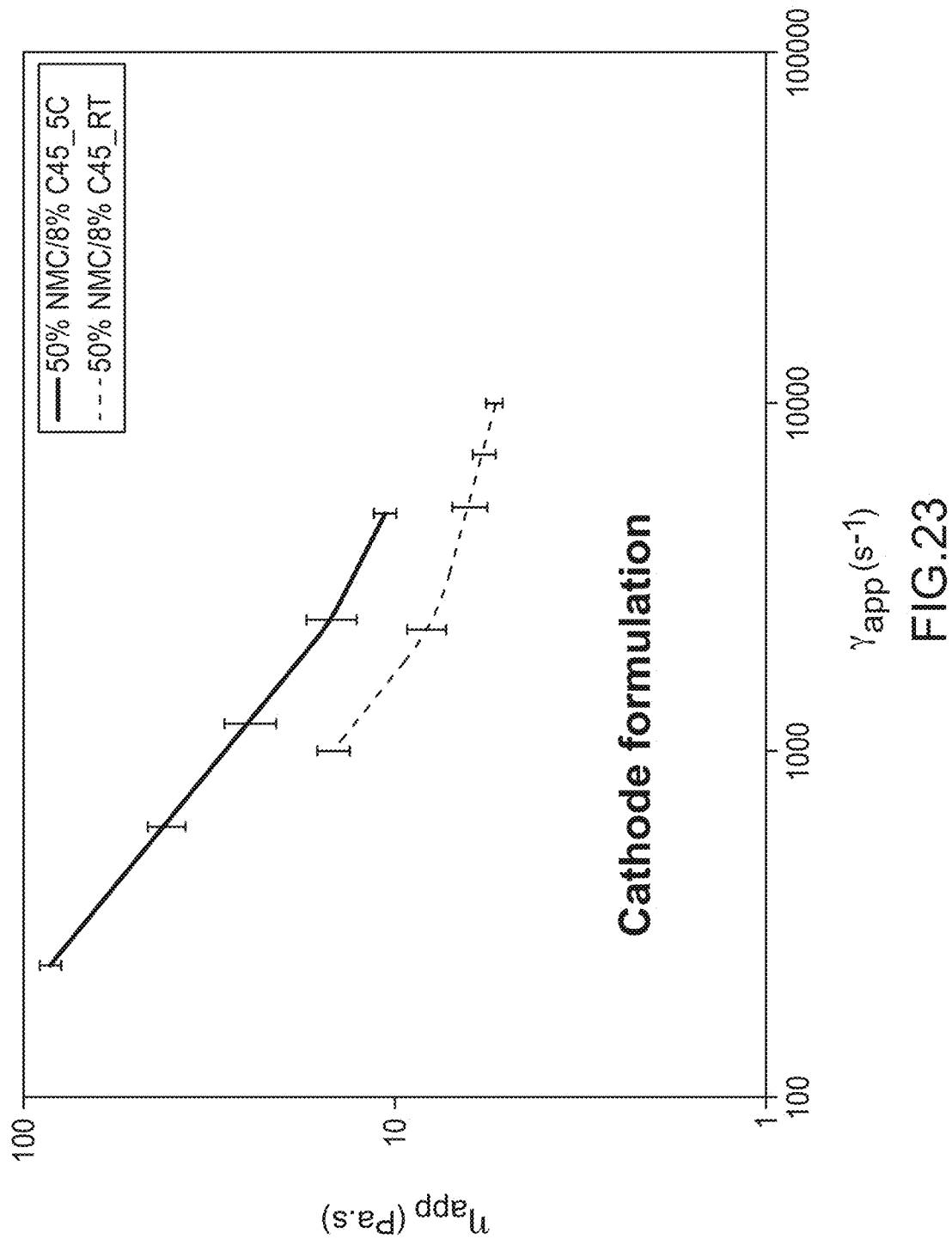

In some embodiments, temperature control can also be used to control electrolyte viscosity, which can affect the rheological behavior of the slurry. FIG. 22 illustrates the effect of varying temperature on the apparent viscosity and apparent shear stress of an anode slurry composition that includes about 45% PGPT and about 4% C45, according to an embodiment. The anode slurry was formulated at a first temperature of −2 degrees Celsius and a second temperature of 5 degrees Celsius. As the temperature of the slurry and/or electrolyte decreases, the viscosity increases. As the viscosity of the electrolyte increases, the force it exerts on the solid particles in suspension as it flows increases. Electrolyte and/or slurries with higher viscosities will tend to decrease the propensity of the solid components of the slurry (active and conductive additive) to move slowly and build up into 'plugs' of solid material. FIG. 23 illustrates the effect of varying temperature on the apparent viscosity and shear stress of a cathode slurry composition that includes about 50% NMC and about 8% C45, according to an embodiment. The cathode slurry was formulated at a first temperature of 5 degrees Celsius and a second temperature of approximately room temperature (RT) (e.g., 25 degrees Celsius). Similar to anode slurry formulation of FIG. 22, viscosity of the cathode slurry increases with decreasing temperature In some embodiments, the temperature of the electrolyte and/or the slurry can have an effect on the adhesion of the slurry to other materials, such as process equipment. At low temperatures, the slurry can have a lower level of adhesion to typical materials used in processing. Conversely, when the slurry is applied to a substrate (e.g., a metallic foil or polymer film) to which adhesion is desired, raising the slurry/substrate interface temperature can act to promote adhesion.

In some embodiments, a processing temperature can be approximately 10 degrees Celsius. In some embodiments, the processing temperature can be lower than 10 degrees Celsius. The processing temperature can be selected to increase the slurry flow stability, for example, by modulating the viscosity of the liquid phase (e.g. electrolyte). Said another way, for a given flow geometry, slurry composition, and driving force, the slurry may experience loss of compositional uniformity (i.e., segregate) at one temperature, but may experience no loss of compositional uniformity at a different temperature. In some embodiments, the slurry flow stability can be modified (e.g., by temperature selection) to improve the conveyance of material through process equipment (e.g., extruder, extrusion die, etc.). In some embodiments, the slurry flow stability can be modified to decrease slurry adhesion to process equipment (e.g., calendar roll, cutting blades, etc.). In some embodiments, the slurry flow stability can be modified to cause desired adhesion to laminating substrates (e.g., metallic foils or polymer films). In some embodiments, the processing temperature can be selected to minimize, or otherwise control, the amount of electrolyte evaporation. In some embodiments, the processing temperature can be varied throughout the process to achieve the desired characteristics at different steps.

In some embodiments, ultrasonication can be used to modulate the conductive network in slurries. For example, vibratory excitation (ultrasonication, vibration, acoustical) can be applied to mixing devices, conveying/compounding devices, and/or the slurry itself (in a container or in situ).

In some embodiments, conductive additives can have aggregation and agglomeration characteristics (surface energies and interparticle forces) that can be modulated by other means, including: temperature, exposure to light or other tuned radiation, application of electrical or magnetic fields, use of additives in the liquid phase of the slurry, specialized coatings on active materials, addition of chemical moieties to the conductive additive, and/or operation in an electrochemical operational configuration before, during, and/or after one or more process steps. For example, a salt can be added before, during and/or after processing.

Battery electrolyte can include one or more solvents, e.g., various organic carbonates. In some embodiments a battery electrolyte can include one more salts. In some embodiments, the electrolyte can contain other additives, for example, surfactants, dispersants, thickeners, and/or any other suitable agents. In some embodiments, the additive can modify the properties of the electrolyte, for example to facilitate flowability, processability, compositional stability, workability, and/or overall manufacturability. The additive can include, for example, fluorinated carbonate derivatives, such as those developed by Daikin industries. These additives can modify slurry properties in desirable ways, such as, for example: (1) increasing liquid phase viscosity—which expands the range of shear rates that can be used in processing while maintaining fluid-solid compositional homogeneity, (2) increasing lubricity—which expands the slipping region during flow and preserves homogeneity, and possibly reduces energy inputs related to processing, (3) reducing mixture vapor pressures, leading to reduced losses during processing in unconfined spaces, among others. In some embodiments, additives such as these may have adverse effects on electrochemical performance, however, the advantages they afford for battery production can outweigh adverse effects.

In some embodiments, the following battery architectures can utilize the approaches described herein: (1) those in which both electrodes are slurry-based, (2) those in which one electrode is slurry-based and the other conventionally cast, (3) those where one electrode is slurry-based and the other is designed to consume and utilize a gas-phase reactant, e.g. oxygen from air. Designs can include single anode-cathode pairs (unit cells), prismatic assemblies with a multiplicity of anode/cathode pairs stacked atop one another, spiral wound assemblies, jelly roll assemblies, and other variants.

In some embodiments, the active materials can include lithium titanate, graphite, silicon alloys, tin alloys, silicon-tin alloys, lithium iron phosphate, lithium transition metal oxides, magnesium compounds, bismuth, boron, gallium, indium, zinc, tin, antimony, aluminum, titanium oxide, molybdenum, germanium, manganese, niobium, vanadium, tantalum, iron, copper, gold, platinum, chromium, nickel, cobalt, zirconium, yttrium, molybdenum oxide, germanium oxide, or any other suitable active material. In some embodiments, the conductive additives can include carbon (high e.g. Ketjen black or low e.g. C45, specific surface area, graphite—natural or manmade, graphene, nanotubes or other nano-structures, vapor grown carbon fibers, pelletized carbons, hard carbon, et al), metal powders (e.g. aluminum, copper, nickel), carbides, and mixtures thereof. In some embodiments, the electrolytes included in the slurries can include ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate, butylpropyl carbonate, y-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, and the like.

Figure 24:
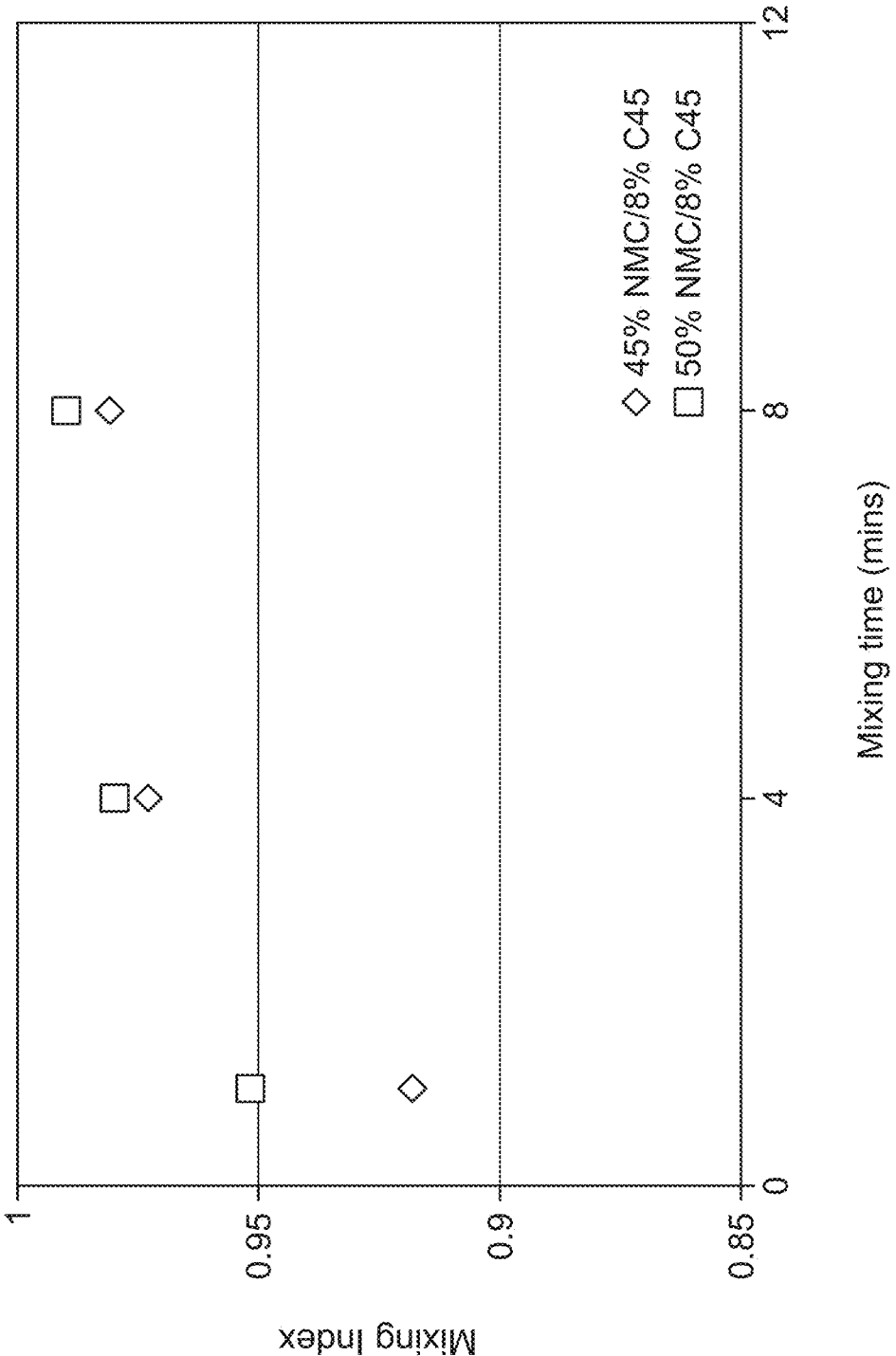
FIG. 24 illustrates the mixing index over time for two different exemplary cathode compositions.
Figure 25:
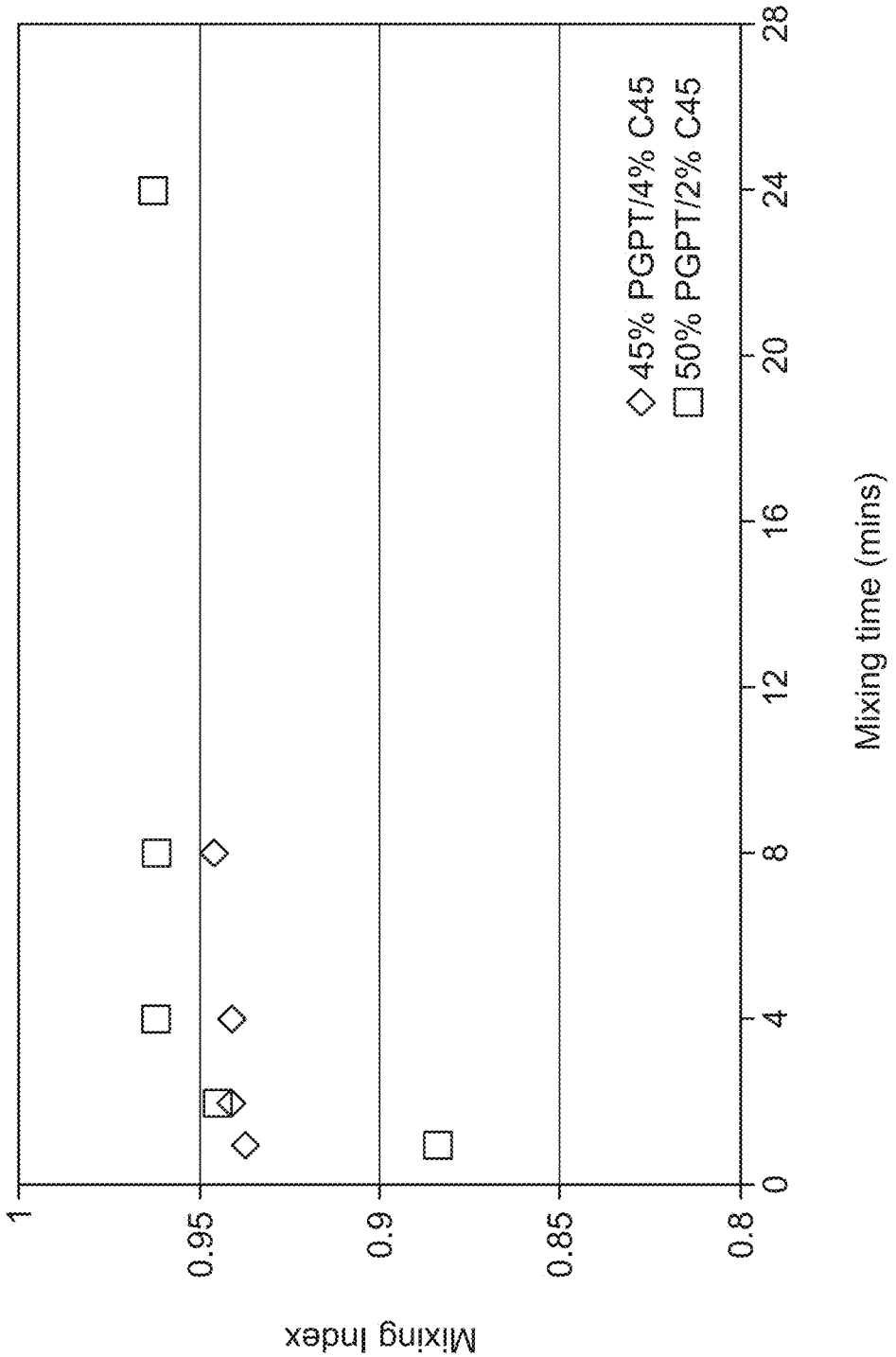
FIG. 25 illustrates the mixing index over time for two different exemplary anode compositions.

In some embodiments, the progression of mixing index over time for a fixed RPM (e.g., 100 RPM) mixing speed can depend on the composition of the materials being mixed. For example, FIG. 24 illustrates the mixing index at 100 rpm over time for a first cathode composition that includes about 45% NMC and about 8% C45, and a second cathode composition that includes about 50% NMC and about 8% C45. The mixing index of FIG. 25 illustrates the mixing index at 100 rpm over time for a first anode composition that includes about 45% PGPT and about 4% C45 and a second anode composition that includes about 50% PGPT and 2% C45. In each case, nine samples having volumes in the range of about 0.1-0.2 cubic millimeters were used to quantify the mixing index. As shown in FIG. 24 and FIG. 25 the cathode and anode slurries show an increase in the mixing index with mixing time. As shown in FIG. 25, the mixing index can, for example, plateau after a certain mixing time, e.g., 8 minutes, after which any more mixing does not cause an increase in the mixing index.

Figure 26:
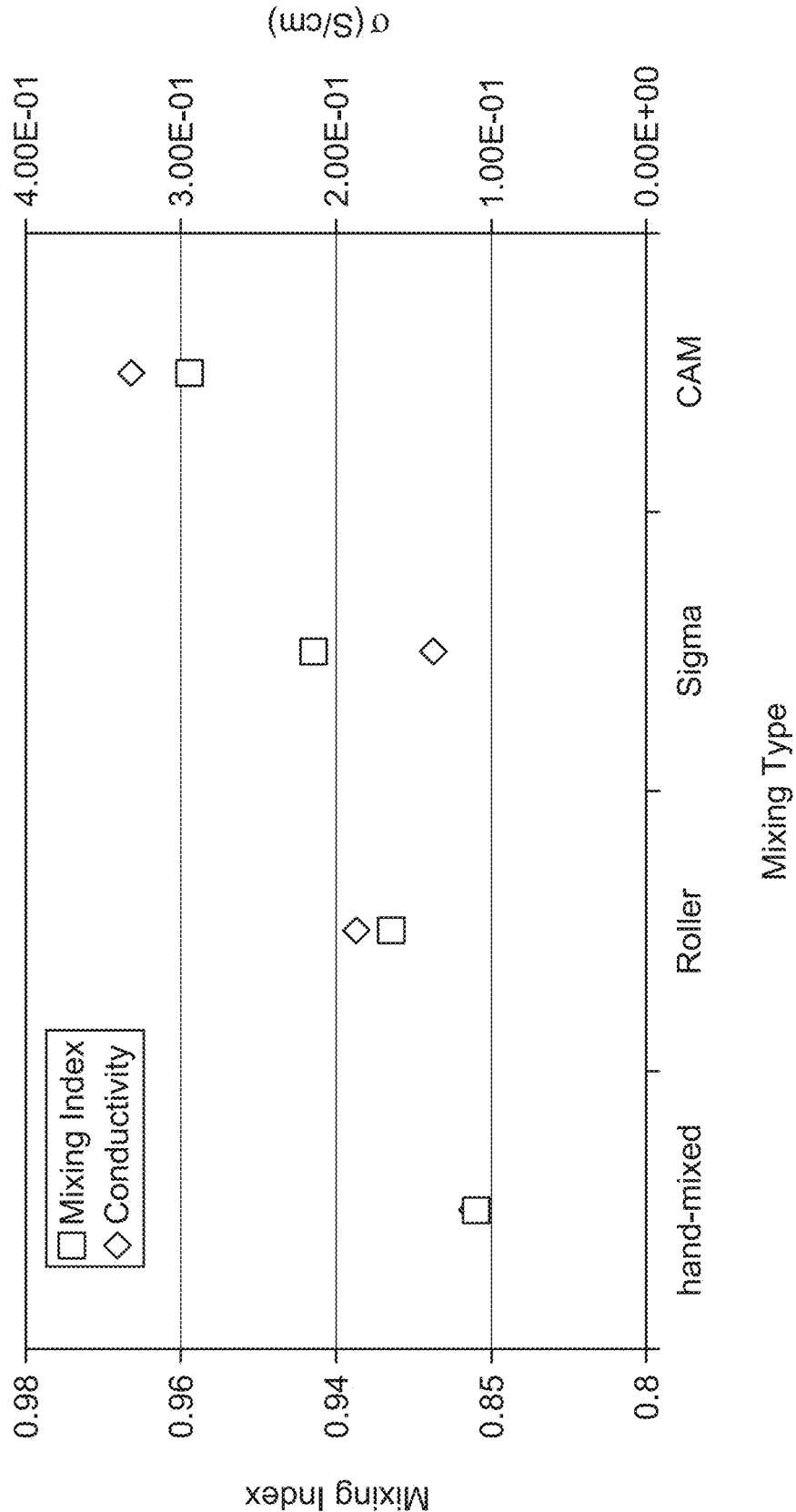
FIG. 26 illustrates the mixing index and conductivity for an anode composition prepared using various mixing processes.
Figure 27:
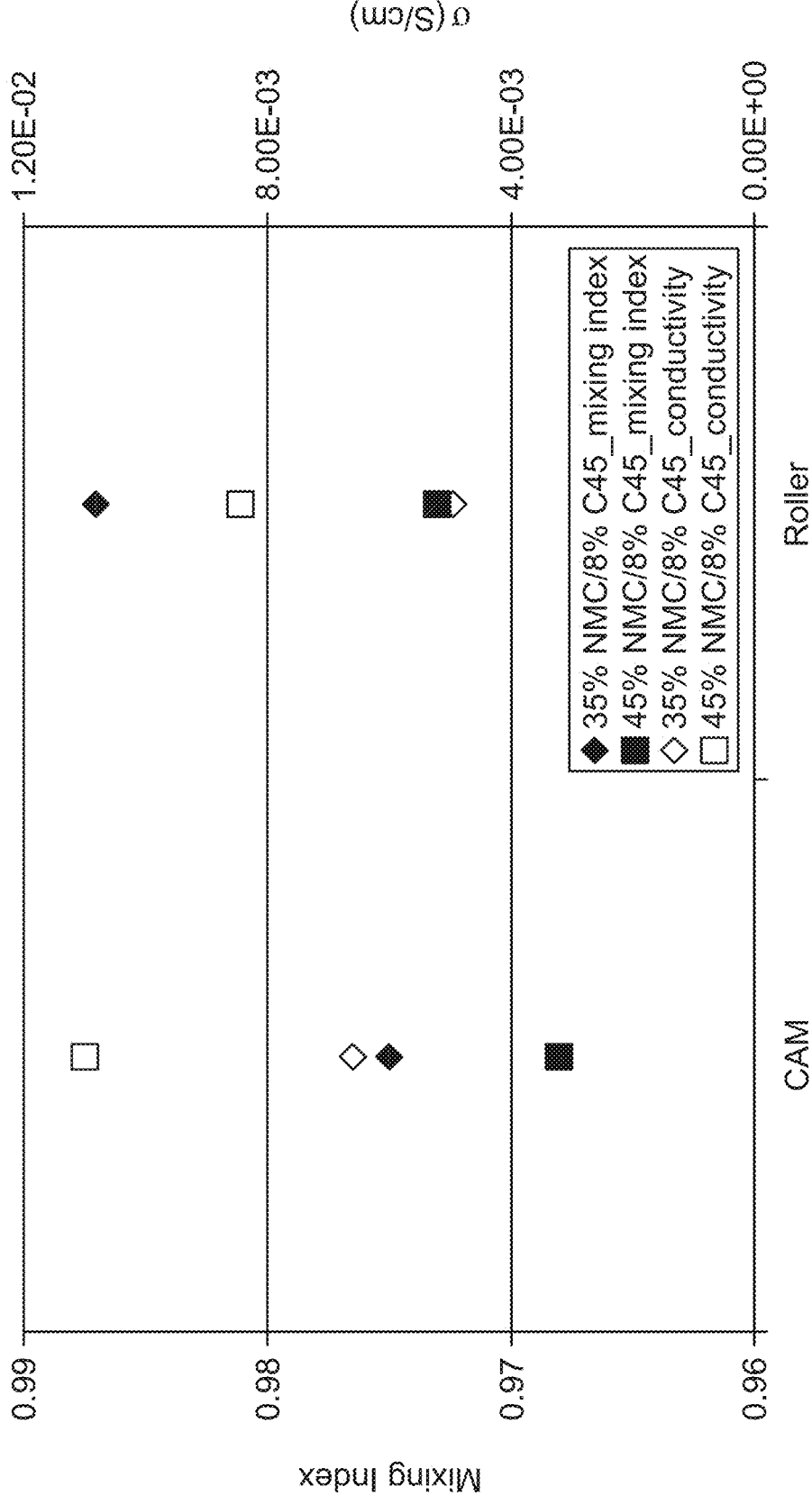
FIG. 27 illustrates the mixing index and conductivity for two different cathode compositions, prepared using two different mixing methods.

In some embodiments, different mixing processes can produce different degrees of mixing (i.e., mixing index) and electrical conductivity for the same anode and/or cathode composition. For example, FIG. 26 illustrates the mixing index and electrical conductivity for an anode composition that includes about 35% PGPT and about 2% C45, mixed at a fixed mixing speed of 100 RPM for 4 minutes with four different mixing techniques (e.g., hand-mixed, roller, sigma and CAM). As shown, sigma achieves better uniformity (i.e., higher mixing index), but roller achieves higher electrical conductivity. Furthermore, CAM achieves the highest uniformity (e.g., mixing index of about 0.96) and electrical conductivity (e.g., 0.33 S/cm) under these mixing conditions. FIG. 27 illustrates the mixing index and electrical conductivity for a first cathode composition that includes about 35% NMC and 8% C45 and a second electrode composition that includes about 45% NMC and 8% C45, both mixed at a fixed mixing speed of 100 RPM for 4 minutes with two different mixing techniques (e.g., CAM and roller). While the 35% NMC/8% C45 slurry achieves a higher mixing index with the roller mixer, the 45% NMC/8% C45 slurry achieves a higher mixing index with the CAM roller.

Figure 28:
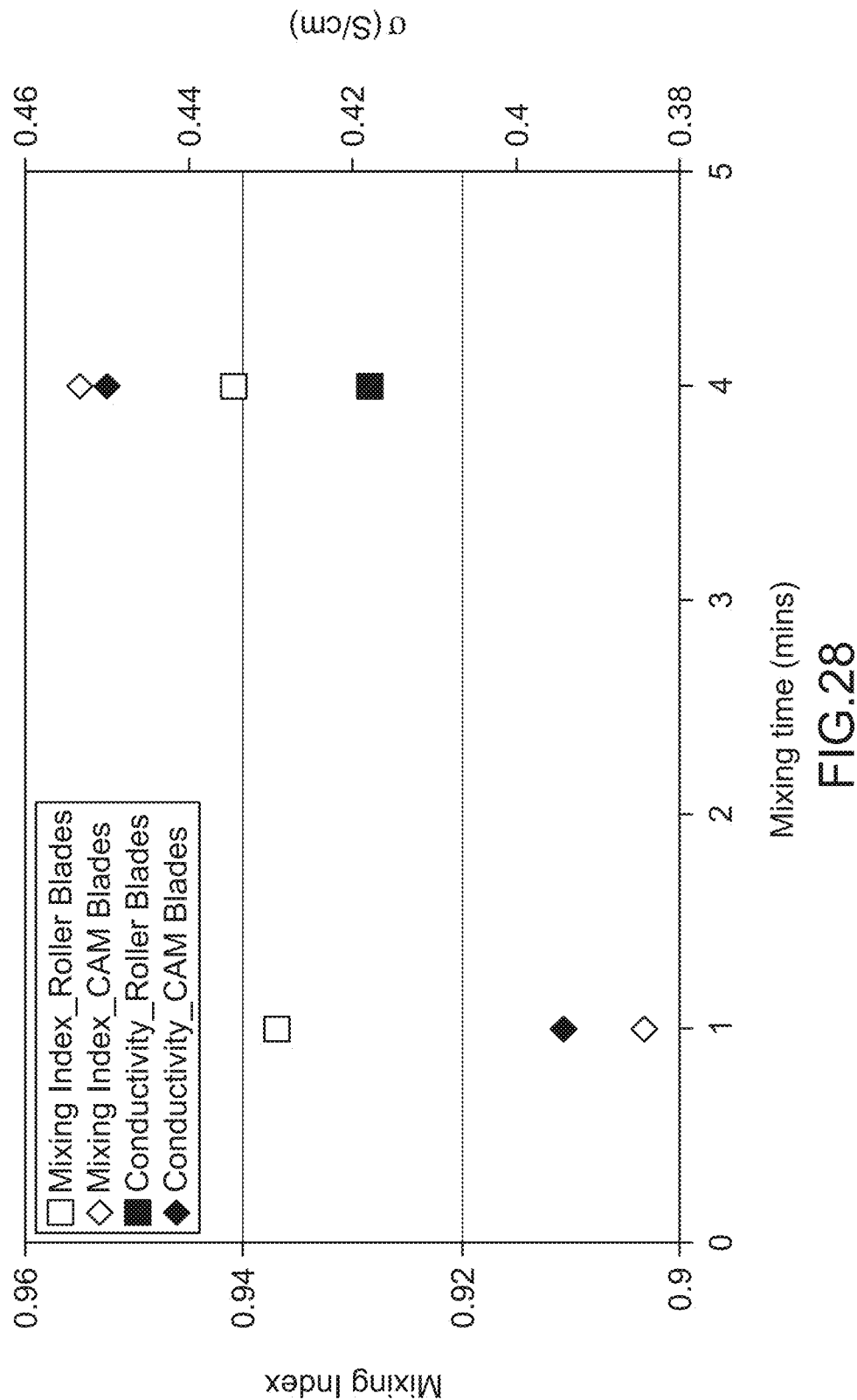
FIG. 28 illustrates the mixing index and conductivity for an anode composition mixed for two different mixing times.

In some embodiments, the type of mixing process used can also have an effect on the conductivity of the slurry. For example, FIG. 28, illustrates the mixing index and conductivity of an anode composition that includes about 45% PGPT and about 4% C45, mixed using a first mixing process (e.g., roller blade) or a second mixing process (e.g. CAM blade) for a time period of 1 minutes or 4 minutes. As shown herein, for relatively short mixing times (e.g. 1 minute), some mixing types (e.g., roller) actually achieve higher uniformity than other mixing types (e.g., CAM). However, over time (e.g. 4 minutes), the mixing index for the two types of mixing types reverses with the CAM producing higher uniformity. Furthermore, a higher conductivity can be achieved after mixing for longer time periods (e.g., 0.45 S/cm) in some cases.

Figure 29:
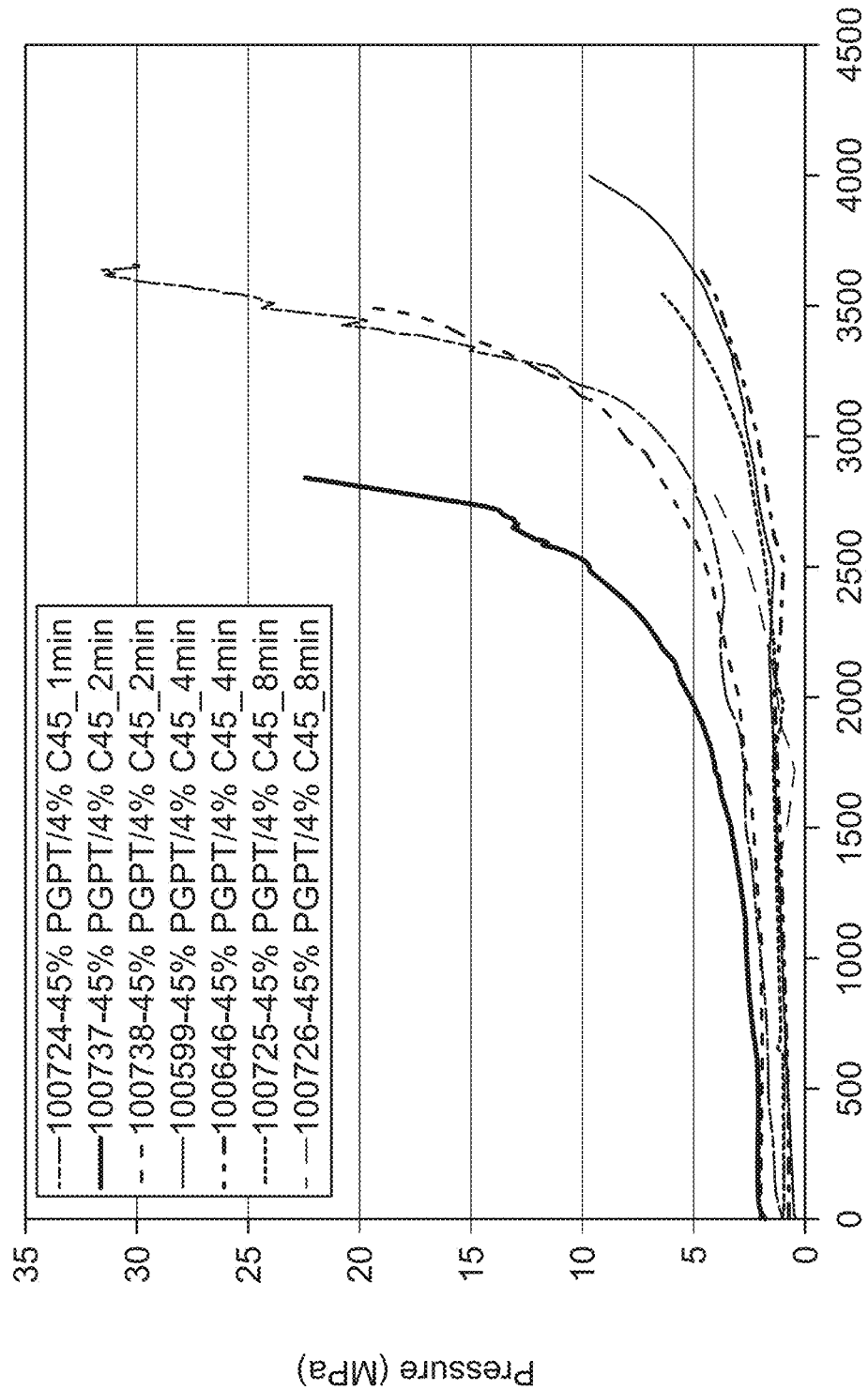
FIG. 29 illustrates the effect of mixing time on stability during processing for a first anode composition.
Figure 30:
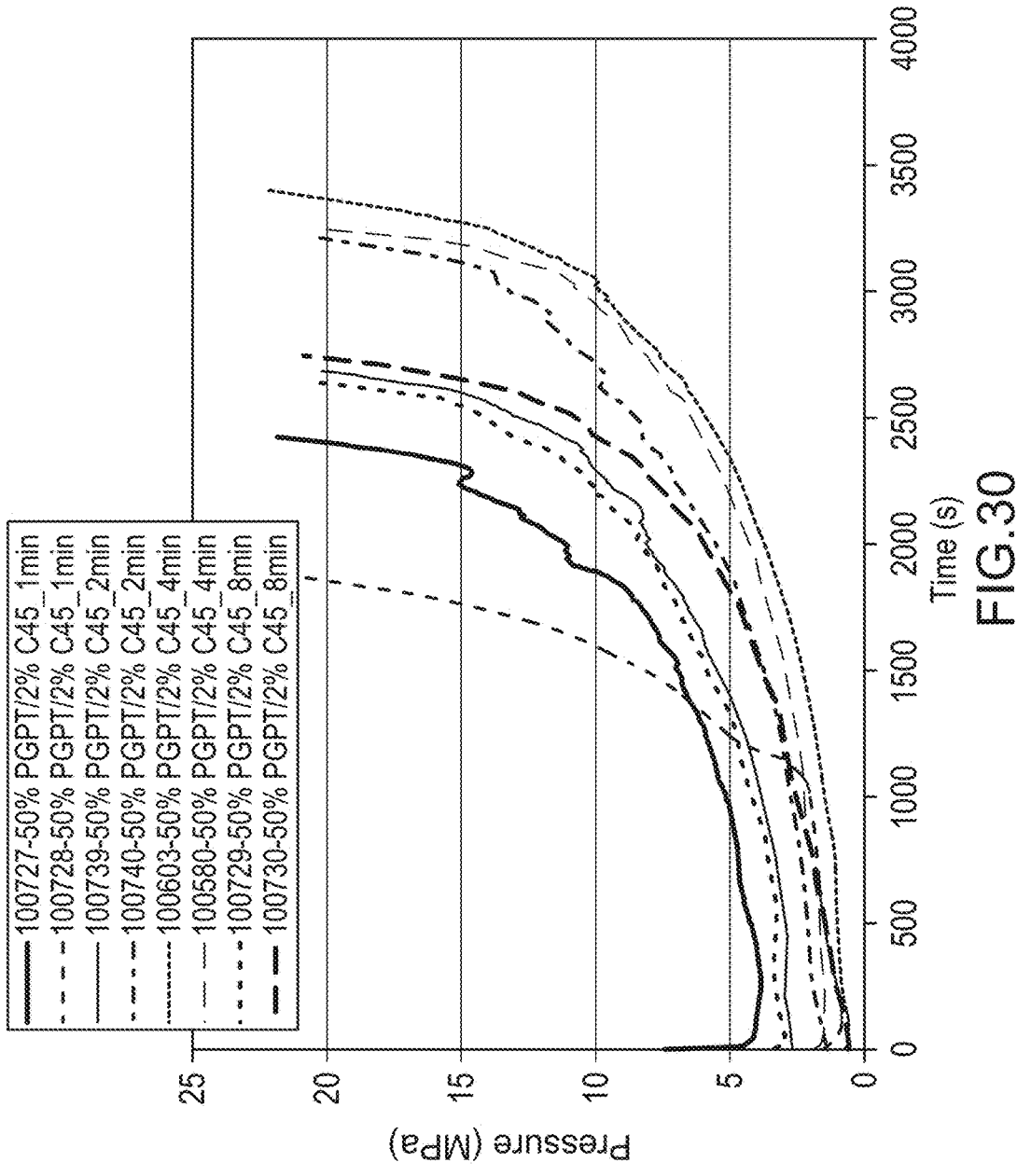
FIG. 30 illustrates the effect of mixing time on stability during processing for a second anode composition.

In some embodiments, the mixing time can affect the flowability of a slurry which is an indicator of slurry stability. For example FIGS. 29-30 illustrate data from rheometer testing to assess the compositional stability of a first anode slurry formulation, which includes about 45% PGPT and 4% C45, and a second anode slurry formulation that includes 50% PGPT and about 2% C45, respectively. Each of the first and the second anode slurry formulations was mixed for 1 minute, 2 minutes, 4 minutes or 8 minutes. Under a stable set of process conditions, the pressure required to drive the slurry typically remains relativity constant in time. The timescale of pressure deviating from flat is an indicator of stability. In FIG. 30, the first anode slurry formulation with the highest stability is one with an intermediate mixing time of 4 minutes, slurries mixed for less (1 and 2 minutes) and more (8 minutes) are less stable. In FIG. 30, a similar trend is observed for the second anode slurry formulation. FIG. 31 shows micrographs of the first anode slurry and the second anode slurry which were mixed for the various time periods as described herein. As shown herein, the first and the second anode slurry mixed for 4 minutes are the most stable.

Figure 32:
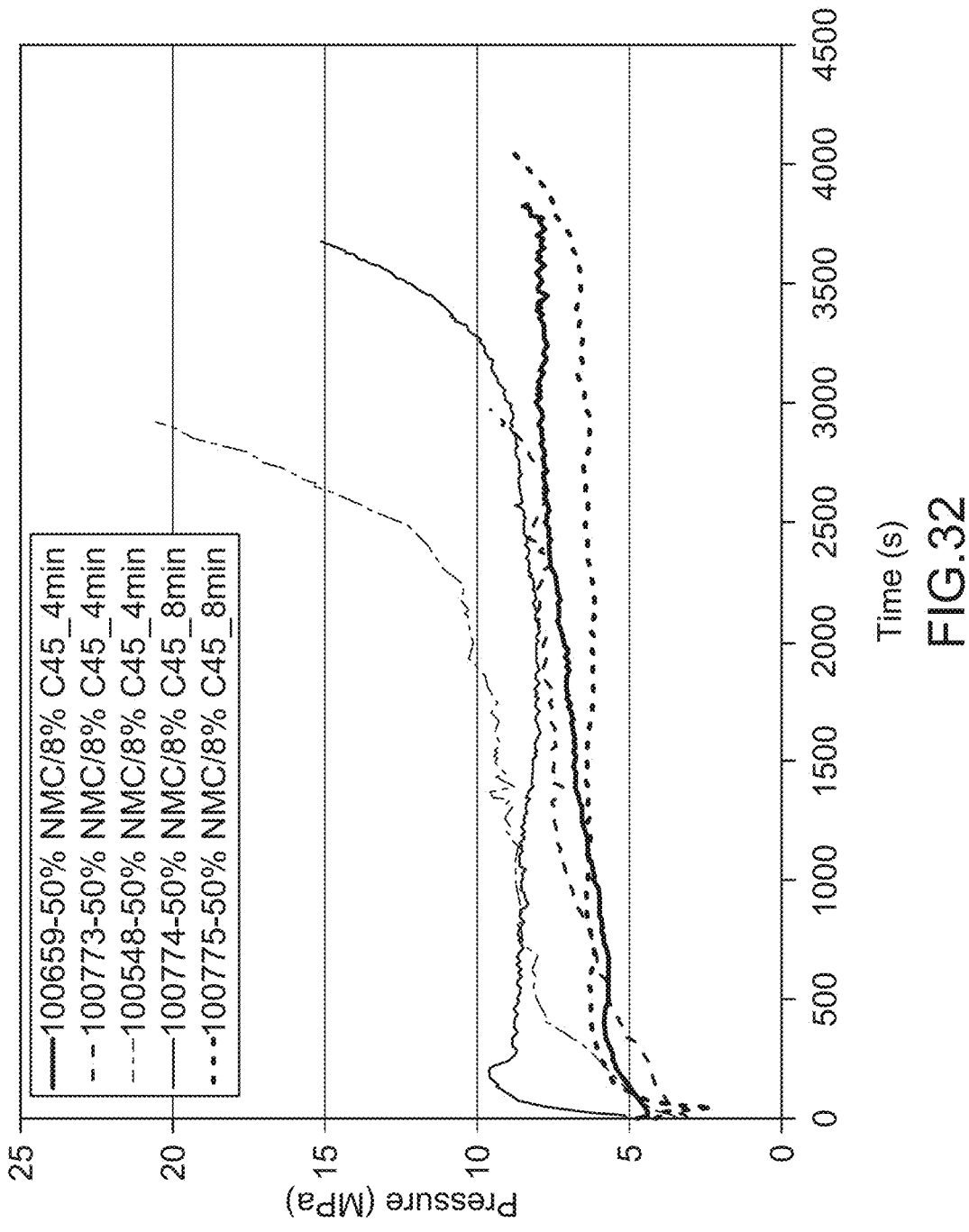
FIG. 32 illustrates the effect of mixing time on stability during processing for a first cathode composition.
Figure 33:
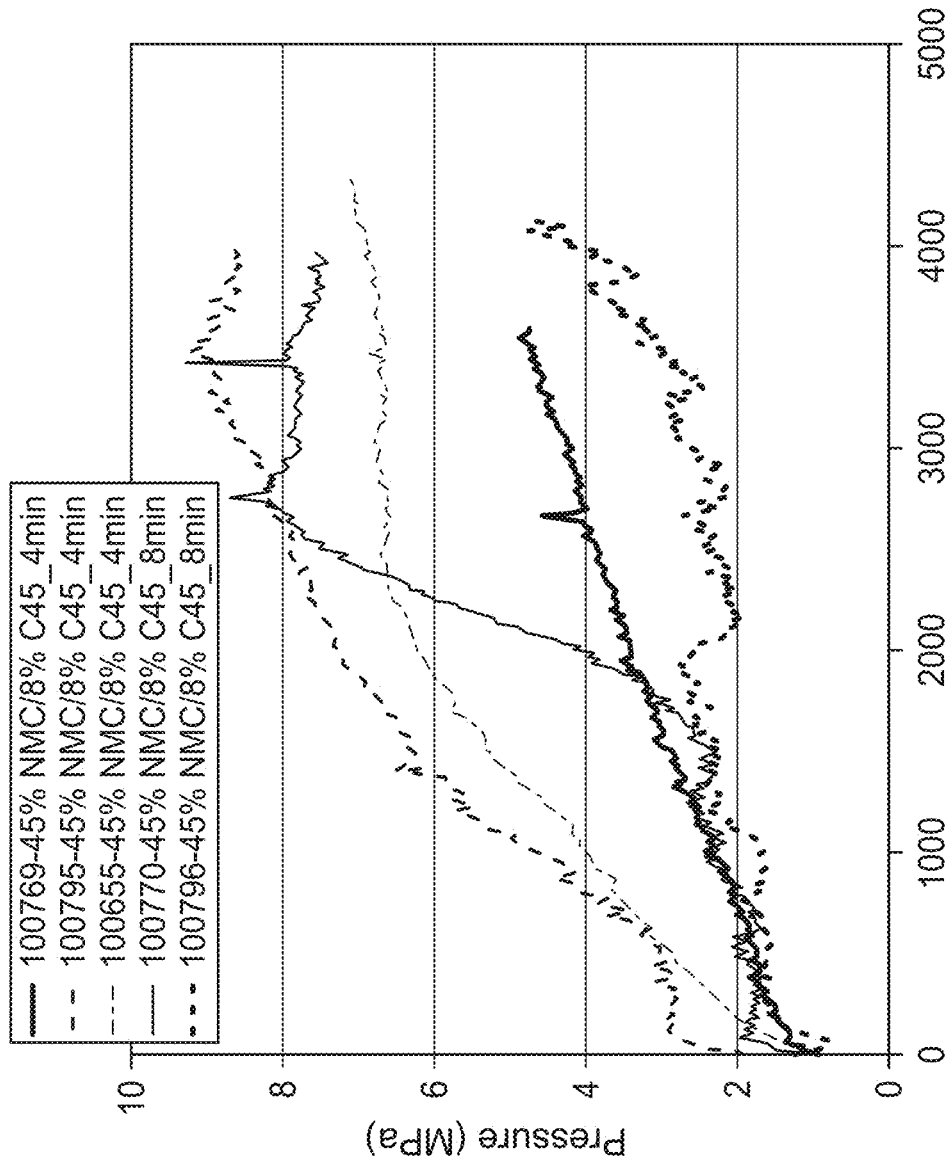
FIG. 33 illustrates the effect of mixing time on stability during processing for a second cathode composition.

Referring now to FIGS. 32-33, data from rheometer testing to assess the compositional stability of a first cathode slurry formulation that includes about 50% NMC and 8% C45, and a second cathode slurry formulation that includes 45% NMC and about 8% C45, respectively. Each of the first and the second cathode slurry formulations was mixed for 4 minutes or 8 minutes. Results from slurries mixed at 1 minute are not shown as they were too unstable to hold shape. As shown in FIG. 30 and FIG. 31, the first and second cathode slurries mixed for 4 minutes or 8 minutes show equally good rheological characteristics. FIG. 34 shows micrographs of the first cathode slurry and the second cathode slurry, which were mixed for the various time periods as described herein. As shown, the first and second cathode slurries mixed for 1 minute are unstable and breaking apart, while the first and second cathode slurries mixed for 4 or 8 minutes are stable.

Conductivity, homogeneity, and rheological parameters like viscosity are slurry characteristics that can be measured outside of an electrochemical cell. These are used as indicators of potential electrochemical performance, life, and processability, and are important "figures of merit" for slurries. That said, others parameters such as, for example, ionic conductivity, dynamic electrical response e.g. impedance, modulus of elasticity, wettability, optical properties, and magnetic properties can be used as indicators of electrochemical performance.

In some embodiments, determining if a slurry has useful electrochemical properties can include verifying performance of the slurry in an electrochemical cell. Discharge capacity at C/10 or higher current rate that is of at least 80% of the theoretical capacity of the electrode over a cell voltage range from 50% to 150% of the discharge voltage at which the magnitude of the differential capacity dQ/dV reaches a maximum can serve as a reference definition for a slurry to have useful electrochemical properties. The following examples show the electrochemical properties of various semi-solid electrodes formed using the slurry preparation methods described herein. These examples are only for illustrative purposes and are not intended to limit the scope of the present disclosure.

Example 1

An LFP semi-solid cathode was prepared by mixing 45 vol % LFP and 2 vol % carbon black with an ethylene carbonate/dimethyl carbonate/LiPF$_6$ based electrolyte. The cathode slurry was prepared using a batchmixer with a roller blade fitting. Mixing was performed at 100 rpm for 2 minutes. The semi-solid slurry had a mixing index greater than 0.9 and a conductivity of $1.5 \times 10^{-4}$ S/cm. The slurry was made into an electrode of 250 μm thickness and was tested against a Li metal anode in a Swagelok cell configuration. The cell was tested using a Maccor battery tester and was cycled between a voltage range of V=2-4.2 V. The cell was charged using a constant current-constant voltage with a constant current rate at C/10 and C/8 for the first two cycles then at C/5 for the latter cycles. The constant current charge is followed by a constant voltage hold at 4.2 V until the charging current decreased to less than C/20. The cell was discharged over a range of C-rates between C/10 and 5 C.

Figure 35A:
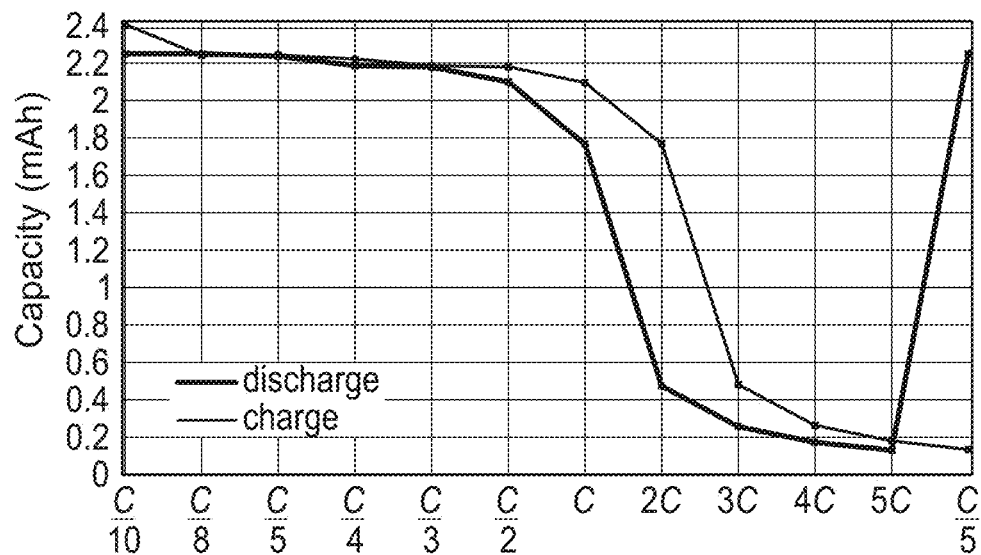
FIGS. 35A-35B illustrate the capacity of an exemplary semi-solid cathode formulation as a function of charge and discharge rate, and a sample charge/discharge curve.
Figure 35B:
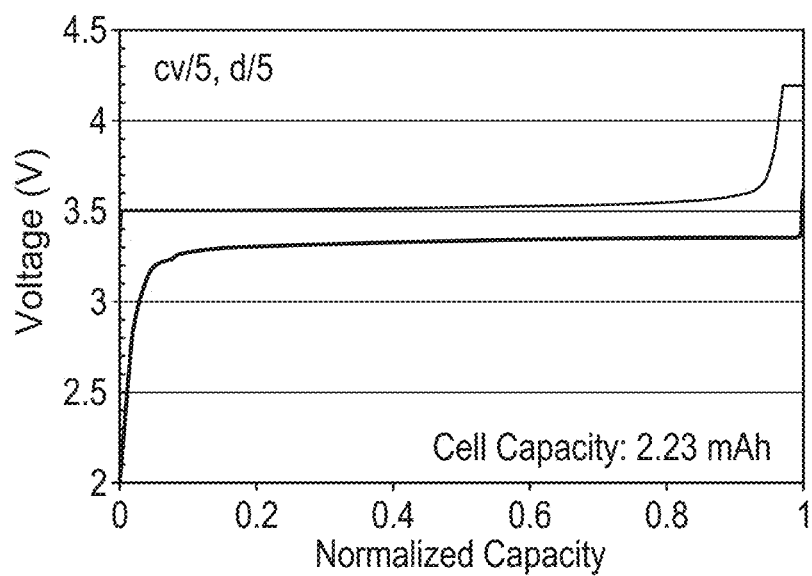

FIG. 35A illustrates the charge and discharge capacities as a function of the discharge C-rate for the semi-solid electrode of Example 1, and 35B illustrates a representative charge and discharge curve at low C-rates. The nominal cell capacity of 2.23 mAh corresponds to complete utilization of the LFP cathode active material. It is seen that a majority of the cell capacity is obtained under the test conditions for C-rates up to 1 C.

Example 2

An NMC semi-solid cathode was prepared by mixing 45 vol % NMC and 8 vol % carbon black with an ethylene carbonate/dimethyl carbonate/LiPF$_6$ based electrolyte. The cathode slurry was prepared using a batchmixer with a roller mill blade fitting. Mixing was performed at 100 rpm for 4 minutes so that the semi-solid slurry had a mixing index greater than 0.9 and a conductivity of $8.5 \times 10^{-3}$ S/cm. The cathode was tested against a Li metal anode using the same cell configuration as in Example 1. The cell was tested using a Maccor battery tester and was cycled between a voltage range of V=2-4.3 V. The cell was charged using a constant current-constant voltage with a constant current rate at C/10 and C/8 for the first two cycles then at C/5 for the latter cycles. The constant current charge was followed by a constant voltage hold at 4.2 V until the charging current was less than C/20. The cell was discharged over a range of C-rates between C/10 and 5 C.

Figure 36A:
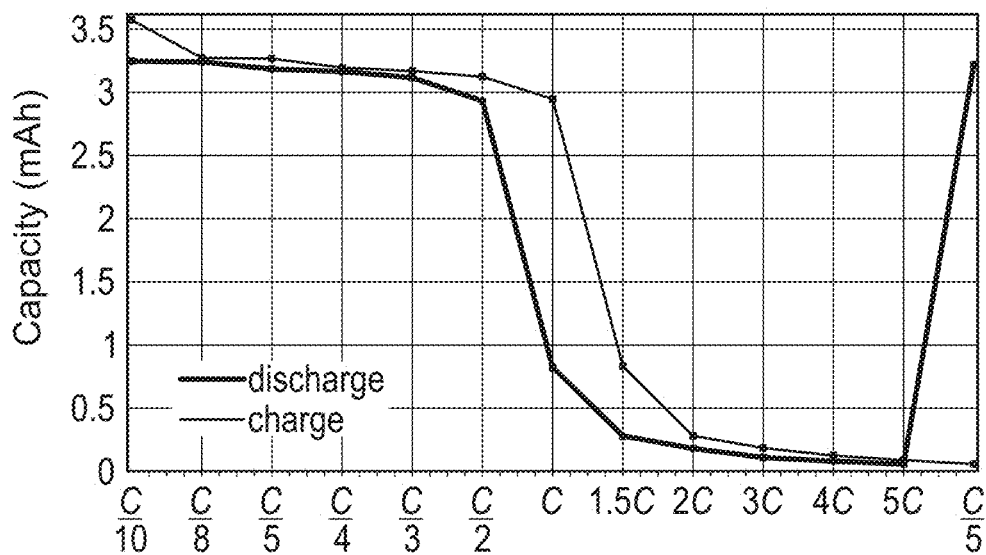
FIGS. 36A-36B illustrate the capacity of an exemplary semi-solid cathode formulation as a function of charge and discharge rate, and a sample charge/discharge curve.
Figure 36B:
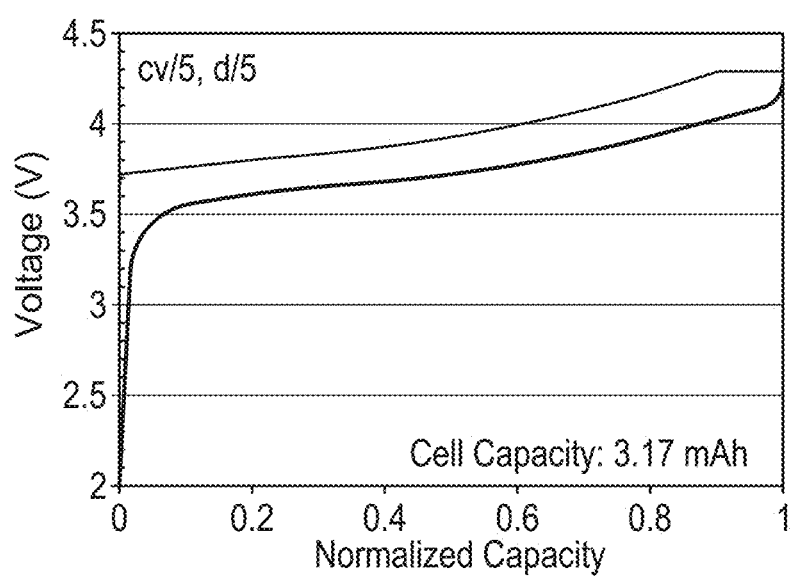

FIG. 36A illustrates the charge and discharge capacities as a function of the discharge C-rate for the semi-solid electrode of Example 2, and 36B illustrates a representative charge and discharge curve at low C-rates. The nominal cell capacity of 3.17 mAh corresponds to complete utilization of the NMC cathode active material over the voltage range tested. It is seen that a majority of the cell capacity is obtained under the test conditions for C-rates up to C/2.

Example 3

An NMC semi-solid cathode was prepared by mixing 55 vol % NMC and 4 vol % carbon black with an ethylene carbonate/dimethyl carbonate based/LiPF6 based electrolyte. The cathode slurry was prepared using a batchmixer with a roller blade fitting. Mixing was performed at 100 rpm for 4 minutes so that the semi-solid slurry had a mixing index greater than 0.9 and a conductivity of $8.4 \times 10^{-4}$ S/cm. The cathode slurry was tested against Li metal using the same cell configuration and test procedure as in Example 2.

Figure 37A:
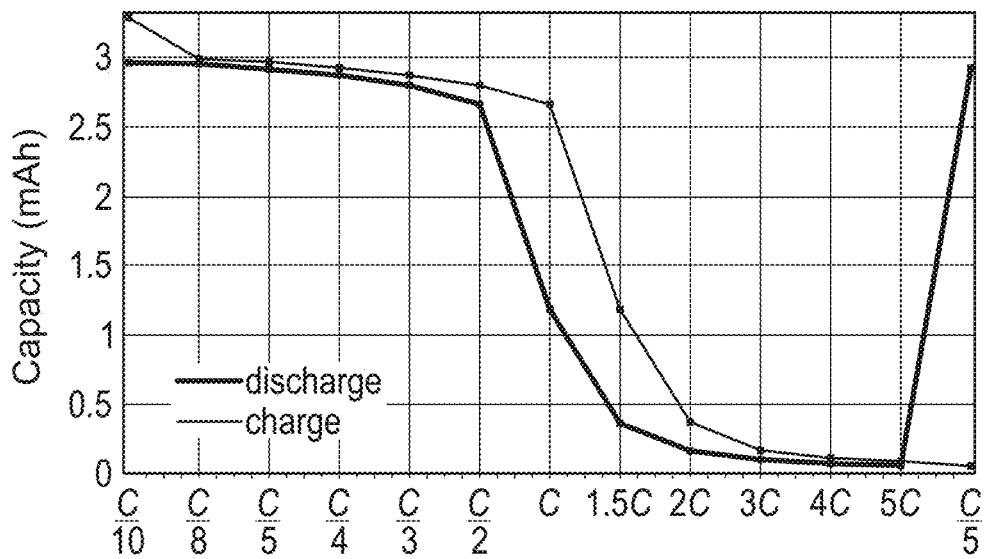
FIGS. 37A-37B illustrate the capacity of an exemplary semi-solid cathode formulation as a function of charge and discharge rate, and a sample charge/discharge curve.
Figure 37B:
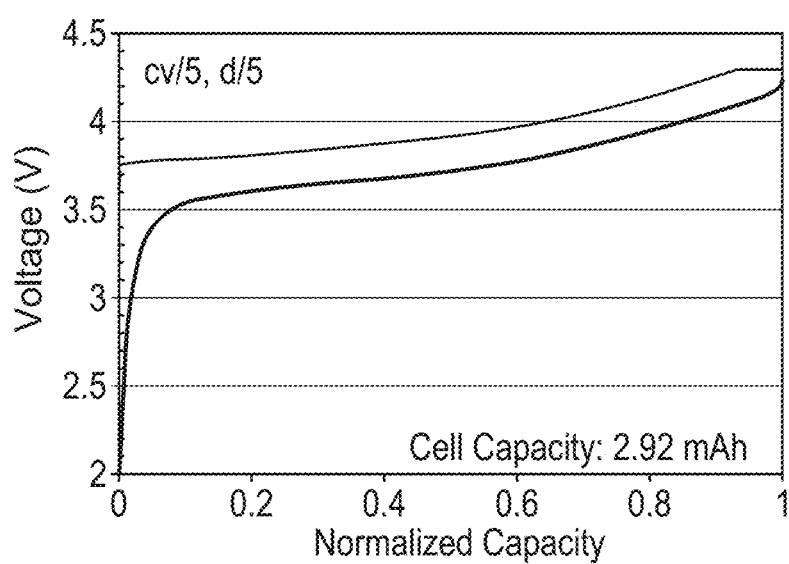

FIG. 37A illustrates the charge and discharge capacities as a function of the discharge C-rate for the semi-solid electrode of Example 3, and 37B illustrates a representative charge and discharge curve at low C-rates. The nominal cell capacity of 2.92 mAh corresponds to complete utilization of the NMC cathode active material over the voltage range used. It is seen that a majority of the cell capacity is obtained under the test conditions for C-rates up to C/2.

Example 4

An NMC semi-solid cathode was prepared by mixing 60 vol % NMC and 2 vol % carbon black with an ethylene carbonate/dimethyl carbonate/LiPF6 based electrolyte. The cathode slurry was prepared using a batchmixer with a roller blade fitting. Mixing was performed at 100 rpm for 4 minutes. The cathode slurry was tested against Li metal using the same cell configuration and test procedure as in Example 2.

Figure 38A:
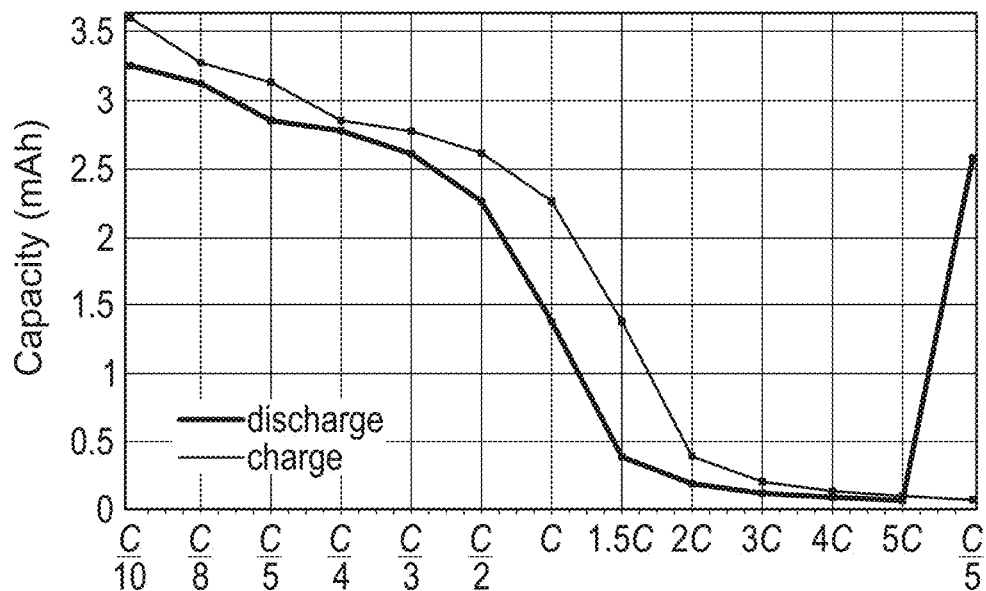
FIGS. 38A-38B illustrate the capacity of an exemplary semi-solid cathode formulation as a function of charge and discharge rate, and a sample charge/discharge curve.
Figure 38B:
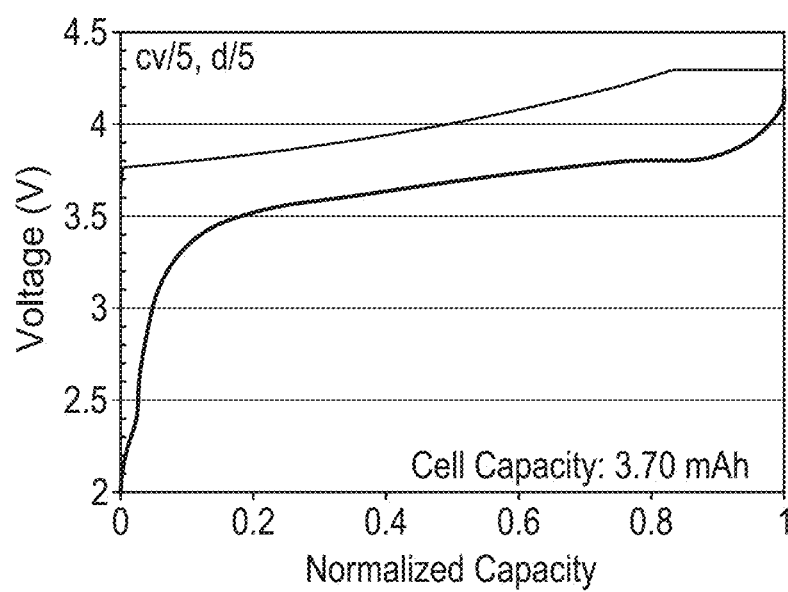

FIG. 38A illustrates the charge and discharge capacities as a function of the discharge C-rate for the semi-solid electrode of Example 4, and 38B illustrates a representative charge and discharge curve at low C-rates. The nominal cell capacity of 3.70 mAh corresponds to complete utilization of the NMC cathode active material over the voltage range used. It is seen that a majority of the cell capacity is obtained under the test conditions for C-rates up to C/2.

In some embodiments, cell stability under cycle testing can also be used to evaluate slurries and/or electrochemical cell performance. Stability means sufficiently high retention of electrochemical capacity from cycle to cycle such as, for example, 99% or higher. The following examples demonstrate cell stabilities under cycle testing of two slurry formulations prepared using the semi-solid electrode preparation methods described herein.

Example 5

An NMC semi-solid cathode was prepared by mixing 35 vol % NMC and 8 vol % carbon black with an ethylene carbonate/dimethyl carbonate/LiPF$_6$ based electrolyte. The cathode slurry was prepared using a batchmixer with a roller blade fitting. Mixing was performed at 100 rpm for 4 minutes. This yielded a semi-solid cathode suspension having a mixing index of 0.987 and a conductivity of $5 \times 10^{-3}$ S/cm. A graphite semi-solid anode was prepared by mixing 35 vol % graphite and 2 vol % carbon black in the same composition electrolyte as used for the cathode. The anode slurry formulation was mixed at 100 rpm for 20 seconds to yield a semi-solid anode suspension having a mixing index of 0.933 and a conductivity of 0.19 S/cm. The cathode and anode semi-solid slurries were formed into electrodes, each with 500 μm thickness. The electrodes were used to form a NMC-Graphite based electrochemical cell having active areas for both cathode and anode of approximately 20 cm$^2$. The cell was cycled between 2.75-4.2 V at various C rates. Over this voltage range the expected specific capacity of the NMC cathode is 155 mAh/g. The cell was cycled using a constant current-constant voltage charging (CC-CV) and a constant current discharge protocol between 2.75-4.2 V. At certain stages of testing a pulse charge and discharge test was performed (indicated on the plot by "DCR"). During the DCR test cycle, the capacity value for that cycle is then appeared to be close to zero on the plot (e.g. cycle $14^{th}$, $34^{th}$ and $55^{th}$). For the constant current-constant voltage charge steps, the cell was subjected to a constant current at the rate specified e.g. CC/10 and as the voltage limit was reached, the cell was charged at a constant voltage until the current drop below C/20 before it was switched to discharge. Constant current was used for all discharging steps. The discharge current was the same current as the charge current on that cycle. For example, a CC-CV/10 cycle defined on the chart means that the cell was charged using a constant current of C/10, followed by a constant voltage charge until the current value dropped to C/20. The cell was then discharge at C/10 until the lower voltage limit was reached. The number of cycle of that type of charge/discharge protocol is indicated as "x number of cycle". For example, "CC-CV/5×3" means that during that stage of testing, the cells were charged at a constant current of C/5 followed by a constant voltage hold at 4.2V and the step was repeated 3 times.

Figure 39A:
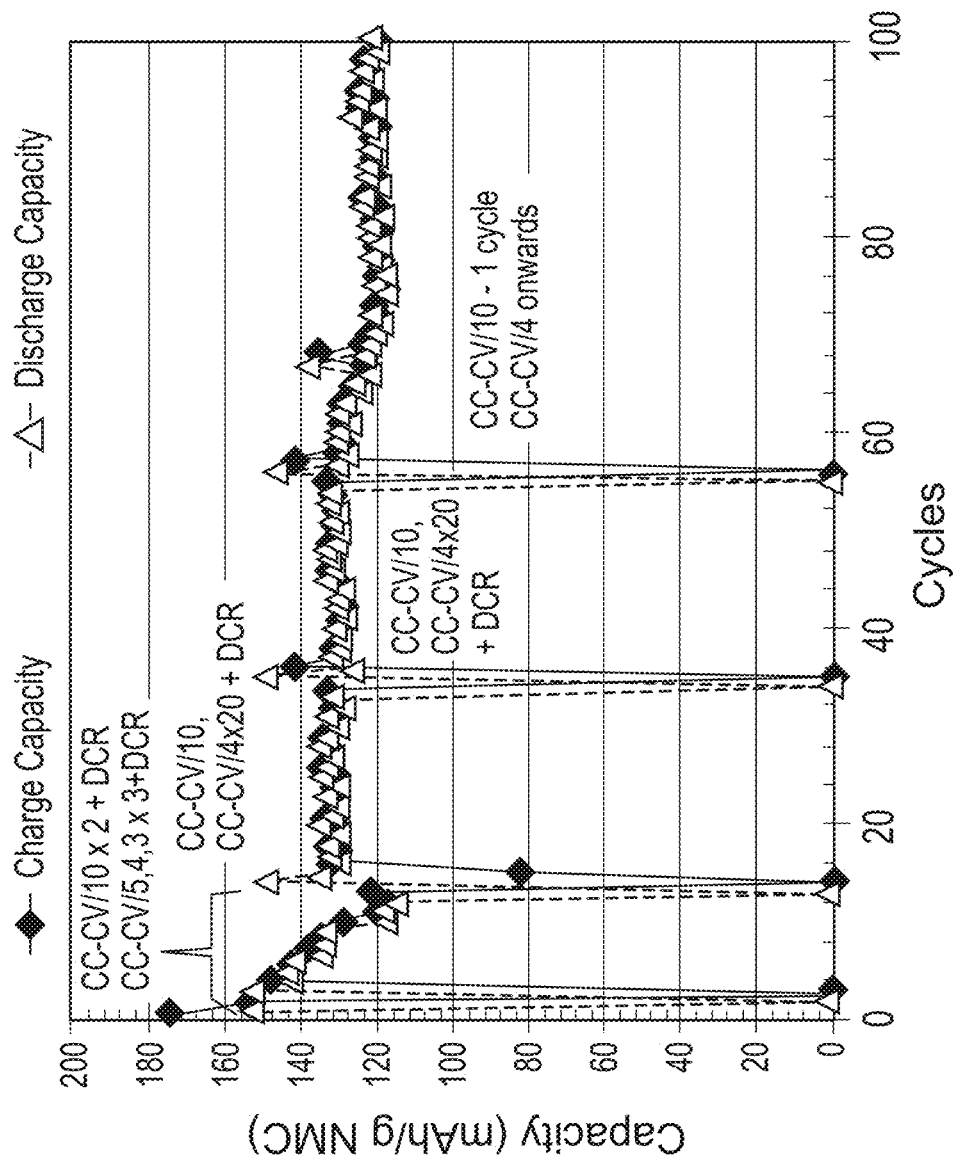
FIGS. 39A-39B illustrate the performance of a semi-solid based electrochemical cell over 100 cycles, and a sample charge/discharge curve.
Figure 39B:
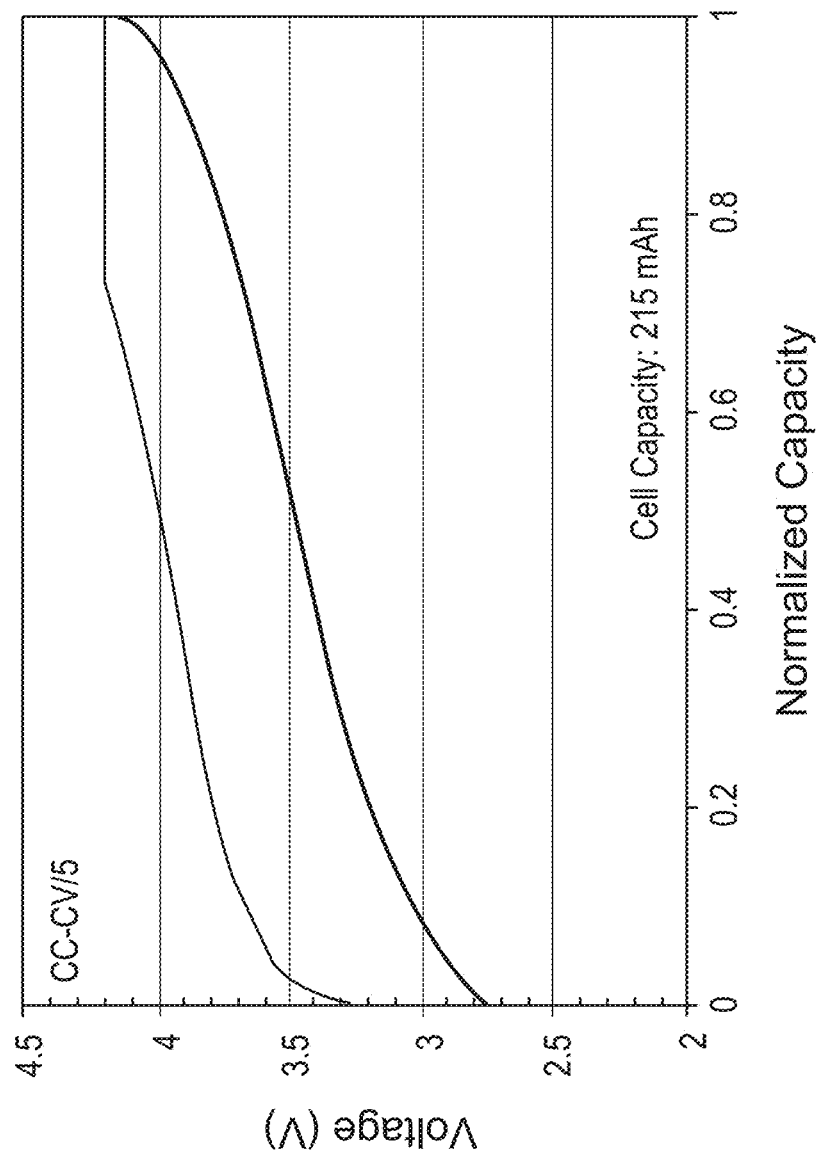

FIG. 39A shows results of charge/discharge cycle results for the electrochemical cell of Example 5. The electrochemical cell shows a capacity corresponding to about 160 mAh per gram of NMC in the first charge/discharge cycle, and maintains a capacity of about 120 mAh/g of NMC even after 100 charge/discharge cycles. FIG. 39B shows a representative charge and discharge curve for the electrochemical cell. The measured cell capacity of the electrochemical cell was 215 mAh.

Example 6

An NMC semi-solid cathode was prepared by mixing 45 vol % NMC and 8 vol % carbon black with an ethylene carbonate/dimethyl carbonate/LiPF6 based electrolyte. The cathode slurry was prepared using a batchmixer with a roller blade fitting. Mixing was performed at 100 rpm for 4 minutes. This yielded a semi-solid cathode suspension having a mixing index of 0.973 and a conductivity of 0.0084 S/cm. A graphite semi-solid anode was prepared by mixing 50 vol % graphite and 2 vol % carbon black in the same electrolyte as the cathode. The anode slurry formulation was mixed at 100 rpm for 20 seconds to yield a semi-solid anode suspension having a mixing index of 0.962 and a conductivity of 2 S/cm. The cathode and anode semi-solid slurries were formed into electrodes each with 500 μm thickness. The electrodes were used to form a NMC-Graphite based electrochemical cell having active areas for both cathode and anode of approximately 20 cm². The cell was cycled using a constant current-constant voltage charging (CC-CV) and a constant current discharge between 2.75-4.2 V with a similar protocol to that shown in Example 5. Over this voltage range the expected specific capacity of the NMC cathode is 155 mAh/g.

Figure 40A:
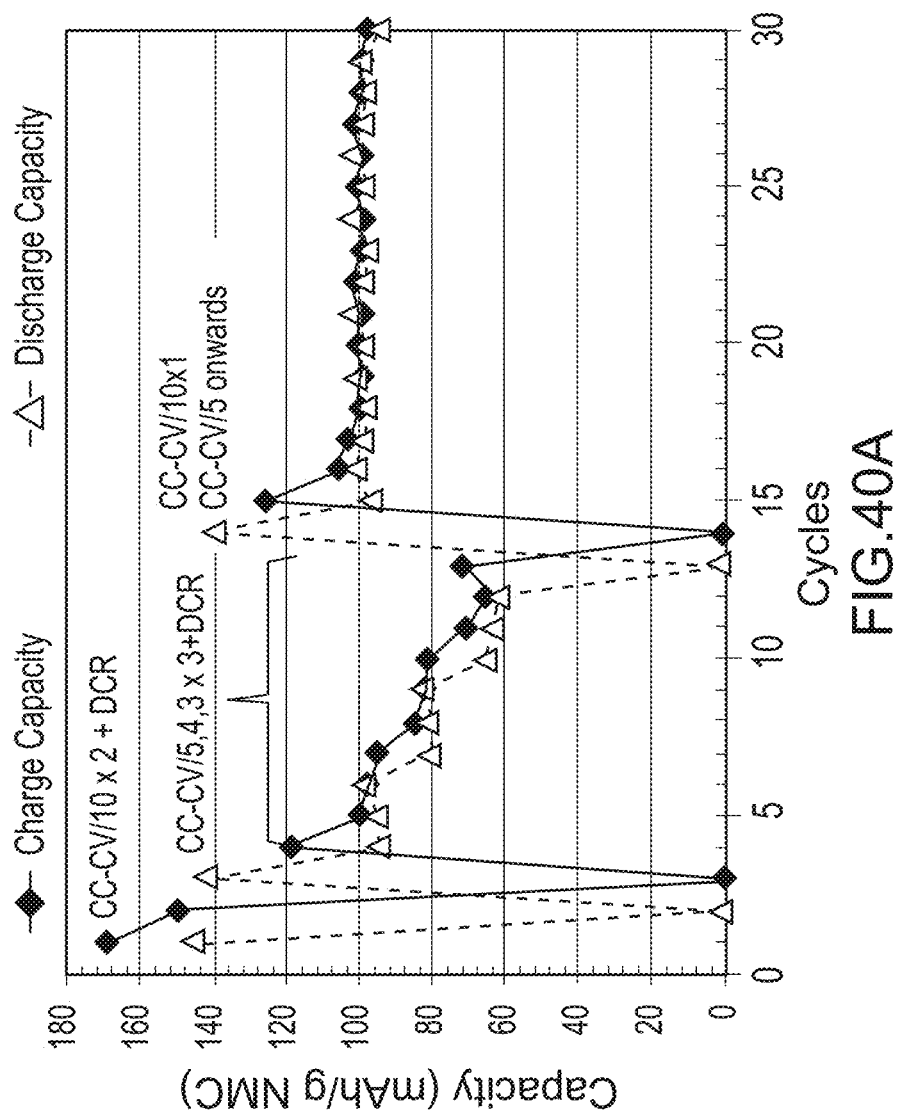
FIGS. 40A-40B illustrate the performance of a semi-solid based electrochemical cell over 30 cycles, and a sample charge/discharge curve.
Figure 40B:
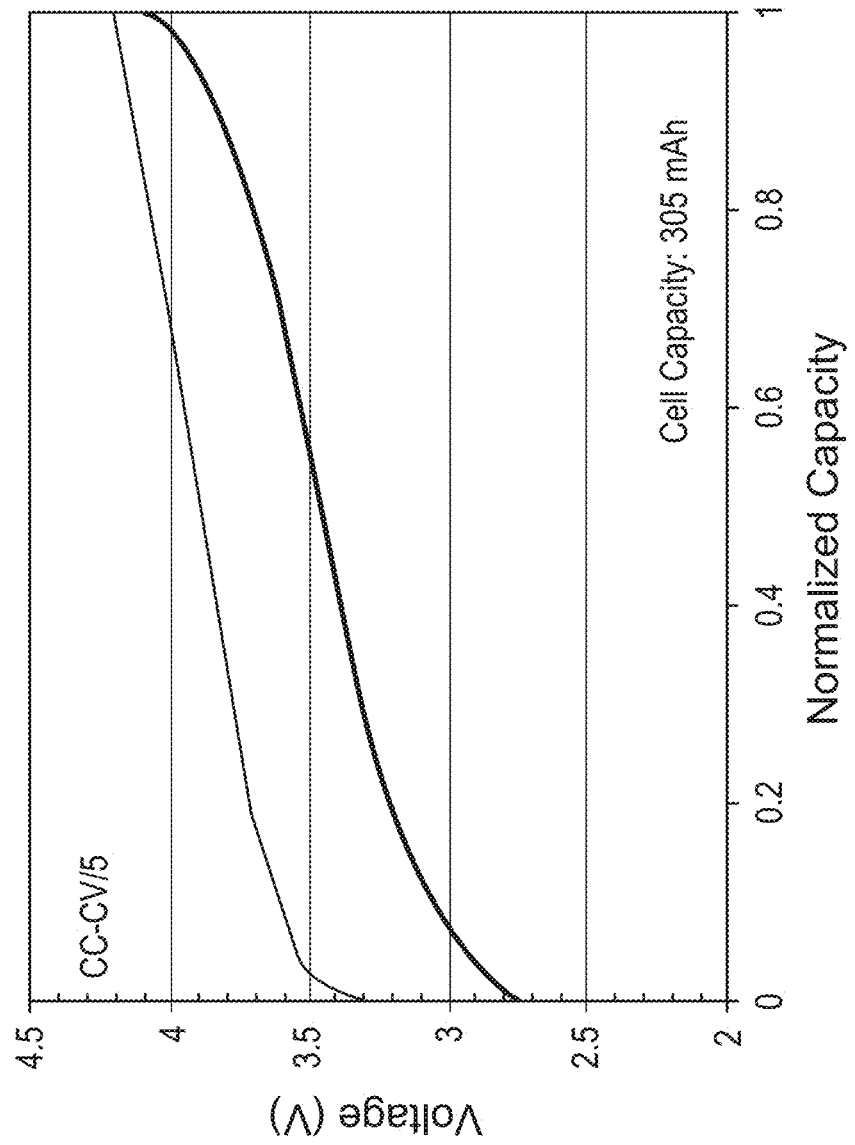

FIG. 40A shows results of charge/discharge cycle results for the electrochemical cell of Example 6. The electrochemical cell shows a capacity corresponding to about 170 mAh per gram of NMC in the first charge/discharge cycle and maintains a capacity of about 100 mAh/g of NMC after 30 charge/discharge cycles. FIG. 40B shows a representative charge and discharge curve for the electrochemical cell. The measured cell capacity of the electrochemical cell was 305 mAh.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method comprising:
mixing an active material with an electrolyte and a conductive additive via twin screw extrusion to form a semi-solid electrode material having a homogeneous composition;
controlling a temperature of the semi-solid electrode material during mixing to be lower than 10 degrees Celsius to control the homogeneous composition of the semi-solid electrode material;
forming the semi-solid electrode material into a first electrode;
forming a second electrode; and
combining the first electrode and the second electrode to form an electrochemical cell.

2. The method of claim 1, wherein the semi-solid electrode material is a suspension of the active material and the conductive additive in the electrolyte.

3. The method of claim 1, further comprising:
mixing the semi-solid electrode material until the semi-solid electrode material has an electronic conductivity of at least about $10^{-6}$ S/cm.

4. The method of claim 1, further comprising:
mixing the semi-solid electrode material until the semi-solid electrode material has an apparent viscosity of less than about 100,000 Pa-s at an apparent shear rate of 1,000 $s^{-1}$.

5. The method of claim 1, wherein the active material is about 20% to about 75% by volume of the semi-solid electrode material.

6. The method of claim 1, wherein the electrolyte is about 25% to about 70% by volume of the semi-solid electrode material.

7. The method of claim 1, wherein the conductive additive is about 0.5% to about 25% by volume of the semi-solid electrode material.

8. The method of claim 1, wherein the semi-solid electrode material has a percolating conductive network and a mixing index of at least about 0.8.

9. The method of claim 1, wherein temperature of the semi-solid electrode material is controlled during mixing to control a rate of evaporation of the electrolyte from the semi-solid electrode.

10. The method of claim 1, wherein the mixing of the active material with the electrolyte and the conductive additive is performed with a mixing energy of at least about 90 J/g.

11. A method comprising:
mixing an active material and an electrolyte with a conductive additive via twin screw extrusion to form a semi-solid electrode material having a homogeneous composition; and
controlling a temperature of the semi-solid electrode material during mixing to be lower than 10 degrees Celsius control the homogeneous composition of the semi-solid electrode material.

12. The method of claim 11, wherein the active material is about 20% to about 75% by volume of the semi-solid electrode material, the conductive additive is about 0.5% to about 25% by volume of the semi-solid electrode material, and the electrolyte is about 25% to about 70% by volume of the semi-solid electrode material.

13. The method of claim 11, wherein the semi-solid electrode material has a percolating conductive network and a mixing index of at least about 0.8.

14. The method of claim 11, wherein temperature of the semi-solid electrode material is controlled during mixing to control a rate of evaporation of the electrolyte from the semi-solid electrode.

15. The method of claim 11, wherein the mixing of the active material with the electrolyte and the conductive additive is performed with a mixing energy of at least about 90 J/g.

16. A method comprising:
mixing an active material and an electrolyte with a conductive additive in a twin screw extruder to form a semi-solid electrode material having a homogeneous composition;
controlling a predetermined temperature of the semi-solid electrode material during mixing to be lower than 10 degrees Celsius to control the homogeneous composition of the semi-solid electrode material; and
forming the semi-solid electrode material into an electrode,
wherein the twin screw extruder is configured to impart a specific mixing energy to the semi-solid electrode material.

17. The method of claim 16, wherein the semi-solid electrode material has a percolating conductive network and a mixing index of at least about 0.8.

18. The method of claim 16, wherein temperature of the semi-solid electrode material is controlled during mixing to control a rate of evaporation of the electrolyte from the semi-solid electrode.

19. The method of claim 16, wherein the mixing of the active material with the electrolyte and the conductive additive is performed with a mixing energy of at least about 90 J/g.

* * * * *